US008612310B2

(12) United States Patent
Yates

(10) Patent No.: US 8,612,310 B2
(45) Date of Patent: Dec. 17, 2013

(54) METHOD AND SYSTEM FOR COMMERCE IN MEDIA PROGRAM RELATED MERCHANDISE

(75) Inventor: Doug Yates, Los Angeles, CA (US)

(73) Assignee: United Video Properties, Inc., Santa Clara, CA (US)

(*) Notice: Subject to any disclaimer, the term of this patent is extended or adjusted under 35 U.S.C. 154(b) by 0 days.

(21) Appl. No.: 12/750,998

(22) Filed: Mar. 31, 2010

(65) Prior Publication Data
US 2010/0198691 A1 Aug. 5, 2010

Related U.S. Application Data

(63) Continuation of application No. 11/323,539, filed on Dec. 29, 2005, now abandoned.

(51) Int. Cl.
G06Q 30/00 (2012.01)

(52) U.S. Cl.
USPC .......................................... 705/26.7

(58) Field of Classification Search
USPC ............. 705/26, 27, 26.7, 26.1, 27.1; 725/34, 725/35, 42
See application file for complete search history.

(56) References Cited

U.S. PATENT DOCUMENTS

| | | | |
|---|---|---|---|
| 3,440,427 A | 4/1969 | Kammer | |
| 3,492,577 A | 1/1970 | Reiter et al. | |
| 3,493,674 A | 2/1970 | Houghton | |
| 3,729,581 A | 4/1973 | Anderson | |
| 3,833,757 A | 9/1974 | Kirk, Jr. et al. | |
| 3,891,792 A | 6/1975 | Kimura | |
| 3,936,868 A | 2/1976 | Thorpe | |
| 3,996,583 A | 12/1976 | Hutt et al. | |
| 4,004,085 A | 1/1977 | Makino et al. | |
| 4,016,361 A | 4/1977 | Pandey | |
| 4,026,555 A | 5/1977 | Kirschner et al. | |

(Continued)

FOREIGN PATENT DOCUMENTS

| | | |
|---|---|---|
| AU | 731010 | 7/1998 |
| AU | 733993 | 2/1999 |

(Continued)

OTHER PUBLICATIONS

Gallagher, K.; Parsons, J., "A framework for targeting banner advertising on the Internet," System Sciences, 1997, Proceedings of the Thirtieth Hawaii International Conference on , vol. 4, no., pp. 265,274 vol. 4, Jan 7-10, 1997.*

(Continued)

Primary Examiner — Matthew Zimmerman
(74) Attorney, Agent, or Firm — Ropes & Gray LLP

(57) ABSTRACT

The disclosed technology provides systems and methods for delivering a media program and purchase opportunities related to the media program to user equipment. A media program and its related merchandise information can be located at a distribution facility. The distribution facility can tailor the purchase opportunities it provides to the user equipment based on the user equipment's equipment category. When user equipment receives purchase opportunities, the user equipment can select the opportunities based on which types of merchandise are supported by the user equipment. The user equipment and/or a distribution facility may be able to determine the location of the user equipment. When the distribution facility provides merchandise information for physical merchandise to the user equipment, the merchandise information can be selected to include physical merchandise that are available for purchase at stores that are, for example, near the location of the user equipment.

15 Claims, 33 Drawing Sheets

(56) References Cited

U.S. PATENT DOCUMENTS

| | | |
|---|---|---|
| 4,031,548 A | 6/1977 | Kato et al. |
| 4,052,719 A | 10/1977 | Hutt et al. |
| 4,058,830 A | 11/1977 | Guinet et al. |
| 4,079,419 A | 3/1978 | Siegle et al. |
| 4,081,753 A | 3/1978 | Miller |
| 4,081,754 A | 3/1978 | Jackson |
| 4,096,524 A | 6/1978 | Scott |
| 4,134,127 A | 1/1979 | Campioni |
| 4,139,860 A | 2/1979 | Micic et al. |
| 4,150,254 A | 4/1979 | Schussler et al. |
| 4,156,850 A | 5/1979 | Beyers, Jr. |
| 4,161,728 A | 7/1979 | Insam |
| 4,162,513 A | 7/1979 | Beyers, Jr. et al. |
| 4,170,782 A | 10/1979 | Miller |
| 4,186,413 A | 1/1980 | Mortimer |
| 4,203,130 A | 5/1980 | Doumit et al. |
| 4,205,343 A | 5/1980 | Barrett |
| 4,218,698 A | 8/1980 | Bart et al. |
| 4,228,543 A | 10/1980 | Jackson |
| 4,231,031 A | 10/1980 | Crowther et al. |
| 4,233,628 A | 11/1980 | Ciciora |
| 4,249,211 A | 2/1981 | Baba et al. |
| 4,249,213 A | 2/1981 | Imaide et al. |
| 4,261,006 A | 4/1981 | Weintraub et al. |
| 4,264,924 A | 4/1981 | Freeman |
| 4,264,925 A | 4/1981 | Freeman et al. |
| 4,270,145 A | 5/1981 | Farina |
| 4,271,532 A | 6/1981 | Wine |
| 4,276,597 A | 6/1981 | Dissly et al. |
| 4,283,787 A | 8/1981 | Chambers |
| 4,288,809 A | 9/1981 | Yabe |
| 4,290,142 A | 9/1981 | Schnee et al. |
| 4,305,101 A | 12/1981 | Yarbrough et al. |
| 4,329,684 A | 5/1982 | Monteath et al. |
| 4,331,974 A | 5/1982 | Cogswell et al. |
| 4,337,480 A | 6/1982 | Bourassin et al. |
| 4,337,483 A | 6/1982 | Guillou |
| 4,344,090 A | 8/1982 | Belisomi et al. |
| 4,355,415 A | 10/1982 | George et al. |
| 4,367,559 A | 1/1983 | Tults |
| 4,375,651 A | 3/1983 | Templin et al. |
| 4,381,522 A | 4/1983 | Lambert |
| 4,388,645 A | 6/1983 | Cox et al. |
| 4,390,901 A | 6/1983 | Keiser |
| 4,393,376 A | 7/1983 | Thomas |
| 4,405,946 A | 9/1983 | Knight |
| 4,412,244 A | 10/1983 | Shanley, II |
| 4,413,281 A | 11/1983 | Thonnart |
| 4,420,769 A | 12/1983 | Novak |
| 4,425,579 A | 1/1984 | Merrell |
| 4,425,581 A | 1/1984 | Schweppe et al. |
| 4,429,385 A | 1/1984 | Cichelli et al. |
| 4,439,784 A | 3/1984 | Furukawa et al. |
| 4,449,249 A | 5/1984 | Price |
| 4,456,925 A | 6/1984 | Skerlos et al. |
| 4,466,017 A | 8/1984 | Banker |
| 4,477,830 A | 10/1984 | Lindman et al. |
| 4,488,179 A | 12/1984 | Kruger et al. |
| 4,495,654 A | 1/1985 | Deiss |
| 4,496,171 A | 1/1985 | Cherry |
| 4,496,976 A | 1/1985 | Swanson et al. |
| 4,510,623 A | 4/1985 | Bonneau et al. |
| 4,520,404 A | 5/1985 | Von Kohorn |
| 4,523,228 A | 6/1985 | Banker |
| 4,527,194 A | 7/1985 | Sirazi |
| 4,531,020 A | 7/1985 | Wechselberger et al. |
| 4,533,910 A | 8/1985 | Sukonick et al. |
| 4,536,791 A | 8/1985 | Campbell et al. |
| 4,547,804 A | 10/1985 | Greenberg |
| 4,554,584 A | 11/1985 | Elam et al. |
| 4,555,775 A | 11/1985 | Pike |
| 4,566,034 A | 1/1986 | Harger et al. |
| 4,573,072 A | 2/1986 | Freeman |
| 4,587,520 A | 5/1986 | Astle |
| 4,595,951 A | 6/1986 | Filliman |
| 4,595,952 A | 6/1986 | Filliman |
| 4,598,288 A | 7/1986 | Yarbrough et al. |
| 4,602,279 A | 7/1986 | Freeman |
| 4,605,964 A | 8/1986 | Chard |
| 4,605,973 A | 8/1986 | Von Kohorn |
| 4,620,229 A | 10/1986 | Amano et al. |
| 4,622,545 A | 11/1986 | Atkinson |
| 4,635,109 A | 1/1987 | Comeau |
| 4,635,121 A | 1/1987 | Hoffmann |
| 4,641,205 A | 2/1987 | Beyers, Jr. |
| 4,677,466 A | 6/1987 | Lert, Jr. et al. |
| 4,685,131 A | 8/1987 | Horne |
| 4,689,022 A | 8/1987 | Peers et al. |
| 4,691,351 A | 9/1987 | Hayashi et al. |
| 4,694,490 A | 9/1987 | Harvey et al. |
| 4,701,794 A | 10/1987 | Froling et al. |
| 4,704,725 A | 11/1987 | Harvey et al. |
| 4,706,121 A | 11/1987 | Young |
| 4,712,105 A | 12/1987 | Kohler |
| 4,718,107 A | 1/1988 | Hayes |
| RE32,632 E | 3/1988 | Atkinson |
| 4,745,549 A | 5/1988 | Hashimoto |
| 4,748,618 A | 5/1988 | Brown et al. |
| 4,750,036 A | 6/1988 | Martinez |
| 4,750,213 A | 6/1988 | Novak |
| 4,751,578 A | 6/1988 | Reiter et al. |
| 4,754,326 A | 6/1988 | Kram et al. |
| 4,768,228 A | 8/1988 | Clupper et al. |
| 4,772,882 A | 9/1988 | Mical |
| 4,775,935 A | 10/1988 | Yourick |
| 4,785,408 A | 11/1988 | Britton et al. |
| 4,787,063 A | 11/1988 | Muguet |
| 4,812,834 A | 3/1989 | Wells |
| 4,814,883 A | 3/1989 | Perine et al. |
| 4,821,102 A | 4/1989 | Ichikawa et al. |
| 4,821,211 A | 4/1989 | Torres |
| 4,829,558 A | 5/1989 | Welsh |
| 4,847,604 A | 7/1989 | Doyle |
| 4,847,698 A | 7/1989 | Freeman |
| 4,847,700 A | 7/1989 | Freeman |
| 4,857,999 A | 8/1989 | Welsh |
| 4,862,268 A | 8/1989 | Campbell et al. |
| 4,864,429 A | 9/1989 | Eigeldinger et al. |
| 4,873,623 A | 10/1989 | Lane et al. |
| 4,882,732 A | 11/1989 | Kaminaga |
| 4,884,223 A | 11/1989 | Ingle et al. |
| 4,888,796 A | 12/1989 | Olivo, Jr. |
| 4,890,320 A | 12/1989 | Monslow et al. |
| 4,890,321 A | 12/1989 | Seth-Smith et al. |
| 4,894,789 A | 1/1990 | Yee |
| 4,899,136 A | 2/1990 | Beard et al. |
| 4,905,094 A | 2/1990 | Pocock et al. |
| 4,908,707 A | 3/1990 | Kinghorn |
| 4,908,713 A | 3/1990 | Levine |
| 4,908,859 A | 3/1990 | Bennett et al. |
| 4,914,517 A | 4/1990 | Duffield |
| 4,914,732 A | 4/1990 | Henderson et al. |
| 4,930,158 A | 5/1990 | Vogel |
| 4,930,160 A | 5/1990 | Vogel |
| 4,931,783 A | 6/1990 | Atkinson |
| 4,935,865 A | 6/1990 | Rowe et al. |
| 4,937,821 A | 6/1990 | Boulton |
| 4,937,863 A | 6/1990 | Robert et al. |
| 4,939,507 A | 7/1990 | Beard et al. |
| 4,959,720 A | 9/1990 | Duffield et al. |
| 4,963,994 A | 10/1990 | Levine |
| 4,965,825 A | 10/1990 | Harvey et al. |
| 4,977,455 A | 12/1990 | Young |
| 4,987,486 A | 1/1991 | Johnson et al. |
| 4,991,011 A | 2/1991 | Johnson et al. |
| 4,991,012 A | 2/1991 | Yoshino |
| 4,992,940 A | 2/1991 | Dworkin |
| 4,995,078 A | 2/1991 | Monslow et al. |
| 4,996,642 A | 2/1991 | Hey |
| 4,998,171 A | 3/1991 | Kim et al. |
| 5,008,853 A | 4/1991 | Bly et al. |
| 5,014,125 A | 5/1991 | Pocock et al. |
| 5,027,400 A | 6/1991 | Baji et al. |
| 5,036,314 A | 7/1991 | Barillari et al. |

(56) References Cited

U.S. PATENT DOCUMENTS

| | | | |
|---|---|---|---|
| 5,038,211 | A | 8/1991 | Hallenbeck |
| 5,045,947 | A | 9/1991 | Beery |
| 5,047,867 | A | 9/1991 | Strubbe et al. |
| 5,058,160 | A | 10/1991 | Banker et al. |
| 5,062,060 | A | 10/1991 | Kolnick |
| 5,068,734 | A | 11/1991 | Beery |
| 5,072,412 | A | 12/1991 | Henderson, Jr. et al. |
| 5,075,771 | A | 12/1991 | Hashimoto |
| 5,083,800 | A | 1/1992 | Lockton |
| 5,091,785 | A | 2/1992 | Canfield et al. |
| 5,093,921 | A | 3/1992 | Bevins, Jr. |
| 5,099,319 | A | 3/1992 | Esch et al. |
| 5,103,314 | A | 4/1992 | Keenan |
| 5,105,184 | A | 4/1992 | Pirani et al. |
| 5,109,279 | A | 4/1992 | Ando |
| 5,109,414 | A | 4/1992 | Harvey et al. |
| 5,119,188 | A | 6/1992 | McCalley et al. |
| 5,121,476 | A | 6/1992 | Yee |
| 5,123,046 | A | 6/1992 | Levine |
| 5,126,851 | A | 6/1992 | Yoshimura et al. |
| 5,134,719 | A | 7/1992 | Mankovitz |
| 5,148,154 | A | 9/1992 | Mackay et al. |
| 5,151,782 | A | 9/1992 | Ferraro |
| 5,151,789 | A | 9/1992 | Young |
| 5,155,591 | A | 10/1992 | Wachob |
| 5,155,806 | A | 10/1992 | Hoeber et al. |
| 5,157,768 | A | 10/1992 | Hoeber et al. |
| 5,161,023 | A | 11/1992 | Keenan |
| 5,162,905 | A | 11/1992 | Itoh et al. |
| 5,170,388 | A | 12/1992 | Endoh |
| 5,172,111 | A | 12/1992 | Olivo, Jr. |
| 5,172,413 | A | 12/1992 | Bradley et al. |
| 5,177,604 | A | 1/1993 | Martinez |
| 5,179,654 | A | 1/1993 | Richards et al. |
| 5,195,092 | A | 3/1993 | Wilson et al. |
| 5,200,822 | A | 4/1993 | Bronfin et al. |
| 5,200,823 | A | 4/1993 | Yoneda et al. |
| 5,204,897 | A | 4/1993 | Wyman |
| 5,206,722 | A | 4/1993 | Kwan |
| 5,210,611 | A | 5/1993 | Yee et al. |
| 5,212,553 | A | 5/1993 | Maruoka |
| 5,214,622 | A | 5/1993 | Nemoto et al. |
| 5,216,515 | A | 6/1993 | Steele et al. |
| 5,220,420 | A | 6/1993 | Hoarty et al. |
| 5,223,924 | A | 6/1993 | Strubbe |
| 5,227,874 | A | 7/1993 | Von Kohorn |
| 5,231,493 | A | 7/1993 | Apitz |
| RE34,340 | E | 8/1993 | Freeman |
| 5,233,423 | A | 8/1993 | Jernigan et al. |
| 5,233,654 | A | 8/1993 | Harvey et al. |
| 5,235,415 | A | 8/1993 | Bonicel et al. |
| 5,236,199 | A | 8/1993 | Thompson, Jr. |
| 5,237,411 | A | 8/1993 | Fink et al. |
| 5,237,417 | A | 8/1993 | Hayashi et al. |
| 5,237,418 | A | 8/1993 | Kaneko |
| 5,239,540 | A | 8/1993 | Rovira et al. |
| 5,245,420 | A | 9/1993 | Harney et al. |
| 5,247,347 | A | 9/1993 | Litteral et al. |
| 5,247,364 | A | 9/1993 | Banker et al. |
| 5,247,580 | A | 9/1993 | Kimura et al. |
| 5,253,066 | A | 10/1993 | Vogel |
| 5,253,067 | A | 10/1993 | Chaney et al. |
| 5,260,778 | A | 11/1993 | Kauffman et al. |
| 5,260,788 | A | 11/1993 | Takano et al. |
| 5,260,999 | A | 11/1993 | Wyman |
| 5,283,639 | A | 2/1994 | Esch et al. |
| 5,283,819 | A | 2/1994 | Glick et al. |
| 5,301,028 | A | 4/1994 | Banker et al. |
| 5,307,173 | A | 4/1994 | Yuen et al. |
| 5,311,423 | A | 5/1994 | Clark |
| 5,313,282 | A | 5/1994 | Hayashi |
| 5,317,403 | A | 5/1994 | Keenan |
| 5,319,445 | A | 6/1994 | Fitts |
| 5,323,234 | A | 6/1994 | Kawasaki |
| 5,323,240 | A | 6/1994 | Amano et al. |
| 5,325,183 | A | 6/1994 | Rhee |
| 5,325,423 | A | 6/1994 | Lewis |
| 5,335,277 | A | 8/1994 | Harvey et al. |
| 5,343,239 | A | 8/1994 | Lappington et al. |
| 5,347,167 | A | 9/1994 | Singh |
| 5,347,632 | A | 9/1994 | Filepp et al. |
| 5,351,075 | A | 9/1994 | Herz et al. |
| 5,353,121 | A | 10/1994 | Young et al. |
| 5,357,276 | A | 10/1994 | Banker et al. |
| 5,359,367 | A | 10/1994 | Stockill |
| 5,359,601 | A | 10/1994 | Wasilewski et al. |
| 5,365,282 | A | 11/1994 | Levine |
| 5,367,316 | A | 11/1994 | Ikezaki |
| 5,367,330 | A | 11/1994 | Haave et al. |
| 5,373,288 | A | 12/1994 | Blahut |
| 5,374,951 | A | 12/1994 | Welsh |
| 5,377,317 | A | 12/1994 | Bates et al. |
| 5,377,319 | A | 12/1994 | Kitahara et al. |
| 5,382,983 | A | 1/1995 | Kwoh et al. |
| 5,384,910 | A | 1/1995 | Torres |
| 5,387,945 | A | 2/1995 | Takeuchi |
| 5,398,074 | A | 3/1995 | Duffield et al. |
| 5,404,393 | A | 4/1995 | Remillard |
| 5,410,326 | A | 4/1995 | Goldstein |
| 5,410,343 | A | 4/1995 | Coddington et al. |
| 5,410,344 | A | 4/1995 | Graves et al. |
| 5,410,367 | A | 4/1995 | Zahavi et al. |
| 5,412,720 | A | 5/1995 | Hoarty |
| 5,416,508 | A | 5/1995 | Sakuma et al. |
| 5,424,770 | A | 6/1995 | Schmelzer et al. |
| 5,425,101 | A | 6/1995 | Woo et al. |
| 5,432,561 | A | 7/1995 | Strubbe |
| 5,434,626 | A | 7/1995 | Hayashi et al. |
| 5,436,676 | A | 7/1995 | Pint et al. |
| 5,438,372 | A | 8/1995 | Tsumori et al. |
| 5,440,678 | A | 8/1995 | Eisen et al. |
| 5,442,389 | A | 8/1995 | Blahut et al. |
| 5,444,499 | A | 8/1995 | Saitoh |
| 5,446,919 | A | 8/1995 | Wilkins |
| 5,452,012 | A | 9/1995 | Saitoh |
| 5,459,522 | A | 10/1995 | Pint |
| 5,461,415 | A | 10/1995 | Wolf et al. |
| 5,465,113 | A | 11/1995 | Gilboy |
| 5,465,385 | A | 11/1995 | Ohga et al. |
| 5,469,206 | A | 11/1995 | Strubbe et al. |
| 5,477,262 | A | 12/1995 | Banker et al. |
| 5,479,266 | A | 12/1995 | Young et al. |
| 5,479,268 | A | 12/1995 | Young et al. |
| 5,479,497 | A | 12/1995 | Kovarik |
| 5,481,296 | A | 1/1996 | Cragun et al. |
| 5,483,278 | A | 1/1996 | Strubbe et al. |
| 5,485,197 | A | 1/1996 | Hoarty |
| 5,485,219 | A | 1/1996 | Woo |
| 5,485,221 | A | 1/1996 | Banker et al. |
| 5,488,409 | A | 1/1996 | Yuen et al. |
| 5,495,295 | A | 2/1996 | Long |
| 5,502,504 | A | 3/1996 | Marshall et al. |
| 5,515,098 | A | 5/1996 | Carles |
| 5,517,257 | A | 5/1996 | Dunn et al. |
| 5,523,794 | A | 6/1996 | Mankovitz et al. |
| 5,523,796 | A | 6/1996 | Marshall et al. |
| 5,524,195 | A | 6/1996 | Clanton, III et al. |
| 5,526,034 | A | 6/1996 | Hoarty et al. |
| 5,528,304 | A | 6/1996 | Cherrick et al. |
| 5,532,735 | A | 7/1996 | Blahut et al. |
| 5,532,754 | A | 7/1996 | Young et al. |
| 5,534,911 | A | 7/1996 | Levitan |
| 5,537,141 | A | 7/1996 | Harper et al. |
| 5,539,449 | A | 7/1996 | Blahut et al. |
| 5,539,822 | A | 7/1996 | Lett |
| 5,541,662 | A | 7/1996 | Adams et al. |
| 5,541,738 | A | 7/1996 | Mankovitz |
| 5,543,852 | A | 8/1996 | Yuen et al. |
| 5,550,576 | A | 8/1996 | Klosterman |
| 5,557,338 | A | 9/1996 | Maze et al. |
| 5,557,721 | A | 9/1996 | Fite et al. |
| 5,559,548 | A | 9/1996 | Davis et al. |
| 5,559,549 | A | 9/1996 | Hendricks et al. |
| 5,559,550 | A | 9/1996 | Mankovitz |

(56) References Cited

U.S. PATENT DOCUMENTS

| | | |
|---|---|---|
| 5,559,942 A | 9/1996 | Gough et al. |
| 5,561,471 A | 10/1996 | Kim et al. |
| 5,570,295 A | 10/1996 | Isenberg et al. |
| 5,572,442 A | 11/1996 | Schulhof et al. |
| 5,574,962 A | 11/1996 | Fardeau et al. |
| 5,579,055 A | 11/1996 | Hamilton et al. |
| 5,581,479 A | 12/1996 | McLaughlin et al. |
| 5,581,614 A | 12/1996 | Ng et al. |
| 5,582,364 A | 12/1996 | Trulin et al. |
| 5,583,560 A | 12/1996 | Florin et al. |
| 5,583,561 A | 12/1996 | Baker et al. |
| 5,583,563 A | 12/1996 | Wanderscheid et al. |
| 5,585,838 A | 12/1996 | Lawler et al. |
| 5,585,858 A | 12/1996 | Harper et al. |
| 5,585,865 A | 12/1996 | Amano et al. |
| 5,585,866 A | 12/1996 | Miller et al. |
| 5,589,892 A | 12/1996 | Knee et al. |
| 5,592,551 A | 1/1997 | Lett et al. |
| 5,594,509 A | 1/1997 | Florin et al. |
| 5,596,373 A | 1/1997 | White et al. |
| 5,600,364 A | 2/1997 | Hendricks et al. |
| 5,600,366 A | 2/1997 | Schulman |
| 5,600,573 A | 2/1997 | Hendricks et al. |
| 5,602,582 A | 2/1997 | Wanderscheid et al. |
| 5,602,596 A | 2/1997 | Claussen et al. |
| 5,602,597 A | 2/1997 | Bertram |
| 5,606,374 A | 2/1997 | Bertram |
| 5,610,653 A | 3/1997 | Abecassis |
| 5,617,565 A | 4/1997 | Augenbraun et al. |
| 5,619,247 A | 4/1997 | Russo |
| 5,619,249 A | 4/1997 | Billock et al. |
| 5,619,274 A | 4/1997 | Roop et al. |
| 5,621,456 A | 4/1997 | Florin et al. |
| 5,621,579 A | 4/1997 | Yuen |
| 5,623,613 A | 4/1997 | Rowe et al. |
| 5,627,940 A | 5/1997 | Rohra et al. |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,633,683 A | 5/1997 | Rosengren et al. |
| 5,635,978 A | 6/1997 | Alten et al. |
| 5,635,979 A | 6/1997 | Kostreski et al. |
| 5,635,989 A | 6/1997 | Rothmuller |
| 5,636,346 A | 6/1997 | Saxe |
| 5,640,501 A | 6/1997 | Turpin |
| 5,640,577 A | 6/1997 | Scharmer |
| 5,642,153 A | 6/1997 | Chaney et al. |
| 5,648,813 A | 7/1997 | Tanigawa et al. |
| 5,648,824 A | 7/1997 | Dunn et al. |
| 5,650,826 A | 7/1997 | Eitz |
| 5,650,831 A | 7/1997 | Farwell |
| 5,652,613 A | 7/1997 | Lazarus et al. |
| 5,652,615 A | 7/1997 | Bryant et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,091 A | 8/1997 | Bertram |
| 5,659,350 A | 8/1997 | Hendricks et al. |
| 5,659,366 A | 8/1997 | Kerman |
| 5,659,367 A | 8/1997 | Yuen |
| 5,661,516 A | 8/1997 | Carles |
| 5,661,517 A | 8/1997 | Budow et al. |
| 5,663,757 A | 9/1997 | Morales |
| 5,664,111 A | 9/1997 | Nahan et al. |
| 5,666,293 A | 9/1997 | Metz et al. |
| 5,666,498 A | 9/1997 | Amro |
| 5,666,645 A | 9/1997 | Thomas et al. |
| 5,671,276 A | 9/1997 | Eyer et al. |
| 5,671,411 A | 9/1997 | Watts et al. |
| 5,675,390 A | 10/1997 | Schindler et al. |
| 5,675,752 A | 10/1997 | Scott et al. |
| 5,677,708 A | 10/1997 | Matthews, III et al. |
| 5,682,195 A | 10/1997 | Hendricks et al. |
| 5,682,206 A | 10/1997 | Wehmeyer et al. |
| 5,684,525 A | 11/1997 | Klosterman |
| 5,687,331 A | 11/1997 | Volk et al. |
| 5,689,648 A | 11/1997 | Diaz et al. |
| 5,689,666 A | 11/1997 | Berquist et al. |
| 5,692,214 A | 11/1997 | Levine |
| 5,694,163 A | 12/1997 | Harrison |
| 5,694,176 A | 12/1997 | Bruette et al. |
| 5,694,381 A | 12/1997 | Sako |
| 5,696,905 A | 12/1997 | Reimer et al. |
| 5,699,107 A | 12/1997 | Lawler et al. |
| 5,699,125 A | 12/1997 | Rzeszewski et al. |
| 5,701,383 A | 12/1997 | Russo et al. |
| 5,708,478 A | 1/1998 | Tognazzini |
| 5,710,601 A | 1/1998 | Marshall et al. |
| 5,710,815 A | 1/1998 | Ming et al. |
| 5,715,314 A | 2/1998 | Payne et al. |
| 5,715,399 A | 2/1998 | Bezos |
| 5,717,452 A | 2/1998 | Janin et al. |
| 5,721,829 A | 2/1998 | Dunn et al. |
| 5,724,203 A | 3/1998 | Kwoh et al. |
| 5,724,521 A | 3/1998 | Dedrick |
| 5,724,525 A | 3/1998 | Beyers, II et al. |
| 5,727,060 A | 3/1998 | Young et al. |
| 5,727,163 A | 3/1998 | Bezos |
| 5,731,844 A | 3/1998 | Rauch et al. |
| 5,734,444 A | 3/1998 | Yoshinobu |
| 5,734,853 A | 3/1998 | Hendricks et al. |
| 5,734,893 A | 3/1998 | Li et al. |
| 5,737,028 A | 4/1998 | Bertram et al. |
| 5,737,030 A | 4/1998 | Hong et al. |
| 5,740,549 A | 4/1998 | Reilly et al. |
| 5,745,710 A | 4/1998 | Clanton, III et al. |
| 5,751,282 A | 5/1998 | Girard et al. |
| 5,752,159 A | 5/1998 | Faust et al. |
| 5,752,160 A | 5/1998 | Dunn |
| 5,754,258 A | 5/1998 | Hanaya et al. |
| 5,754,771 A | 5/1998 | Epperson et al. |
| 5,754,939 A | 5/1998 | Herz et al. |
| 5,757,417 A | 5/1998 | Aras et al. |
| 5,758,257 A | 5/1998 | Herz et al. |
| 5,758,259 A | 5/1998 | Lawler |
| 5,760,821 A | 6/1998 | Ellis et al. |
| 5,761,372 A | 6/1998 | Yoshinobu et al. |
| 5,761,601 A | 6/1998 | Nemirofsky et al. |
| 5,761,607 A | 6/1998 | Gudesen |
| 5,768,528 A | 6/1998 | Stumm |
| 5,774,170 A | 6/1998 | Hite et al. |
| 5,774,357 A | 6/1998 | Hoffberg et al. |
| 5,774,534 A | 6/1998 | Mayer |
| 5,774,887 A | 6/1998 | Wolff et al. |
| 5,778,181 A | 7/1998 | Hidary et al. |
| 5,778,182 A | 7/1998 | Cathey et al. |
| 5,781,226 A | 7/1998 | Sheehan |
| 5,781,228 A | 7/1998 | Sposato |
| 5,781,245 A | 7/1998 | Van Der Weij et al. |
| 5,781,246 A | 7/1998 | Alten et al. |
| 5,784,258 A | 7/1998 | Quinn |
| 5,790,198 A | 8/1998 | Roop et al. |
| 5,790,202 A | 8/1998 | Kummer et al. |
| 5,790,426 A | 8/1998 | Robinson |
| 5,793,438 A | 8/1998 | Bedard |
| 5,793,964 A | 8/1998 | Rogers et al. |
| 5,796,952 A | 8/1998 | Davis et al. |
| 5,798,785 A | 8/1998 | Hendricks et al. |
| 5,801,747 A | 9/1998 | Bedard |
| 5,801,785 A | 9/1998 | Crump et al. |
| 5,801,787 A | 9/1998 | Schein et al. |
| 5,802,284 A | 9/1998 | Karlton et al. |
| 5,805,154 A | 9/1998 | Brown |
| 5,805,167 A | 9/1998 | van Cruyningen |
| 5,805,235 A | 9/1998 | Bedard |
| 5,805,763 A | 9/1998 | Lawler et al. |
| 5,805,804 A | 9/1998 | Laursen et al. |
| 5,808,608 A | 9/1998 | Young et al. |
| 5,808,694 A | 9/1998 | Usui et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews, III |

(56) References Cited

U.S. PATENT DOCUMENTS

| | | |
|---|---|---|
| 5,815,671 A | 9/1998 | Morrison |
| 5,818,438 A | 10/1998 | Howe et al. |
| 5,818,439 A | 10/1998 | Nagasaka et al. |
| 5,818,441 A | 10/1998 | Throckmorton et al. |
| 5,818,541 A | 10/1998 | Matsuura et al. |
| 5,819,019 A | 10/1998 | Nelson |
| 5,819,156 A | 10/1998 | Belmont |
| 5,819,284 A | 10/1998 | Farber et al. |
| 5,822,123 A | 10/1998 | Davis et al. |
| 5,828,402 A | 10/1998 | Collings |
| 5,828,420 A | 10/1998 | Marshall et al. |
| 5,828,839 A | 10/1998 | Moncreiff |
| 5,828,945 A | 10/1998 | Klosterman |
| 5,830,068 A | 11/1998 | Brenner et al. |
| 5,838,314 A | 11/1998 | Neel et al. |
| 5,842,010 A | 11/1998 | Jain et al. |
| 5,842,199 A | 11/1998 | Miller et al. |
| 5,844,620 A | 12/1998 | Coleman et al. |
| 5,848,352 A | 12/1998 | Dougherty et al. |
| 5,848,396 A | 12/1998 | Gerace |
| 5,848,397 A | 12/1998 | Marsh et al. |
| 5,850,218 A | 12/1998 | LaJoie et al. |
| 5,862,292 A | 1/1999 | Kubota et al. |
| 5,867,226 A | 2/1999 | Wehmeyer |
| 5,867,227 A | 2/1999 | Yamaguchi |
| 5,872,588 A | 2/1999 | Aras et al. |
| 5,874,985 A | 2/1999 | Matthews, III |
| 5,875,108 A | 2/1999 | Hoffberg et al. |
| 5,880,768 A | 3/1999 | Lemmons et al. |
| 5,883,677 A | 3/1999 | Hofmann |
| 5,886,691 A | 3/1999 | Furuya et al. |
| 5,886,731 A | 3/1999 | Ebisawa |
| 5,887,243 A | 3/1999 | Harvey et al. |
| 5,889,950 A | 3/1999 | Kuzma |
| 5,892,498 A | 4/1999 | Marshall et al. |
| 5,892,535 A | 4/1999 | Allen et al. |
| 5,900,905 A | 5/1999 | Shoff et al. |
| 5,903,314 A | 5/1999 | Niijima et al. |
| 5,903,545 A | 5/1999 | Sabourin et al. |
| 5,903,816 A | 5/1999 | Broadwin et al. |
| 5,905,497 A | 5/1999 | Vaughan et al. |
| 5,907,323 A | 5/1999 | Lawler et al. |
| 5,907,366 A | 5/1999 | Farmer et al. |
| 5,909,212 A | 6/1999 | Nishina et al. |
| 5,914,746 A | 6/1999 | Matthews, III et al. |
| 5,917,481 A | 6/1999 | Rzeszewski et al. |
| 5,917,830 A | 6/1999 | Chen et al. |
| 5,918,014 A | 6/1999 | Robinson |
| 5,920,700 A | 7/1999 | Gordon et al. |
| 5,929,849 A | 7/1999 | Kikinis |
| 5,929,850 A | 7/1999 | Broadwin et al. |
| 5,936,679 A | 8/1999 | Kasahara et al. |
| 5,940,073 A | 8/1999 | Klosterman et al. |
| 5,940,572 A | 8/1999 | Balaban et al. |
| 5,945,988 A | 8/1999 | Williams et al. |
| 5,949,954 A | 9/1999 | Young et al. |
| 5,951,642 A | 9/1999 | Onoe et al. |
| 5,959,688 A | 9/1999 | Schein et al. |
| 5,960,411 A | 9/1999 | Hartman et al. |
| 5,973,683 A | 10/1999 | Cragun et al. |
| 5,974,222 A | 10/1999 | Yuen et al. |
| 5,977,964 A | 11/1999 | Williams et al. |
| 5,986,650 A | 11/1999 | Ellis et al. |
| 5,988,078 A | 11/1999 | Levine |
| 5,990,890 A | 11/1999 | Etheredge |
| 5,990,927 A | 11/1999 | Hendricks et al. |
| 5,999,688 A | 12/1999 | Iggulden et al. |
| 5,999,912 A | 12/1999 | Wodarz et al. |
| 6,002,393 A | 12/1999 | Hite et al. |
| 6,002,394 A | 12/1999 | Schein et al. |
| 6,005,562 A | 12/1999 | Shiga et al. |
| 6,005,565 A | 12/1999 | Legall et al. |
| 6,005,597 A | 12/1999 | Barrett et al. |
| 6,006,257 A | 12/1999 | Slezak |
| 6,008,802 A | 12/1999 | Iki et al. |
| 6,011,546 A | 1/2000 | Bertram |
| 6,014,137 A | 1/2000 | Burns |
| 6,014,184 A | 1/2000 | Knee et al. |
| 6,014,502 A | 1/2000 | Moraes |
| 6,016,141 A | 1/2000 | Knudson et al. |
| 6,018,372 A | 1/2000 | Etheredge |
| 6,018,768 A | 1/2000 | Ullman et al. |
| 6,020,883 A | 2/2000 | Herz et al. |
| 6,020,929 A | 2/2000 | Marshall et al. |
| 6,025,837 A | 2/2000 | Matthews, III et al. |
| 6,025,886 A | 2/2000 | Koda |
| 6,028,599 A | 2/2000 | Yuen et al. |
| 6,029,045 A | 2/2000 | Picco et al. |
| 6,029,195 A | 2/2000 | Herz |
| 6,035,304 A | 3/2000 | Machida et al. |
| 6,047,317 A | 4/2000 | Bisdikian et al. |
| 6,049,824 A | 4/2000 | Simonin |
| 6,052,145 A | 4/2000 | Macrae et al. |
| 6,058,238 A | 5/2000 | Ng |
| 6,061,060 A | 5/2000 | Berry et al. |
| 6,061,097 A | 5/2000 | Satterfield |
| 6,064,376 A | 5/2000 | Berezowski et al. |
| 6,064,980 A | 5/2000 | Jacobi et al. |
| 6,067,303 A | 5/2000 | Aaker et al. |
| 6,072,460 A | 6/2000 | Marshall et al. |
| 6,075,526 A | 6/2000 | Rothmuller |
| 6,075,551 A | 6/2000 | Berezowski et al. |
| 6,075,575 A | 6/2000 | Schein et al. |
| 6,078,348 A | 6/2000 | Klosterman et al. |
| 6,081,750 A | 6/2000 | Hoffberg et al. |
| 6,088,722 A | 7/2000 | Herz et al. |
| 6,091,883 A | 7/2000 | Artigalas et al. |
| 6,091,884 A | 7/2000 | Yuen et al. |
| 6,098,065 A | 8/2000 | Skillen et al. |
| 6,098,082 A | 8/2000 | Gibbon et al. |
| 6,108,042 A | 8/2000 | Adams et al. |
| 6,111,614 A | 8/2000 | Mugura et al. |
| 6,112,186 A | 8/2000 | Bergh et al. |
| 6,115,057 A | 9/2000 | Kwoh et al. |
| 6,118,492 A | 9/2000 | Milnes et al. |
| 6,119,098 A | 9/2000 | Guyot et al. |
| 6,119,101 A | 9/2000 | Peckover |
| 6,122,011 A | 9/2000 | Dias et al. |
| 6,125,230 A | 9/2000 | Yaginuma |
| 6,125,231 A | 9/2000 | Yuen et al. |
| 6,133,909 A | 10/2000 | Schein et al. |
| 6,141,003 A | 10/2000 | Chor et al. |
| 6,147,714 A | 11/2000 | Terasawa et al. |
| 6,147,715 A | 11/2000 | Yuen et al. |
| 6,151,059 A | 11/2000 | Schein et al. |
| 6,154,203 A | 11/2000 | Yuen et al. |
| 6,157,413 A | 12/2000 | Hanafee et al. |
| 6,160,545 A | 12/2000 | Eyer et al. |
| 6,160,546 A | 12/2000 | Thompson et al. |
| 6,160,570 A | 12/2000 | Sitnik |
| 6,163,316 A | 12/2000 | Killian |
| 6,167,188 A | 12/2000 | Young et al. |
| 6,169,542 B1 | 1/2001 | Hooks et al. |
| 6,172,674 B1 | 1/2001 | Etheredge |
| 6,172,677 B1 | 1/2001 | Stautner et al. |
| 6,173,271 B1 | 1/2001 | Goodman et al. |
| 6,177,931 B1 | 1/2001 | Alexander et al. |
| 6,178,446 B1 | 1/2001 | Gerszberg et al. |
| 6,181,335 B1 | 1/2001 | Hendricks et al. |
| 6,186,443 B1 | 2/2001 | Shaffer |
| 6,191,780 B1 | 2/2001 | Martin et al. |
| 6,202,212 B1 | 3/2001 | Sturgeon et al. |
| 6,208,335 B1 | 3/2001 | Gordon et al. |
| 6,209,129 B1 | 3/2001 | Carr et al. |
| 6,209,130 B1 | 3/2001 | Rector, Jr. et al. |
| 6,216,264 B1 | 4/2001 | Maze et al. |
| 6,233,389 B1 | 5/2001 | Barton et al. |
| 6,239,794 B1 | 5/2001 | Yuen et al. |
| 6,240,241 B1 | 5/2001 | Yuen |
| 6,240,555 B1 | 5/2001 | Shoff et al. |
| 6,253,203 B1 | 6/2001 | O'Flaherty et al. |
| 6,256,071 B1 | 7/2001 | Hiroi |
| 6,256,785 B1 | 7/2001 | Klappert et al. |
| 6,257,268 B1 | 7/2001 | Hope et al. |

(56) References Cited

U.S. PATENT DOCUMENTS

| | | |
|---|---|---|
| 6,262,721 B1 | 7/2001 | Tsukidate et al. |
| 6,263,501 B1 | 7/2001 | Schein et al. |
| 6,263,507 B1 | 7/2001 | Ahmad et al. |
| 6,268,849 B1 | 7/2001 | Boyer et al. |
| 6,275,268 B1 | 8/2001 | Ellis et al. |
| 6,279,157 B1 | 8/2001 | Takasu |
| 6,285,713 B1 | 9/2001 | Nakaya et al. |
| 6,286,140 B1 | 9/2001 | Ivanyi |
| 6,289,346 B1 | 9/2001 | Milewski et al. |
| 6,298,482 B1 | 10/2001 | Seidman et al. |
| 6,311,877 B1 | 11/2001 | Yang et al. |
| 6,312,336 B1 | 11/2001 | Handelman et al. |
| 6,320,588 B1 | 11/2001 | Palmer et al. |
| 6,323,911 B1 | 11/2001 | Schein et al. |
| 6,324,338 B1 | 11/2001 | Wood et al. |
| 6,331,877 B1 | 12/2001 | Bennington et al. |
| 6,341,195 B1 | 1/2002 | Mankovitz et al. |
| 6,342,926 B1 | 1/2002 | Hanafee et al. |
| 6,345,279 B1 | 2/2002 | Li et al. |
| 6,357,042 B2 | 3/2002 | Srinivasan et al. |
| 6,363,525 B1 | 3/2002 | Dougherty et al. |
| 6,381,582 B1 | 4/2002 | Walker et al. |
| 6,388,714 B1 | 5/2002 | Schein et al. |
| 6,389,593 B1 | 5/2002 | Yamagishi |
| 6,392,710 B1 | 5/2002 | Gonsalves et al. |
| 6,396,546 B1 | 5/2002 | Alten et al. |
| 6,400,407 B1 | 6/2002 | Zigmond et al. |
| 6,405,371 B1 | 6/2002 | Oosterhout et al. |
| 6,408,437 B1 | 6/2002 | Hendricks et al. |
| 6,411,308 B1 | 6/2002 | Blonstein et al. |
| 6,412,110 B1 | 6/2002 | Schein et al. |
| 6,418,556 B1 | 7/2002 | Bennington et al. |
| 6,421,067 B1 | 7/2002 | Kamen et al. |
| 6,437,836 B1 | 8/2002 | Huang et al. |
| 6,441,832 B1 | 8/2002 | Tao et al. |
| 6,446,261 B1 * | 9/2002 | Rosser ............................ 725/34 |
| 6,453,471 B1 | 9/2002 | Klosterman |
| 6,463,585 B1 | 10/2002 | Hendricks et al. |
| 6,469,753 B1 | 10/2002 | Klosterman et al. |
| 6,470,497 B1 | 10/2002 | Ellis et al. |
| 6,473,559 B1 | 10/2002 | Knudson et al. |
| 6,477,579 B1 | 11/2002 | Kunkel et al. |
| 6,477,705 B1 | 11/2002 | Yuen et al. |
| 6,486,920 B2 | 11/2002 | Arai et al. |
| 6,498,895 B2 | 12/2002 | Young et al. |
| 6,505,348 B1 | 1/2003 | Knowles et al. |
| 6,515,680 B1 | 2/2003 | Hendricks et al. |
| 6,539,548 B1 | 3/2003 | Hendricks et al. |
| 6,546,556 B1 | 4/2003 | Kataoka et al. |
| 6,554,708 B1 | 4/2003 | Brenner et al. |
| 6,564,378 B1 | 5/2003 | Satterfield et al. |
| 6,564,379 B1 | 5/2003 | Knudson et al. |
| 6,574,424 B1 | 6/2003 | Dimitri et al. |
| 6,583,825 B1 | 6/2003 | Yuen et al. |
| 6,588,013 B1 | 7/2003 | Lumley et al. |
| 6,600,364 B1 | 7/2003 | Liang et al. |
| 6,600,503 B2 | 7/2003 | Stautner et al. |
| 6,606,128 B2 | 8/2003 | Hanafee et al. |
| 6,622,306 B1 | 9/2003 | Kamada |
| 6,631,523 B1 | 10/2003 | Matthews, III et al. |
| 6,651,251 B1 | 11/2003 | Shoff et al. |
| 6,660,503 B2 | 12/2003 | Kierulff |
| 6,665,869 B1 | 12/2003 | Ellis et al. |
| 6,671,882 B1 | 12/2003 | Murphy et al. |
| 6,687,906 B1 | 2/2004 | Yuen et al. |
| 6,698,020 B1 | 2/2004 | Zigmond et al. |
| 6,732,369 B1 | 5/2004 | Schein et al. |
| 6,735,625 B1 | 5/2004 | Ponna |
| 6,738,978 B1 | 5/2004 | Hendricks et al. |
| 6,742,183 B1 | 5/2004 | Reynolds et al. |
| 6,751,800 B1 | 6/2004 | Fukuda et al. |
| 6,756,997 B1 | 6/2004 | Ward, III et al. |
| 6,757,906 B1 | 6/2004 | Look et al. |
| 6,799,326 B2 | 9/2004 | Boylan, III et al. |
| 6,799,327 B1 | 9/2004 | Reynolds et al. |
| 6,813,775 B1 | 11/2004 | Finseth et al. |
| 6,820,278 B1 | 11/2004 | Ellis |
| 6,828,993 B1 | 12/2004 | Hendricks et al. |
| 6,832,385 B2 | 12/2004 | Young et al. |
| 6,837,789 B2 | 1/2005 | Garahi et al. |
| 6,850,693 B2 | 2/2005 | Young et al. |
| 6,868,551 B1 | 3/2005 | Lawler et al. |
| 6,879,963 B1 | 4/2005 | Rosenberg |
| 6,898,762 B2 | 5/2005 | Ellis et al. |
| 6,938,208 B2 | 8/2005 | Reichardt |
| 6,950,624 B2 | 9/2005 | Kim et al. |
| 6,973,669 B2 | 12/2005 | Daniels |
| 6,983,478 B1 | 1/2006 | Grauch et al. |
| 7,003,792 B1 | 2/2006 | Yuen |
| 7,028,326 B1 | 4/2006 | Westlake et al. |
| 7,062,451 B1 | 6/2006 | Dentel |
| 7,069,576 B1 | 6/2006 | Knudson et al. |
| 7,096,185 B2 | 8/2006 | Reichardt et al. |
| 7,098,958 B2 | 8/2006 | Wredenhagen et al. |
| 7,159,235 B2 | 1/2007 | Son et al. |
| 7,165,098 B1 | 1/2007 | Boyer et al. |
| 7,185,355 B1 | 2/2007 | Ellis et al. |
| 7,213,071 B2 | 5/2007 | DeLima et al. |
| 7,229,354 B2 | 6/2007 | McNutt et al. |
| 7,237,253 B1 | 6/2007 | Blackketter et al. |
| 7,248,778 B1 | 7/2007 | Anderson et al. |
| 7,263,500 B2 | 8/2007 | Deal |
| 7,266,833 B2 | 9/2007 | Ward, III et al. |
| 7,293,276 B2 | 11/2007 | Phillips et al. |
| 7,328,450 B2 | 2/2008 | Macrae et al. |
| 7,337,456 B1 * | 2/2008 | Nihei ............................ 725/35 |
| 7,392,532 B2 | 6/2008 | White et al. |
| 7,480,929 B2 | 1/2009 | Klosterman et al. |
| 7,738,774 B2 | 6/2010 | Iwata et al. |
| 7,840,977 B2 | 11/2010 | Walker et al. |
| 8,103,546 B1 * | 1/2012 | Des Jardins et al. ........ 705/14.73 |
| 8,121,901 B2 | 2/2012 | Blanchard et al. |
| 8,336,071 B2 | 12/2012 | Ward, III et al. |
| 2001/0001160 A1 | 5/2001 | Shoff et al. |
| 2001/0007147 A1 | 7/2001 | Goldschmidt Iki et al. |
| 2001/0018727 A1 | 8/2001 | Ando et al. |
| 2001/0029610 A1 | 10/2001 | Corvin et al. |
| 2001/0034237 A1 | 10/2001 | Garahi |
| 2001/0042246 A1 | 11/2001 | Yuen et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0002483 A1 | 1/2002 | Siegel et al. |
| 2002/0016818 A1 | 2/2002 | Kirani et al. |
| 2002/0042913 A1 | 4/2002 | Ellis et al. |
| 2002/0042914 A1 | 4/2002 | Walker et al. |
| 2002/0042918 A1 | 4/2002 | Townsend et al. |
| 2002/0049742 A1 * | 4/2002 | Chan et al. .................. 707/1 |
| 2002/0049973 A1 | 4/2002 | Alten et al. |
| 2002/0056087 A1 | 5/2002 | Berezowski et al. |
| 2002/0059602 A1 | 5/2002 | Macrae et al. |
| 2002/0059621 A1 | 5/2002 | Thomas et al. |
| 2002/0067376 A1 * | 6/2002 | Martin et al. ................ 345/810 |
| 2002/0073424 A1 | 6/2002 | Ward, III et al. |
| 2002/0083439 A1 | 6/2002 | Eldering |
| 2002/0091568 A1 * | 7/2002 | Kraft et al. .................... 705/14 |
| 2002/0092017 A1 | 7/2002 | Klosterman et al. |
| 2002/0120933 A1 | 8/2002 | Knudson et al. |
| 2002/0124249 A1 | 9/2002 | Shintani et al. |
| 2002/0133405 A1 | 9/2002 | Newnam et al. |
| 2002/0143565 A1 * | 10/2002 | Headings et al. ................ 705/1 |
| 2002/0147687 A1 | 10/2002 | Breiter et al. |
| 2002/0152458 A1 | 10/2002 | Eyer et al. |
| 2002/0174430 A1 | 11/2002 | Ellis et al. |
| 2002/0194011 A1 | 12/2002 | Boies et al. |
| 2003/0005432 A1 | 1/2003 | Ellis et al. |
| 2003/0005445 A1 | 1/2003 | Schein et al. |
| 2003/0014752 A1 | 1/2003 | Zaslavsky et al. |
| 2003/0020744 A1 | 1/2003 | Ellis et al. |
| 2003/0033543 A1 | 2/2003 | Hubbard et al. |
| 2003/0036962 A1 | 2/2003 | Holt |
| 2003/0046057 A1 | 3/2003 | Okunishi et al. |
| 2003/0065805 A1 * | 4/2003 | Barnes, Jr. .................... 709/231 |
| 2003/0066084 A1 | 4/2003 | Kaars |

(56) References Cited

U.S. PATENT DOCUMENTS

| | | |
|---|---|---|
| 2003/0079227 A1 | 4/2003 | Knowles et al. |
| 2003/0084453 A1 | 5/2003 | Laughlin et al. |
| 2003/0086023 A1 | 5/2003 | Chung et al. |
| 2003/0110499 A1 | 6/2003 | Knudson et al. |
| 2003/0145321 A1 | 7/2003 | Bates et al. |
| 2003/0149980 A1 | 8/2003 | Hassell et al. |
| 2003/0149988 A1 | 8/2003 | Ellis et al. |
| 2003/0152096 A1 | 8/2003 | Chapman |
| 2003/0156108 A1 | 8/2003 | Vetro |
| 2003/0162096 A1 | 8/2003 | Michot et al. |
| 2003/0163813 A1 | 8/2003 | Klosterman et al. |
| 2003/0164858 A1 | 9/2003 | Klosterman et al. |
| 2003/0167473 A1 | 9/2003 | Klosterman et al. |
| 2003/0177498 A1 | 9/2003 | Ellis et al. |
| 2003/0182659 A1 | 9/2003 | Ellis et al. |
| 2003/0182660 A1 | 9/2003 | Ellis et al. |
| 2003/0182661 A1 | 9/2003 | Ellis et al. |
| 2003/0188310 A1 | 10/2003 | Klosterman et al. |
| 2003/0188311 A1 | 10/2003 | Yuen et al. |
| 2003/0188314 A1 | 10/2003 | Ellis et al. |
| 2003/0196201 A1 | 10/2003 | Schein et al. |
| 2003/0196203 A1 | 10/2003 | Ellis et al. |
| 2003/0204847 A1 | 10/2003 | Ellis et al. |
| 2003/0204849 A1 | 10/2003 | Watanabe |
| 2003/0206710 A1 | 11/2003 | Ferman et al. |
| 2003/0208756 A1 | 11/2003 | Macrae et al. |
| 2003/0208758 A1 | 11/2003 | Schein et al. |
| 2003/0212759 A1 | 11/2003 | Wu |
| 2004/0003407 A1 | 1/2004 | Hanafee et al. |
| 2004/0008971 A1 | 1/2004 | Young et al. |
| 2004/0049787 A1 | 3/2004 | Maissel et al. |
| 2004/0054787 A1 | 3/2004 | Kjellberg et al. |
| 2004/0078809 A1 | 4/2004 | Drazin |
| 2004/0107236 A1 | 6/2004 | Nakagawa et al. |
| 2004/0111742 A1 | 6/2004 | Hendricks et al. |
| 2004/0111745 A1 | 6/2004 | Schein et al. |
| 2004/0117831 A1 | 6/2004 | Ellis et al. |
| 2004/0128686 A1 | 7/2004 | Boyer et al. |
| 2004/0136698 A1 | 7/2004 | Mock |
| 2004/0139465 A1 | 7/2004 | Matthews, III et al. |
| 2004/0168189 A1 | 8/2004 | Reynolds et al. |
| 2004/0181814 A1 | 9/2004 | Ellis et al. |
| 2004/0186901 A1 | 9/2004 | Guigui |
| 2004/0193488 A1* | 9/2004 | Khoo et al. .................... 705/14 |
| 2004/0194131 A1 | 9/2004 | Ellis et al. |
| 2004/0194138 A1 | 9/2004 | Boylan, III et al. |
| 2004/0210935 A1 | 10/2004 | Schein et al. |
| 2004/0215757 A1 | 10/2004 | Butler |
| 2004/0226034 A1 | 11/2004 | Kaczowka et al. |
| 2004/0237104 A1 | 11/2004 | Cooper et al. |
| 2004/0254851 A1 | 12/2004 | Himeno |
| 2004/0267965 A1 | 12/2004 | Vasudevan et al. |
| 2005/0010671 A1 | 1/2005 | Grannan |
| 2005/0010949 A1 | 1/2005 | Ward et al. |
| 2005/0015804 A1 | 1/2005 | LaJoie et al. |
| 2005/0028207 A1 | 2/2005 | Finseth |
| 2005/0028208 A1 | 2/2005 | Ellis et al. |
| 2005/0044567 A1 | 2/2005 | Young et al. |
| 2005/0049933 A1* | 3/2005 | Upendran et al. ............. 705/26 |
| 2005/0058433 A1 | 3/2005 | Young et al. |
| 2005/0060743 A1 | 3/2005 | Ohnuma et al. |
| 2005/0071876 A1 | 3/2005 | van Beek |
| 2005/0097622 A1 | 5/2005 | Zigmond et al. |
| 2005/0108107 A1 | 5/2005 | Grayson et al. |
| 2005/0120373 A1 | 6/2005 | Thomas et al. |
| 2005/0132264 A1 | 6/2005 | Joshi et al. |
| 2005/0144499 A1 | 6/2005 | Narahara et al. |
| 2005/0149964 A1 | 7/2005 | Thomas et al. |
| 2005/0155056 A1 | 7/2005 | Knee et al. |
| 2005/0157217 A1 | 7/2005 | Hendricks |
| 2005/0158017 A1 | 7/2005 | Maetz et al. |
| 2005/0198668 A1 | 9/2005 | Yuen et al. |
| 2005/0203809 A1 | 9/2005 | Stone et al. |
| 2005/0204382 A1 | 9/2005 | Ellis |
| 2005/0204388 A1 | 9/2005 | Knudson et al. |
| 2005/0216936 A1 | 9/2005 | Knudson et al. |
| 2005/0229213 A1 | 10/2005 | Ellis et al. |
| 2005/0229214 A1 | 10/2005 | Young et al. |
| 2005/0235322 A1 | 10/2005 | Ellis et al. |
| 2005/0235323 A1 | 10/2005 | Ellis et al. |
| 2005/0240968 A1 | 10/2005 | Knudson et al. |
| 2005/0244138 A1 | 11/2005 | O'Connor et al. |
| 2005/0246451 A1 | 11/2005 | Silverman et al. |
| 2005/0251822 A1 | 11/2005 | Knowles et al. |
| 2005/0251827 A1 | 11/2005 | Ellis et al. |
| 2005/0251828 A1 | 11/2005 | Young et al. |
| 2005/0283796 A1 | 12/2005 | Flickinger |
| 2006/0015888 A1 | 1/2006 | Shih |
| 2006/0018625 A1 | 1/2006 | Johnson et al. |
| 2006/0031883 A1 | 2/2006 | Ellis et al. |
| 2006/0037054 A1 | 2/2006 | McDowell et al. |
| 2006/0064728 A1 | 3/2006 | Son et al. |
| 2006/0074769 A1 | 4/2006 | Looney |
| 2006/0080415 A1 | 4/2006 | Tu |
| 2006/0085835 A1 | 4/2006 | Istvan et al. |
| 2006/0095339 A1 | 5/2006 | Hayashi et al. |
| 2006/0095942 A1 | 5/2006 | van Beek |
| 2006/0101417 A1 | 5/2006 | Hoh |
| 2006/0190966 A1 | 8/2006 | McKissick et al. |
| 2006/0215650 A1 | 9/2006 | Wollmershauser et al. |
| 2006/0238648 A1 | 10/2006 | Wogsberg |
| 2006/0248555 A1 | 11/2006 | Eldering |
| 2006/0248570 A1 | 11/2006 | Witwer |
| 2006/0253874 A1 | 11/2006 | Stark et al. |
| 2006/0271953 A1 | 11/2006 | Jacoby et al. |
| 2007/0016847 A1 | 1/2007 | Reichardt et al. |
| 2007/0016926 A1 | 1/2007 | Ward et al. |
| 2007/0022442 A1 | 1/2007 | Gil et al. |
| 2007/0028267 A1 | 2/2007 | Ostojic et al. |
| 2007/0033613 A1 | 2/2007 | Ward et al. |
| 2007/0039033 A1 | 2/2007 | Ota |
| 2007/0058924 A1 | 3/2007 | Yeh |
| 2007/0061197 A1 | 3/2007 | Ramer et al. |
| 2007/0067804 A1 | 3/2007 | Six et al. |
| 2007/0089160 A1 | 4/2007 | Ando |
| 2007/0113246 A1 | 5/2007 | Xiong |
| 2007/0156521 A1 | 7/2007 | Yates |
| 2007/0156539 A1 | 7/2007 | Yates |
| 2007/0157234 A1 | 7/2007 | Walker et al. |
| 2007/0157240 A1 | 7/2007 | Walker |
| 2007/0157241 A1 | 7/2007 | Walker et al. |
| 2007/0157260 A1 | 7/2007 | Walker |
| 2007/0157266 A1 | 7/2007 | Ellis et al. |
| 2007/0157281 A1 | 7/2007 | Ellis et al. |
| 2007/0159018 A1 | 7/2007 | Carpenter et al. |
| 2007/0162934 A1 | 7/2007 | Roop et al. |
| 2007/0174774 A1 | 7/2007 | Lerman et al. |
| 2007/0186240 A1 | 8/2007 | Ward et al. |
| 2007/0226365 A1 | 9/2007 | Hildreth |
| 2008/0051076 A1 | 2/2008 | O'Shaughnessy et al. |
| 2008/0060001 A1 | 3/2008 | Logan et al. |
| 2008/0127265 A1 | 5/2008 | Ward et al. |
| 2008/0127266 A1 | 5/2008 | Ward et al. |
| 2008/0178221 A1 | 7/2008 | Schein et al. |
| 2008/0184315 A1 | 7/2008 | Ellis et al. |
| 2008/0189744 A1 | 8/2008 | Schein et al. |
| 2008/0235725 A1 | 9/2008 | Hendricks |
| 2008/0279481 A1 | 11/2008 | Ando et al. |
| 2008/0301732 A1 | 12/2008 | Archer |
| 2010/0211636 A1 | 8/2010 | Starkenburg et al. |
| 2011/0179139 A1 | 7/2011 | Starkenburg et al. |
| 2011/0179454 A1 | 7/2011 | Yates |

FOREIGN PATENT DOCUMENTS

| | | |
|---|---|---|
| CA | 1030505 | 5/1978 |
| CA | 1187197 | 5/1985 |
| CA | 1188811 | 6/1985 |
| CA | 1196082 | 10/1985 |
| CA | 1200911 | 2/1986 |
| CA | 2151458 | 6/1994 |
| CA | 2164608 | 12/1994 |
| CA | 2297039 | 1/1999 |
| CA | 2312326 | 6/1999 |

(56) References Cited

FOREIGN PATENT DOCUMENTS

| | | |
|---|---|---|
| CN | 1555191 | 12/2004 |
| CN | 1832430 | 9/2006 |
| DE | 2918846 | 11/1980 |
| DE | 3246225 | 6/1984 |
| DE | 3337204 | 4/1985 |
| DE | 3621263 | 1/1988 |
| DE | 3909334 | 9/1990 |
| DE | 4201031 | 7/1993 |
| DE | 4440419 | 5/1996 |
| DE | 19531121 | 2/1997 |
| DE | 19740079 | 3/1999 |
| DE | 19931046 | 1/2001 |
| EP | 0239884 | 10/1987 |
| EP | 0396062 | 11/1990 |
| EP | 0401930 | 12/1990 |
| EP | 0408892 | 1/1991 |
| EP | 0420123 | 4/1991 |
| EP | 0424469 | 5/1991 |
| EP | 0424648 | 5/1991 |
| EP | 0444496 | 9/1991 |
| EP | 0447968 | 9/1991 |
| EP | 0532322 | 3/1993 |
| EP | 0550911 | 7/1993 |
| EP | 0560593 | 9/1993 |
| EP | 0572090 | 12/1993 |
| EP | 0620689 | 10/1994 |
| EP | 0673164 | 9/1995 |
| EP | 0682452 | 11/1995 |
| EP | 0721253 | 7/1996 |
| EP | 0725539 | 8/1996 |
| EP | 0752767 | 1/1997 |
| EP | 0753964 | 1/1997 |
| EP | 0762751 | 3/1997 |
| EP | 0762756 | 3/1997 |
| EP | 0763938 | 3/1997 |
| EP | 0772360 | 5/1997 |
| EP | 0774866 | 5/1997 |
| EP | 0775417 | 5/1997 |
| EP | 0784405 | 7/1997 |
| EP | 0805594 | 11/1997 |
| EP | 0822718 | 2/1998 |
| EP | 0827340 | 3/1998 |
| EP | 0834798 | 4/1998 |
| EP | 0843468 | 5/1998 |
| EP | 0848554 | 6/1998 |
| EP | 0849948 | 6/1998 |
| EP | 0851681 | 7/1998 |
| EP | 0852442 | 7/1998 |
| EP | 0854645 | 7/1998 |
| EP | 0854654 | 7/1998 |
| EP | 0874524 | 10/1998 |
| EP | 0880856 | 12/1998 |
| EP | 0905985 | 3/1999 |
| EP | 0924927 | 6/1999 |
| EP | 0935393 | 8/1999 |
| EP | 0940985 | 9/1999 |
| EP | 0944253 | 9/1999 |
| EP | 0963119 | 12/1999 |
| EP | 0988876 | 3/2000 |
| EP | 1036466 | 9/2000 |
| EP | 1095504 | 5/2001 |
| EP | 1280122 | 1/2003 |
| EP | 1387272 | 2/2004 |
| FR | 2662895 | 12/1991 |
| FR | 2855695 A1 | 12/2004 |
| GB | 1554411 | 10/1979 |
| GB | 2034995 | 6/1980 |
| GB | 2126002 | 3/1984 |
| GB | 2185670 | 7/1987 |
| GB | 2256546 | 12/1992 |
| GB | 2309134 | 7/1997 |
| HK | 1035285 | 3/2005 |
| JP | 58-137334 | 8/1983 |
| JP | 58-196738 | 11/1983 |
| JP | 58-210776 | 12/1983 |
| JP | 59-141878 | 8/1984 |
| JP | 60-61935 | 4/1985 |
| JP | 61-050470 | 3/1986 |
| JP | 61-074476 | 4/1986 |
| JP | 62-060370 | 3/1987 |
| JP | 62-060384 | 3/1987 |
| JP | 63-234679 | 9/1988 |
| JP | 01-307944 | 12/1989 |
| JP | 2838892 | 12/1989 |
| JP | 02-048879 | 2/1990 |
| JP | 03-063990 | 3/1991 |
| JP | 04-227380 | 8/1992 |
| JP | 05-183826 | 7/1993 |
| JP | 05-284437 | 10/1993 |
| JP | 06-021907 | 1/1994 |
| JP | 07-020254 | 1/1995 |
| JP | 07-050259 | 2/1995 |
| JP | 07-076592 | 3/1995 |
| JP | 07-123326 | 5/1995 |
| JP | 07-147657 | 6/1995 |
| JP | 07-288759 | 10/1995 |
| JP | 07-321748 | 12/1995 |
| JP | 08-32528 | 2/1996 |
| JP | 08-32538 | 2/1996 |
| JP | 08-125497 | 5/1996 |
| JP | 08-251122 | 9/1996 |
| JP | 08-275077 | 10/1996 |
| JP | 09-037151 | 2/1997 |
| JP | 09-037168 | 2/1997 |
| JP | 09-037172 | 2/1997 |
| JP | 09-102827 | 4/1997 |
| JP | 10-042242 | 2/1998 |
| JP | 10-112087 | 4/1998 |
| JP | 10-143340 | 5/1998 |
| JP | 10-143349 | 5/1998 |
| JP | 10-164487 | 6/1998 |
| JP | 10-512420 | 11/1998 |
| JP | 10-320413 | 12/1998 |
| JP | 2001-513595 | 9/2001 |
| JP | 2002-055826 | 2/2002 |
| JP | 2002-279969 | 9/2002 |
| JP | 2003-162476 | 6/2003 |
| JP | 2004-342044 | 12/2004 |
| JP | 2004-343321 | 12/2004 |
| JP | 2004-355109 | 12/2004 |
| JP | 2005-215922 | 8/2005 |
| JP | 2005-339523 | 12/2005 |
| JP | 2006-127145 | 5/2006 |
| JP | 4062577 | 3/2008 |
| WO | WO-8601962 | 3/1986 |
| WO | WO-8703766 | 6/1987 |
| WO | WO-8804057 | 6/1988 |
| WO | WO-8804507 | 6/1988 |
| WO | WO-8902682 | 3/1989 |
| WO | WO-8903085 | 4/1989 |
| WO | WO-8912370 | 12/1989 |
| WO | WO-9000847 | 1/1990 |
| WO | WO-9001243 | 2/1990 |
| WO | WO-9015507 | 12/1990 |
| WO | WO-9100670 | 1/1991 |
| WO | WO-9107050 | 5/1991 |
| WO | WO-9118476 | 11/1991 |
| WO | WO-9204801 | 3/1992 |
| WO | WO-9222983 | 12/1992 |
| WO | WO-9304473 | 3/1993 |
| WO | WO-9305452 | 3/1993 |
| WO | WO-9308542 | 4/1993 |
| WO | WO-9311638 | 6/1993 |
| WO | WO-9311639 | 6/1993 |
| WO | WO-9311640 | 6/1993 |
| WO | WO-9323957 | 11/1993 |
| WO | WO-9413107 | 6/1994 |
| WO | WO-9414281 | 6/1994 |
| WO | WO-9414282 | 6/1994 |
| WO | WO-9414283 | 6/1994 |
| WO | WO-9414284 | 6/1994 |
| WO | WO-9421085 | 9/1994 |
| WO | WO-9423383 | 10/1994 |
| WO | WO-9429811 | 12/1994 |

(56) References Cited

FOREIGN PATENT DOCUMENTS

| | | |
|---|---|---|
| WO | WO-9501056 | 1/1995 |
| WO | WO-9501058 | 1/1995 |
| WO | WO-9501059 | 1/1995 |
| WO | WO-9504431 | 2/1995 |
| WO | WO-9506389 | 3/1995 |
| WO | WO-9507003 | 3/1995 |
| WO | WO-9510910 | 4/1995 |
| WO | WO-9511567 | 4/1995 |
| WO | WO-9515649 | 6/1995 |
| WO | WO-9515657 | 6/1995 |
| WO | WO-9515658 | 6/1995 |
| WO | WO-9516568 | 6/1995 |
| WO | WO-9518449 | 7/1995 |
| WO | WO-9519092 | 7/1995 |
| WO | WO-9526608 | 10/1995 |
| WO | WO-9528055 | 10/1995 |
| WO | WO-9528799 | 10/1995 |
| WO | WO-9530961 | 11/1995 |
| WO | WO-9531069 | 11/1995 |
| WO | WO-9532583 | 11/1995 |
| WO | WO-9532584 | 11/1995 |
| WO | WO-9532585 | 11/1995 |
| WO | WO-9532587 | 11/1995 |
| WO | WO-9607270 | 3/1996 |
| WO | WO-9608109 | 3/1996 |
| WO | WO-9608113 | 3/1996 |
| WO | WO-9609721 | 3/1996 |
| WO | WO-9613932 | 5/1996 |
| WO | WO-9613935 | 5/1996 |
| WO | WO-9617467 | 6/1996 |
| WO | WO-9617473 | 6/1996 |
| WO | WO-9621990 | 7/1996 |
| WO | WO-9625821 | 8/1996 |
| WO | WO-9626605 | 8/1996 |
| WO | WO-9627270 | 9/1996 |
| WO | WO-9627982 | 9/1996 |
| WO | WO-9631980 | 10/1996 |
| WO | WO-9633572 | 10/1996 |
| WO | WO-9634467 | 10/1996 |
| WO | WO-9634486 | 10/1996 |
| WO | WO-9634491 | 10/1996 |
| WO | WO-9636172 | 11/1996 |
| WO | WO-9638799 | 12/1996 |
| WO | WO-9641471 | 12/1996 |
| WO | WO-9641472 | 12/1996 |
| WO | WO-9641477 | 12/1996 |
| WO | WO-9641478 | 12/1996 |
| WO | WO-9702702 | 1/1997 |
| WO | WO-9704595 | 2/1997 |
| WO | WO-9707656 | 3/1997 |
| WO | WO-9713368 | 4/1997 |
| WO | WO-9717774 | 5/1997 |
| WO | WO-9718675 | 5/1997 |
| WO | WO-9726612 | 7/1997 |
| WO | WO-9731479 | 8/1997 |
| WO | WO-9731480 | 8/1997 |
| WO | WO-9732434 | 9/1997 |
| WO | WO-9734413 | 9/1997 |
| WO | WO-9734414 | 9/1997 |
| WO | WO-9740623 | 10/1997 |
| WO | WO-9741673 | 11/1997 |
| WO | WO-9742763 | 11/1997 |
| WO | WO-9746016 | 12/1997 |
| WO | WO-9746943 | 12/1997 |
| WO | WO-9747124 | 12/1997 |
| WO | WO-9748228 | 12/1997 |
| WO | WO-9748230 | 12/1997 |
| WO | WO-9749237 | 12/1997 |
| WO | WO-9749241 | 12/1997 |
| WO | WO-9749242 | 12/1997 |
| WO | WO-9801995 | 1/1998 |
| WO | WO-9806219 | 2/1998 |
| WO | WO-9807277 | 2/1998 |
| WO | WO-9810589 | 3/1998 |
| WO | WO-9812872 | 3/1998 |
| WO | WO-9816056 | 4/1998 |
| WO | WO-9816062 | 4/1998 |
| WO | WO-9817064 | 4/1998 |
| WO | WO-9820675 | 5/1998 |
| WO | WO-9826569 | 6/1998 |
| WO | WO-9826584 | 6/1998 |
| WO | WO-9826594 | 6/1998 |
| WO | WO-9826596 | 6/1998 |
| WO | WO-9827723 | 6/1998 |
| WO | WO-9828906 | 7/1998 |
| WO | WO-9831148 | 7/1998 |
| WO | WO-9838831 | 9/1998 |
| WO | WO-9839893 | 9/1998 |
| WO | WO-9841020 | 9/1998 |
| WO | WO-9843183 | 10/1998 |
| WO | WO-9847279 | 10/1998 |
| WO | WO-9847283 | 10/1998 |
| WO | WO-9847287 | 10/1998 |
| WO | WO-9847289 | 10/1998 |
| WO | WO-9848566 | 10/1998 |
| WO | WO-9856172 | 12/1998 |
| WO | WO-9901984 | 1/1999 |
| WO | WO-9903267 | 1/1999 |
| WO | WO-9904561 | 1/1999 |
| WO | WO-9907142 | 2/1999 |
| WO | WO-9914947 | 3/1999 |
| WO | WO-9918722 | 4/1999 |
| WO | WO-9922502 | 5/1999 |
| WO | WO-9929109 | 6/1999 |
| WO | WO-9930491 | 6/1999 |
| WO | WO-9931480 | 6/1999 |
| WO | WO-9945700 | 9/1999 |
| WO | WO-9945701 | 9/1999 |
| WO | WO-9945702 | 9/1999 |
| WO | WO-9952285 | 10/1999 |
| WO | WO-9956466 | 11/1999 |
| WO | WO-9956473 | 11/1999 |
| WO | WO-9960783 | 11/1999 |
| WO | WO-9960789 | 11/1999 |
| WO | WO-9960790 | 11/1999 |
| WO | WO-0004706 | 1/2000 |
| WO | WO-0004708 | 1/2000 |
| WO | WO-0005889 | 2/2000 |
| WO | WO-0011865 | 3/2000 |
| WO | WO-0013415 | 3/2000 |
| WO | WO-0016548 | 3/2000 |
| WO | WO-0027122 | 5/2000 |
| WO | WO-0028734 | 5/2000 |
| WO | WO-0033160 | 6/2000 |
| WO | WO-0033224 | 6/2000 |
| WO | WO-0033560 | 6/2000 |
| WO | WO-0033573 | 6/2000 |
| WO | WO-0049801 | 8/2000 |
| WO | WO-0079798 | 12/2000 |
| WO | WO-0101677 | 1/2001 |
| WO | WO-0106784 | 1/2001 |
| WO | WO-0115438 | 3/2001 |
| WO | WO-0135662 | 5/2001 |
| WO | WO-0186511 | 11/2001 |
| WO | WO-0189213 | 11/2001 |
| WO | WO-0231731 | 4/2002 |
| WO | WO-02084992 | 10/2002 |
| WO | WO-2004019610 | 3/2004 |
| WO | WO-2004/061699 | 7/2004 |
| WO | WO-2004059528 | 7/2004 |
| WO | 2004088983 A2 | 10/2004 |
| WO | WO-2007039029 | 4/2007 |
| WO | WO-2007078503 | 7/2007 |
| WO | WO-2008042242 | 4/2008 |

OTHER PUBLICATIONS archive.org provided screenshots from ign.com (www.ign.com, gameboy.ign.com, psp.ign.com) from Dec. 5, 2004.
International Search Report PCT/US2006/046090.
Daisy Whitney, "Interactive Ads Loom Large in 2006," *Television Week*, 24(48):16 (Chicago 2005).
Jaidev, "XSLT—A Wired and Wireless Case Study," http://csharpcomputing.com/XMLTutorial/Lesson15.htm.

(56) References Cited

OTHER PUBLICATIONS

John Horn, "You talking to me?" Cells ringing in movie dialogue; Studios, writers hope for new cash cow Jolie's line, "Still alive, baby?" among offerings; [ONT Edition] Toronto Star, p. C-07, Aug. 26, 2005.
Mehta, Stephanie N., "Wagner's Ring? Way Too Long," Fortune Magazine, Dec. 12, 2005.
Papers Delivered (Part 1), 61st National Conference, Information Processing Society of Japan, Oct. 3-5, 2000.
Pogue, D., "State of the Art: for TiVo and Replay, New Reach," N.Y. Times, May 29, 2003.
Randerson, J., "Let Software Catch the Game for You," New Scientist, Jul. 3, 2004.
U.S. Appl. No. 09/330,792, filed Jun. 11, 1999, Knudson et al.
U.S. Appl. No. 09/332,244, filed Jun. 11, 1999, Ellis et al.
U.S. Appl. No. 09/356,268, filed Jul. 16, 1999, Rudnick et al.
U.S. Appl. No. 11/324,202, filed Dec. 29, 2005, Yates.
"2720R Satellite Receiver User's Guide," General Instrument, 1991, pp. 58-61.
"Addressable Converters: A New Development at CableData," Via Cable, vol. 1, No. 12, Dec. 1981.
"Bell Atlantic Buys Cable TV Company for $22bn," Financial Times (London), Oct. 14, 1993 p. 65.
"Cable Television Equipment," Jerrold Communications Publication, dated 1992 and 1993, pp. 8-2.1 to 8-6 and 8-14.1 to 8-14.3.
Creation/Modification of the Audio Signal Processor Setup for a PC Audio Editor, IBM Technical Disclosure Bulletin, vol. 30, No. 10, Mar. 1988, pp. 367-376.
"D2B-Home-Bus Für Audio and Video," Selektor, Apr. 1990, pp. 10, 12. (English langauge translation attached.).
"Dial M for Movie", Funkschau 11/94 Perspektiven, Video on Demand, pp. 78-79. (English language translation attached).
"Digital Video Broadcasting (DVB); DVB specification for data broadcasting", European Telecommunications Standards Institute, Draft EN 301 192 V1.2.1 (Jan. 1999).
"Duck Tales," (1987) [TV Series 1987-1990], Internet Movie Database (IMDB), retrieved from the internet at http://www.imdb.com/title/tt0092345/, [Retrieved on Apr. 7, 2007].
"Electronic Programme Guide (EPG); Protocol for a TV Guide using electronic data transmission," by European Telecommunication Standards Institute, May 1997, Valbonne, France, publication No. ETS 300 707.
"Enhanced Content Specification," "ATVEF," from the internet at http://www.atvef.com/library/spec.html, printed Aug. 22, 2001, the document bears a Copyright date of 1998, 1999, 2000.
"European Telecommunications Standards: Digital Broadcasting Systems for Television Sound and Data Services; Specification for Service Information (SI) in Digital Video Broadcasting (DVB) Systems," European Telecommunications Standards Institute, Dec. 1994, ETS 300 468.
"Getting Started" Installation Guide, "Using StarSight 1" Manual, and Remote Control "Quick Reference Guide," copyright 1994.
"Inside i-Guide™, User's Reference Manual," TV Guide, DVR Recording as implemented in TVGI A23 program guide, undated.
"Interactive Computer Conference Server," IBM Technical Disclosure Bulletin, vol. 34, No. 7A, Dec. 1991, pp. 375-377.
"Interface Device for Conventional TVs to Improve Functionality," IBM Technical Disclosure Bulletin, vol. 36, No. 7, Jul. 1993, pp. 53-54.
"Lists> What's on Tonite! TV Listings (fwd)," Internet article (On line), from Net-Happenings Moderator, Jan. 28, 1995, XP 002378869A [Retrieved on Apr. 28, 2006].
"MSI Datacasting Systems," TV Communications Journal, Jan. 1973.
"Open TV für interaktives Fernsehen," Trend and Technik, 9-95 RFE, p. 100. (English language translation attached).
"OpenTV Launches OpenStreamer™ Technology for Broadcasters to Deliver First-Ever Real-Time Digital Interactive Television," Apr. 19, 1999, from the internet at http://www.opentv.com/news/openstreamer_press_final.htm, printed on Jun. 28, 1999.

"Prevue Networks and OpenTV(R) Agree to Work Together on Deploying Interactive Program Guides Worldwide," Dec. 3, 1998, from the internet at http://www.opentv.com/news/prevuefinal.htm, printed on Jun. 28, 1999.
"Probe XL Brochure," Autotote System, Inc., Newark, Delaware,the document bears a copyright date of 1993, 57 pgs.
"Technological Examination & Basic Investigative Research Report on Image Databases," Japan Mechanical Engineering Organization, Japan Int'l Society for the Advancement of Image Software, Mar. 1988. (With partial English language translation.).
"Technology: Turn on, tune in and print out—An experimental interactive television service is set to alter our viewing habits," Financial Times (London), Oct. 14, 1993, p. 11.
"The New Media and Broadcast Policy: An Investigation & Research Conference Report on Broadcasting Diversification," Radio Regulatory Bureau, Japan Ministry of Posts & Telecommunications, Mar. 1982.
"TV Listings Functional Spec.," Time Video Information Services, Inc., undated.
"Using StarSight 2," Instruction Manual, StarSight Telecast, Inc., and StarSight CB 1500 Customer Letter, 1994.
"Windows 98 Feature Combines TV, Terminal and the Internet," New York Times, Aug. 18, 1998.
"Prodigy Launches Interactive TV Listing", Public Broadcasting Report, Apr. 22, 1994.
"StarSight Interactive Television Program Guide III," Jim Leftwich and Steve Schein, Functional/Interactional Architecture Specification Document, Orbit Interaction, Palo Alto, California, published before Apr. 19, 1995.
"StarSight Interactive Television Program Guide IV," Jim Leftwich and Steve Schein, Functional/Interactional Architecture Specification Document, Orbit Interaction, Palo Alto, California, published before Apr. 19, 1995.
"TV Guide Online Set for Fall", Entertainment Marketing Letter, Aug. 1994.
Advertisement for "TV Decisions," Cable Vision, Aug. 4, 1986.
Alexander, Michael "Visualizing cleared-off desktops," Computerworld, May 6, 1991, p. 20.
Antonoff, M., "Stay Tuned for Smart TV," Popular Science, vol. 37, No. 5, Nov. 1990, pp. 62-65.
Bach, U. et al., "Multimedia TV Set, Part 1" Radio-Fernsehen Elektronik (RFE), Sep. 1996, pp. 28, 30, 31. (English language translation attached.).
Bach, U. et al., "Multimedia TV Set, Part 2 and Conclusion," Radio-Fernsehen Elektronik (RFE), Oct. 1996, pp. 38-40. (English language translation attached.).
Baer, R.H, "Innovative Add-On TV Products," IEEE Transactions on Consumer Electronics, vol. CE-25, No. 5, Nov. 1979, pp. 765-771.
Bensch, U., "VPV-Videotext Programs Videorecorder," IEEE Paper, Jun. 1988, pp. 788-792.
Bestler, Caitlin "Flexible Data Structures and Interface Rituals for Rapid Development of OSD Applications," Proceedings from Eleven Technical Sessions, 42nd Annual Convention and Exposition of the National Cable Television Association, San Francisco, California, Jun. 6-9, 1993, pp. 223-236.
Brochure, "A New Approach to Addressability," CableData, undated.
Brochure, "Weststar and the Videotoken Network Present the CableComputer," Revised Aug. 15, 1985 (Plaintiff's 334).
Brochure, Time Inc., "Now, Through the Advances of the Computer Age, You Can Get the Information You Want, When You Want It. Instantly and Conveniently, on Your Home TV Screen," Time Teletext, Time Video Information Services, Inc., undated (V 79167-79175).
Brochure, VTN "Videotoken Network, New Dimension Television," Dec. 1985 (Plaintiff's Exhibit 313).
Brugliera, Vito., "Digital On-Screen Display—A New Technology for the Consumer Interface," Symposium Record Cable TV Sessions of the 18th International Television Symposium & Technical Exhibition—Montreux, Switzerland, Jun. 10-15, 1993, pp. 571-586.
Cable Computer User's Guide, Rev. 1, Dec. 1985 (Plaintiff's Exhibit 289).
CableData, Roseville Consumer Presentation, Mar. 1986.

(56) References Cited

OTHER PUBLICATIONS

Carne, E.B., "The Wired Household," IEEE Spectrum, vol. 16, No. 10, Oct. 1979, pp. 61-66.
Chan, Patrick P., "Learning Considerations in User Interface Design: The Room Model," Publication of the Software Portability Laboratory, University of Waterloo, Ontario, Canada, Jul. 1984.
Chang, Yee-Hsiang et al., "An Open-Systems Approach to Video on Demand," IEEE Communications Magazine, May 1994, vol. 32, No. 5, pp. 68-80.
Christodoulakis, Steven and Graham, Stephen "Browsing Within Time-Driven Multimedia Documents," publication of the Institute for Computer Research, University of Waterloo, Waterloo, Ontario, Canada Jul. 1988 pp. 219-227.
Office Actions and Replies from U.S. Appl. No. 10/453,388.
Cox, J. et al, "Extended Services in a Digital Compression System," Proceedings from Eleven Technical Sessions: 42nd Annual Convention and Exposition of the National Cable Television Association, Jun. 1993, pp. 185-191.
Daily, Mack, "Addressable Decoder with Downloadable Operation," Proceedings from the Eleven Technical Sessions, 42nd Annual Convention and Exposition of the NCTA, Jun. 6-9, 1993, pp. 82-89.
Damouny, N.G., "Teletext Decoders—Keeping Up With the Latest Technology Advances," IEEE Transactions on Consumer Electronics, vol. CE-30, No. 3, Aug. 1984, pp. 429-435.
Declaration Under 37 C.F.R. § 1.132 of Richard E. Glassberg, signed Oct. 20, 2006, filed Oct. 24, 2006, from U.S. Appl. No. 10/346,266.
DiRosa, S. "Pinochle's BIGSURF Netguide", Jul. 1995, vol. 3.1 (Sections 18, 21, and 28—renumbered as pp. 1-27).
Edwardson, S.M., & Gee, A., "CEEFAX: A Proposed New Broadcasting Service," Journal of the SMPTE, Jan. 1974, vol. 83, No. 1, pp. 14-19.
Eitz, Gerhard, "Zukünftige Informations-und Datenangebote beim digitalen Fernsehen—EPG Und 'Lesezeichen'," RTM Rundfunktechnische Mitteilungen, Jun. 1997, vol. 41, pp. 67-72. (English language translation attached.).
European Search Report dated Nov. 19, 2002 from European Application No. 98944611.7.
Facsimile Transmission, "The NHK Monthly Report on Broadcast Research," Dec. 1987. (With English language translation of p. 1.).
Hartwig, Rautenberg, Bollmann, "Broadcasting and Processing of Program Guides for Digital TV," SMPTE Journal, pp. 727-732, Oct. 1997.
Hedger, J., "Telesoftware: Home Computing Via Broadcast Teletext," IEEE Transactions on Consumer Electronics, vol. CE-25, No. 3, Jul. 1979, pp. 279-287.
Hoarty, W. Leo, "Multimedia on Cable Television Systems," Symposium Record Cable TV Sessions, 18th International Television Symposium and Technical Exhibition, Montreux, Switzerland, Jun. 10-15, 1993, pp. 555-567.
Hofmann, Neumann, Oberlies, and Schadwinkel, "Videotext Programmiert Videorecorder," Rundfunktechnische Mitteilungen, vol. 26, No. 6, Nov.-Dec. 1982, pp. 254-257 (English language translation attached).
Instructional Manual, "Sonic the Hedgehog," Sega of America, 1992.
Ishii, Hirioshi et al, "Toward an Open Shared Workspace: Computer and Video Fusion Approach of Team Workstation," Communications of the ACM, Dec. 1991, vol. 34 No. 12, pp. 37-50.
Ishii, Hiroshi et al, "Clearface: Translucent Multiuser Interface for TeamWorkStation," ECSCW, Sep. 1991, pp. 6-10.
James, A., "Oracle—Broadcasting the Written Word," Wireless World, Jul. 1973, vol. 79, No. 1453, pp. 314-316.
Judice, C.N., "Move Over Cable, Here Comes Video Via Voice Lines," Network World, Sep. 1986, p. 26.
Kai et al., "Development of a Simulation System for Integrated Services Television," Report from Information Processing Society of Japan, Japan, Sep. 13, 1996, vol. 96, No. 90. (With English language translation of summary.).
Karstad, K., "Microprocessor Control for Color-TV Receivers," IEEE Transactions on Consumer Electronics, vol. CE-26, No. 2, May 1980, pp. 149-155.
Listing of computer code for operating system within the Cable Computer in 1985 (Plaintiff's Exhibit 298).
Listing of computer code for Video HTU Program (Plaintiff's Exhibit 299).
Lowenstein, R.L. and Aller, H.E., "The Inevitable March of Videotex," Technology Review, vol. 88, No. 7, Oct. 1985, p. 22.
M/A-COM, Inc., "Videocipher® II Satellite Descrambler Owner's Manual," dated Prior Feb. 1986, pp. 1-17.
Mannes, G., "Smart Screens: Development of Personal Navigation Systems for TV Viewers," Video Magazine, Dec. 1993.
Mar. 19, 1985 letter from Gerald S. Knapp, Vice President of CableData, to Rodney A. Hansen, President of Weststar Communications, Inc. (Plaintiff's Exhibit 325).
Markowitz, A. "Companies Jump on Interactive Bandwagon," Discount Store News, vol. 32, No. 23, Dec. 6, 1993, pp. 4 and 131.
McKenzie, G.A., "Oracle—An Information Broadcasting Service Using Data Transmission in the Vertical Interval," Journal of the SMPTE, Jan. 1974, vol. 83, No. 1, pp. 6-10.
Merrell, R.G., "Tac-Timer," 1986 NCTA Technical Papers, pp. 203-206.
Neumann, Andreas, "WDR Online Aufbau and Perspektiven Automatisierter Online-Dienste im WDR," RTM Rundfunktechnische Mitteilungen, vol. 41, pp. 56-66, Jun. 1997. (English language translation attached.).
No subject, "Tom Schauer (tschauer©moscow.com)Thu, Sep. 28, 1995 16:46:48-0700," XP-002378870 [Retrieved from the Internet Apr. 28, 2006].
Peddicord, Ross, New on TV: You Bet Your Horse," The Sun, Baltimore, Maryland" Dec. 15, 1994, 1 pg.
Pfister, Larry T., "Teletext: Its Time Has Come," Prepared for the IGC Videotex / Teletext Conference, Andover, Massachusetts, Dec. 14, 1982, pp. 1-11.
Prevue Guide Brochure, Spring 1984.
Prevue Guide Brochure, Spring 1994.
Rayers, D.J., "Telesoftware by Teletext," 1984 IEEE Conference Papers, vol. 240, p. 323.
Rewind, replay and unwind with new high-tech TV devices, by Lawrence J. Magid, LA Times. This document was printed from the Internet on Jun. 6, 1999 and bears a date of May 19, 1999.
Rogers, "Telcos vs. Cable TV : The Global View With Markets Converging and Regulatory Barriers Falling, Service Carriers Are Ready to Rumble," Data Communications, Sep. 21, 1995, vol. 24, No. 13, pp. 75-76, 78, 80, XP000526196.
Roizen, Joseph "Teletext in the USA," Society of Motion Picture and Television Engineers Journal, Jul. 1981, pp. 602-610.
Roseville City Council Presentation, Mar. 13, 1985 (Defendant's Exhibit 226).
Schafer, et al., "E-Commerce Recommendation Applications," Data Min. Knowl. Discov. 5, 1-2 (Jan. 2001), 115-153.
Schlender, B.R., "Couch Potatoes! Now It's Smart TV," Fortune, Nov. 20, 1989, pp. 111-116.
Schmuckler, Eric et al., "A marriage that's made in cyberspace (television networks pursue links with online information services)," Mediaweek, vol. 4, No. 20, May 16, 1994, p. 22(3).
Sealfon, Peggy, "High Tech TV," Photographic, Dec. 1984.
Sorce, et al., "Designing a Broadband Residential Entertainment Service: A Case Study," GTE Laboratories Incorporated, undated, pp. 141-148.
Sunada, K. et al, "Teletext Color Television Receiver Model C-29M950, C26M940," NEC Technical Journal, vol. 40, No. 8, Sep. 1987. (With English language translation of abstract.).
Supplementary European Search Report for Application No. EP 98 93 5889, completed on Sep. 28, 2001.
Sussman, A. "GTE Tunes in to Home TV Shopping," PC Week, vol. 5, No. 26, Jun. 28, 1988, p. C15.
Tech Notes: Product Updates from M/A-COM Cable Home Group, "Videocipher Owner's Manual Update," Issue No. 6, Feb. 1986.
Technical White Paper, "Open TV™ Operating Environment," ( © 1998 OpenTV Inc.), pp. 1-12.
The New York Times on the Web, "2 Makers Plan Introductions of Digital VCR" by John Markoff, Mar. 29, 1999, retrieved from the internet at http://www.nytimes.com/library/tech/99/03/biztech/articles/29vcr.html.

(56) References Cited

OTHER PUBLICATIONS

Transcript of the Deposition of John Roop, Oct. 2, 1996, pp. 186-187.
Trial testimony of Michael Axford, *Prevue Interactive, Inc.* and *United Video Satellite Group, Inc.* v. *StarSight Telecast, Inc.*, Reporter's Transcript of Proceedings had on May 9, 1996, Non-Jury Trial—vol. II, No. 93-C-934-H, pp. 186-187, 296-315, and 352-357.
Ueda, Hirotada et al, "Impact: An Interactive Natural-Motion-Picture Dedicated Multi-Media Authoring System," Communications of the ACM, Mar. 1991, pp. 343-350.
Various publications of Insight Telecast, 1992 and 1993.
Veith, R.H., "Television's Teletext," Elsevier Science Publishing Co., Inc, 1983, pp. 13-20, 41-51.
Videocipher Stipulation, *Prevue Interactive, Inc.* and *United Video Satellite Group, Inc.* v. *StarSight Telecast, Inc.*, Civil Action No. 93-CV-934-H, May 1996.
VideoGuide, Inc., "VideoGuide User's Manual," the document bears a copyright date of 1995, pp. 1-27 (p. 11 is the most relevant).
Wittig et al, "Intelligent Media Agents in Interactive Television Systems," Proceedings of the International Conference on Multimedia Computing and Systems, Los Alamitos, CA, US, May 15-18, 1995, pp. 182-189, XP 000603484.

\* cited by examiner

900

METHOD AND SYSTEM FOR COMMERCE IN MEDIA PROGRAM RELATED MERCHANDISE

CROSS-REFERENCE TO RELATED APPLICATIONS

This application is a continuation of U.S. Patent application No. 11/323,539, filed Dec. 29, 2005, the entire contents of which are incorporated herein by reference.

BACKGROUND OF THE INVENTION

The disclosed technology relates generally to media programs and, more particularly, to providing users of a media program with an opportunity to preview, purchase, and/or gain more information about merchandise related to the media program.

Increasingly, user electronic devices are becoming more multi-functional and have the capability to interact with more media formats and programs. For example, handheld/pocket PCs, cellular telephones, computers, and television sets today are capable of accessing and playing digital music and video, surfing Web content, and/or running video games. In particular, user devices and equipment are now capable of accessing media content and programs that historically have been accessed only by very particular types of devices. The proliferation of media content and programs to many different types of user devices has the potential of reaching a greater number and variety of audiences. Because media content has spawned an entire industry of media-related merchandise, the trend of greater accessibility to media content is an area of potentially greater media-related commerce.

However, despite the increasingly multi-functional nature of user devices, many types of user devices have still retained dominant functionalities that allow users to enjoy capabilities not offered by other types of devices to the same degree. For example, a cellular telephone allows a user to enjoy high fidelity person-to-person communication capabilities more than users of other types of devices. As another example, users of personal computers have the ability to enjoy stunning, high-resolution video games more than users of other types of devices. Therefore, although user devices are becoming more multi-functional, there may still be noticeable differences among the capabilities of different types of user devices.

With the potential benefit of reaching a greater audience through accessibility to media content and programming, there is also the complication of reaching users who do not have the same device/equipment capabilities. Accordingly, there is interest in developing the benefits of greater media access while addressing such complications.

SUMMARY OF THE INVENTION

The disclosed technology relates to media programs and merchandise related to media programs. A media program can be a video program, an audio program, a gaming program, Web content, or another suitable form of media. Merchandise related to a media program can be created and made available to users. The merchandise can be electronic merchandise (e.g., ring tone, wallpaper, screen saver, user interface "skins") or physical merchandise (e.g., CD, DVD, poster, board game). As an example, if a media program is a movie, electronic merchandise related to the movie can include a telephone ring tone featuring the movie's theme song, a computer wallpaper showing the movie's characters, a screen saver showing clips or scenes from the movie, a user interface "skin" showing the movie's theme colors or showing images from the movie, or a computer game based on the movie, and physical merchandise related to the movie can include a soundtrack for the movie on CD, a poster showing the movie's characters, or a board game based on the movie.

When a user is enjoying the media program on user equipment (e.g., a television and set-top box, a computer, a cellular telephone) or after a user has been presented with the media program, the user equipment can present the user with opportunities to preview, purchase, and/or see more information about some of the related merchandise. In general, the user equipment can present the user with an opportunity to purchase electronic merchandise related to the media program. The user equipment can additionally present the user with an opportunity to see more information about physical merchandise. In this manner, if a user is interested in merchandise related to the media program, the user can immediately preview, purchase, or see more information about the merchandise, rather than spending additional time to locate the merchandise elsewhere.

In one aspect of the invention, multiple users may access a media program from different user devices, and different purchase opportunities may arise depending on the capabilities of the different devices. To ensure that user equipment is not inundated with irrelevant purchase opportunities, purchase opportunities related to the media program can be tailored for different types of user devices so that user devices are presented with mostly relevant purchase opportunities. In one embodiment, purchase opportunities that are communicated to a user equipment can be tailored by, for example, selecting purchase opportunities that are applicable to a category of user equipment.

In one embodiment, the purchase opportunities related to a media program can be tailored by a distribution facility. A distribution facility can tailor the purchasing opportunities based on the particular type of user equipment that is receiving the opportunities. For example, a computer and a cellular telephone may both access an episode of the television show "Desperate Housewives." The distribution facility can provide, to the computer, opportunities to purchase a wallpaper for the computer display. On the other hand, the distribution facility can provide, to the cellular telephone, opportunities to purchase ring tones for the telephone. In this manner, the distribution facility provides different purchase opportunities to different user equipment that access the same media program.

In one embodiment, a user equipment can determine which purchase opportunities are relevant to tailor its purchase opportunities. For example, a distribution facility may provide wallpaper purchase opportunities for various wallpaper resolutions to all types of user equipment that access an episode of "Desperate Housewives". If a computer equipment receives the purchase opportunities, the computer can determine that cellular telephone wallpaper resolutions are unsupported and can keep only computer resolution wallpaper purchase opportunities. On the other hand, if a cellular telephone receives the purchase opportunities, the telephone can determine that computer wallpaper resolutions are unsupported and can keep only the cellular telephone resolution wallpaper purchase opportunities. Therefore, a user device can tailor its purchase opportunities by, for example, selecting purchase opportunities based on their applicability to the user device. In one embodiment, a user device can tailor its purchase opportunities by selecting purchase opportunities based on their applicability to a category of user equipment to which the user device belong.

Accordingly, in one aspect of the disclosed technology, systems and methods are provided for delivering a media program and merchandise information for merchandise related to the media program to user equipment. Media programs can reside on a network server or other hosting/distribution equipment that can receive a request for a media program and can communicate the media program to user equipment. User equipment can include a television, set-top box, digital video recorder (DVR), desktop computer, laptop computer, handheld/pocket PC, personal digital assistant, cellular telephone, or a digital music player, for example.

In one aspect of the invention, server/distribution equipment can include media programs and merchandise information for merchandise related to the media programs. The merchandise can include application-specific merchandise related to the media program, such as a ring tone, wallpaper, screen saver, audio soundtrack, video episodes, computer game, or user interface skins. Additionally, merchandise can be characterized as electronic merchandise (e.g., MP3 music file) or physical merchandise (e.g., music CD).

A server/distribution system can maintain a table of categories of user equipment, wherein the categories can each be associated with merchandise information. For example, the categories can be merchandise information for computer equipment, merchandise information for cellular telephone equipment, or merchandise information for DVR equipment. When a server/distribution system receives a request for a media program, the server/distribution system can determine which category or categories of user equipment are appropriate for the user equipment which provided the request. In one embodiment, when user equipment provides a request for a media program to a server/distribution system, the user equipment can also indicate a category of user equipment to which the user equipment belongs. Based on the indication, the server/distribution system can select one or more categories of user equipment from the table. The server/distribution system can provide merchandise information associated with the selected category to the user equipment and can provide the requested media program to the user equipment. The server/distribution system can include a processor for executing machine instructions and a memory that contains machine instructions. The server/distribution system can operate at least partially using the processor and the machine instructions.

A server/distribution system can receive multiple requests for a particular media program from different user equipment. For each request, the server/distribution system may provide different merchandise information to the different user equipment. The user equipment can be television equipment, computer equipment, and mobile user equipment. If the requesting user equipment includes a telephone application, the server/distribution system can provide merchandise information for a ring tone to the user equipment.

In one aspect of the invention, a user may be interested in finding out where physical merchandise related to a media program is available for purchase. A distribution facility or the user equipment can present information to a user regarding where to purchase such merchandise, and, in one embodiment, the information can include only purchase locations that are near the user's location. For example, a user on a cellular telephone may be access an episode of "Desperate Housewives" and may be interested in finding out where a poster related to the show can be purchased. If nearby stores carry the poster, the cellular telephone or the distribution facility can inform the user of the location of the nearby stores.

In one aspect of the invention, a server/distribution system can include merchandise information for physical merchandise related to a media program. When the server/distribution system receives a user request for a media program, the server/distribution system can determine the location of the user equipment. The server/distribution system can determine the location by requesting the location from the user equipment and/or by determining the location using location triangulation. The server/distribution system can include one or more location criteria. For example, the location criteria can require physically located merchandise to be in the same zip code as the user equipment, or be within a particular distance radius to the user equipment. Based on a location criterion and the location of the user equipment, the server/distribution system can provide only merchandise information that meet the location criterion. The media program and the merchandise information can be provided to the user equipment. The server/distribution system can periodically re-determine the location of the user equipment.

In one aspect of the invention, user equipment can receive a requested media program and merchandise information for merchandise related to the media program. The merchandise can be application-specific merchandise, such as a ring tone, a wallpaper, a screen saver, a user interface skin, a computer game, a RealPlayer™ soundtrack, or a MPEG video, for example.

In one embodiment, the user equipment can store the received merchandise information based on determining whether or not it supports the application-specific merchandise.

In one embodiment, user equipment having an interactive program guide can provide a purchase opportunity to a user through the program guide. The user equipment can notify the user of the purchase opportunity in connection with a program listing or a program description region of the interactive program guide. The notice can be provided before, during, and/or after the broadcast of a media program.

In one embodiment, the user equipment can present the media program and can provide a purchase opportunity during the presentation of the media program or at the end of the media program. In one embodiment, merchandise related to the media program can be associated with a particular elapsed time of the media program. This particular elapsed time can be stored in the merchandise information for the merchandise. When the user equipment is presenting the media program, the user equipment can keep track of the elapsed time of the media program. When the elapsed time surpasses the particular elapsed time in the merchandise information, the user equipment can provide a purchase opportunity associated with the merchandise information. In one embodiment, user equipment can provide the purchase opportunity by displaying a notification to the user. If the user equipment supports a vibration feature, such as a vibration feature on a cellular telephone, the notification can be a vibration of the user equipment.

After providing a notification, the user equipment can provide a time interval for a user to indicate interest in the purchase opportunity. If the user equipment receives an indication during this time interval, the user equipment can display an interactive overlay that provides information about the merchandise and options to preview the merchandise, purchase the merchandise, or exit the overlay display. If the user equipment receives an indication to preview or buy electronic merchandise, the user equipment can access the merchandise based on an electronic address in the merchandise information for the merchandise.

In one aspect of the invention, user equipment can provide purchase information for physical merchandise related to a media program. In one embodiment, the purchase information can be displayed in an advertisement. In one embodiment, the purchase information can be displayed in a sponsor notice. In one embodiment, the purchase information can be displayed in an advertisement region of an interactive program guide.

Further features of the invention, its nature and various advantages, will be more apparent from the accompanying drawings and the following detailed description of the various embodiments.

DETAILED DESCRIPTION OF THE PREFERRED EMBODIMENTS

Figure 1:
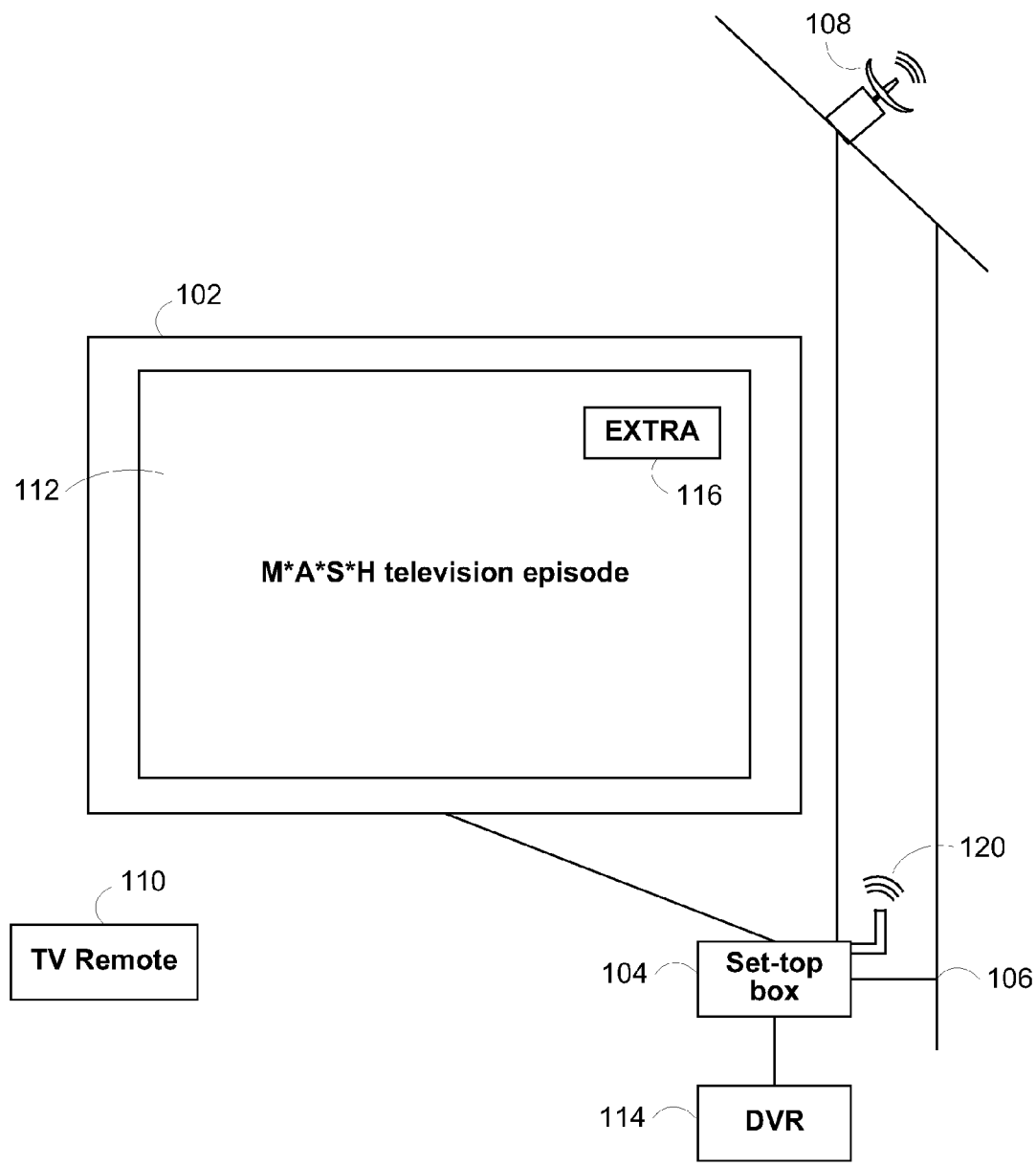
FIG. 1 is a diagram of exemplary user television equipment that is presenting a media program.

The amount of media available to users in any given media delivery system can be substantial. Consequently, many users desire a form of media guidance, an interface that allows users to efficiently navigate media selections and easily identify media that they may desire. An application which provides such guidance is referred to herein as an interactive media guidance application or, sometimes, a guidance application.

Interactive media guidance applications may take various forms depending on the media for which they provide guidance. One typical type of media guidance application is an interactive television program guide. Interactive television program guides are well-known guidance applications that, among other things, allow users to navigate among and locate television programming viewing choices and, in some systems, digital music choices. The television programming (and music programming) may be provided via traditional broadcast, cable, satellite, Internet, or any other communication technology. The programming may be provided on a subscription basis (sometimes referred to as premium programming), as pay-per-view programs, or on-demand such as in video-on-demand (VOD) systems.

With the advent of the Internet, mobile computing, and high-speed wireless networks, users are able to access media on personal computers (PCs) and devices on which they traditionally could not. Non-television-centric platforms (i.e., platforms that communicate media with equipment not part of the user's broadcast, cable or satellite television-delivery network) allow users to navigate among and locate desirable video clips, full motion videos (which may include television programs), images, music files, and other suitable media. Consequently, media guidance is also necessary on modern non-television-centric platforms. For example, media guidance applications may be provided as on-line applications (i.e., provided on a web-site), or as stand-alone applications or clients on hand-held computers, personal digital assistants (PDAs) or cellular telephones. In some systems, users may control equipment remotely via a media guidance application. For example, users may access an online media guide and set recordings or other settings on their in home equipment. This may be accomplished by the on-line guide controlling the user's equipment directly or via another media guide that runs on the user's equipment. Remote access of interactive media guidance applications is described in greater detail in U.S. patent application Ser. No. 11/246,392, filed Oct. 7, 2005, which is hereby incorporated by reference herein in its entirety.

In accordance with one aspect of the invention, the aspects and embodiments of the invention described herein can be partially or entirely provided in or through an interactive program guide. As described above herein, the interactive program guide can be located at a user equipment or can be an online/networked interactive program guide.

In accordance with one aspect of the invention, media programs residing on server/distribution equipment can be accessed by both television user equipment and non-television-centric user equipment, such as computer equipment and mobile user equipment (e.g., cellular telephone). A media program can include video programming (e.g., movie, television program, music video, news, live or delayed recording), audio programming (e.g., music, radio show, news, live or delayed recording), computer gaming programs, Web content, or another suitable form of media.

In accordance with one aspect of the invention, merchandise related to a media program can be created and made available to users. The merchandise can be electronic merchandise (e.g., ring tone, wallpaper, screen saver, user interface skin) or physical merchandise (e.g., CD, DVD, poster, board game). As an example, if a media program is a movie, electronic merchandise related to the movie can include a telephone ring tone featuring the movie's theme song, a computer wallpaper showing the movie's characters, a screen saver showing clips or scenes from the movie, a user interface skin showing the movie's theme colors or showing images from the movie, or a computer game based on the movie, and physical merchandise related to the movie can include a soundtrack for the movie on CD, a poster showing the movie's characters, or a board game based on the movie.

User equipment (e.g., a television and set-top box, a computer, a cellular telephone) can present a user with opportunities to preview, purchase, and/or get more information about merchandise related to a media program. In general, the user equipment can present the user with an opportunity to purchase electronic merchandise related to the media program. The user equipment can additionally present the user with an opportunity to get more information on physical merchandise. In this manner, if a user is interested in merchandise related to the media program, the user can immediately preview, purchase, or get more information about the merchandise while enjoying the media program, rather than spending additional time afterwards to locate the merchandise elsewhere. The term "purchase opportunity" as used herein refers to an opportunity for a user to see more information for a merchandise, preview the merchandise, or purchase the merchandise. The process of providing a purchase opportunity to a user may involve a number of operations, including, in one embodiment, accessing merchandise information for the merchandise.

A media program and its related merchandise information can be located at a server/distribution facility. When a server/distribution facility receives a request for a media program or for merchandise information from user equipment, the server/distribution facility can tailor the merchandise information it provides to the user equipment based on the user equipment's equipment category. In this manner, a server/distribution facility can efficiently provide to the user equipment merchandise information for relevant merchandise, rather than inundating the user equipment with irrelevant merchandise information.

In one aspect of the invention, when user equipment receives merchandise information, the user equipment can select to keep all or a subset of the merchandise information based on the types of applications that are supported by the user equipment. For example, a cellular telephone can receive merchandise information that may or may not be tailored or applicable to cellular telephone equipment. Even when user equipment receives merchandise information that is tailored or applicable to cellular telephone equipment generally, the merchandise information may still include types of merchandise that are not supported by particular brands or models of cellular telephones. As an example, although cellular telephones generally support customizable ring tones, more recent models of cellular telephones can support polyphonic rings tones while earlier models of cellular telephones may not.

In one aspect of the invention, a user may be interested in seeing information about physical merchandise and where they are available for purchase. In one embodiment, user equipment and/or a server/distribution facility may be able to determine the location of the user equipment. When the server/distribution facility provides merchandise information for physical merchandise to the user equipment, the merchandise information can be selected to include only physical merchandise that are available for purchase at stores that are near the location of the user equipment.

Referring now to FIG. 1, user television equipment located in a home or other building or facility is shown. The illustrated television equipment includes a television 102 that is in communication with a set-top box 104 that may optionally have digital video recording capabilities. In general, the set-top box 104 can access media distribution facilities and servers (not shown) through one or more communication technologies, including wireline technologies 106 (e.g., cable, digital subscriber loop, optical fiber, telephone modem), satellite technologies 108, and wireless technologies 120, such as cellular technology (e.g., GSM), wireless LAN (e.g., 802.11b/g), and bluetooth, for example. The set-top box 104 can receive media programs through the wireline connection 106, the satellite connection 108, and/or the wireless connection 120. The received media programs can be displayed on the television screen 112 and/or can be stored in a separate digital video recorder 114. In one embodiment, the set-top box may be optional, and the digital video recorder 114 can be directly connected to the wireline connection 106, the satellite connection 108, and/or the wireless connection 120.

Figure 2:
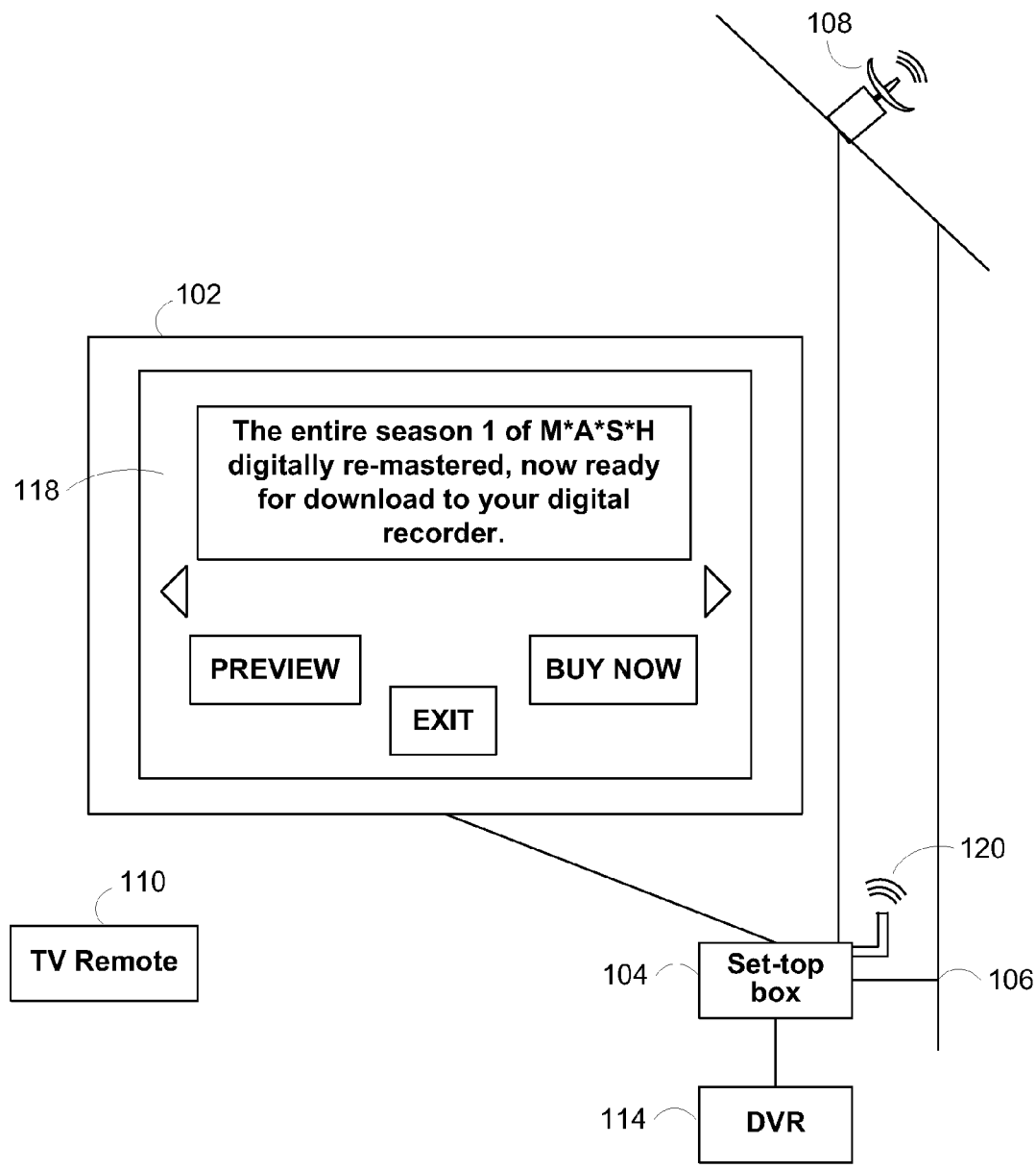
FIG. 2 is a diagram of exemplary user television equipment that is displaying a purchase opportunity.

In the illustrated example, a user may be watching a re-run of an episode of the hit television series M*A*S*H. During an advertisement period or during or after the episode, the set-top box 104 can notify the viewer of the availability of an "EXTRA" 116 related to the M*A*S*H. episode. A user can indicate interest in the merchandise by pressing a button on the remote control 110, for example. Referring to FIG. 2, when a user has indicates interest in the merchandise, the set-top box/DVR can display a merchandise information screen 118 on the television screen to identify the merchandise as a digitally re-mastered version of the entire first season of the show that can be downloaded to the user's set top box 104 or digital video recorder 114. This purchase opportunity can be available because the merchandise is relevant to and is supported by the user set top box/DVR equipment. Through selection options on the screen 118, a user can elect to preview and/or buy the digitally re-mastered M*A*S*H episodes, or to exit the screen. In one variation of FIG. 1, a user may be browsing an interactive program guide (not shown) before, during, or after watching the episode of M*A*S*H. The interactive program guide can notify the user of merchandise related to the M*A*S*H episodes. This variation is described in more detail in connection with FIGS. 19A-19B.

Figure 3:
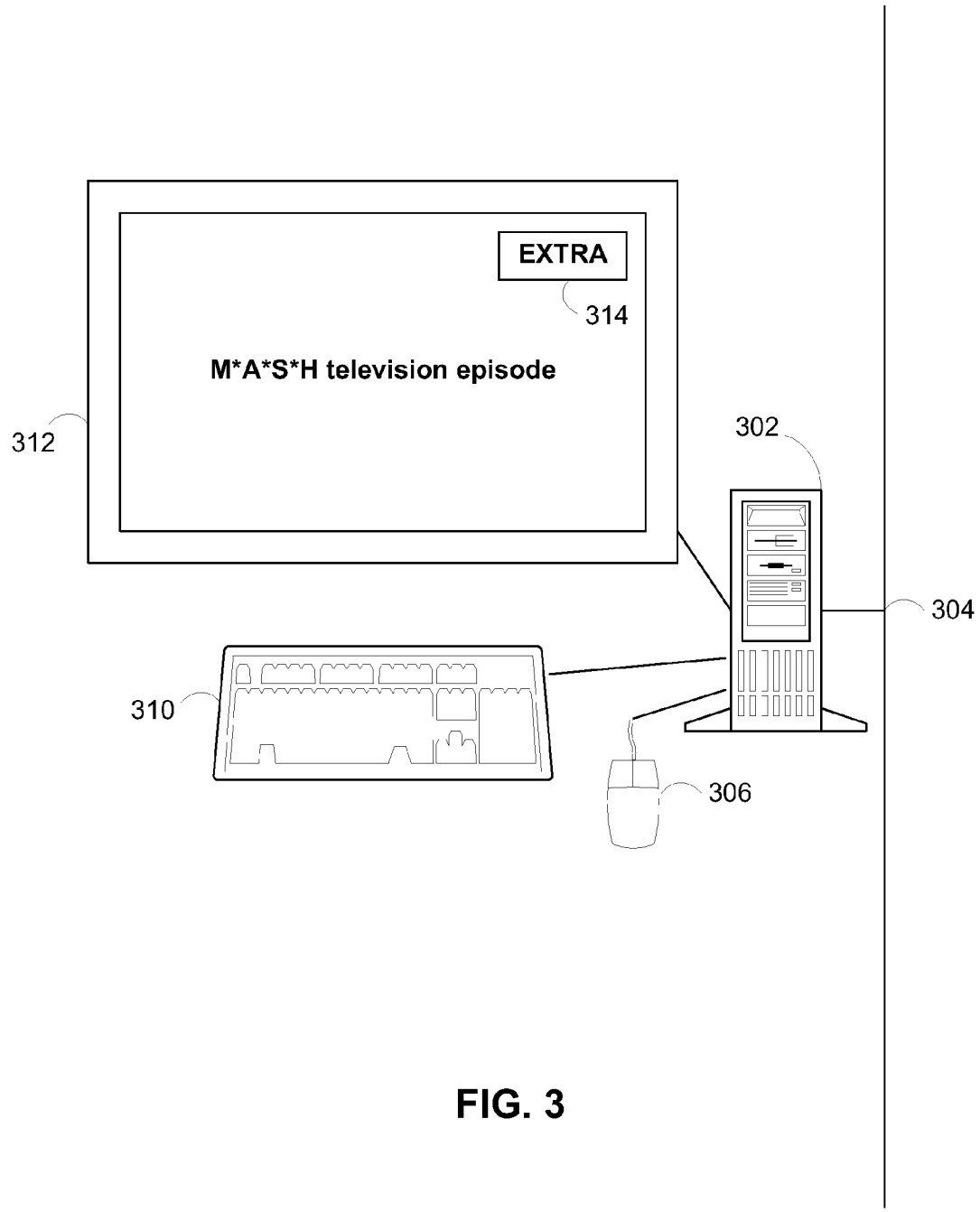
FIG. 3 is a diagram of exemplary user computer equipment that is presenting a media program.

As another example, FIG. 3 shows user computer equipment located in a home or other building or facility. The computer 302 can be connected to media program sources through a telephone modem, a cable modem, digital subscriber loop technology, ISDN technology, WLAN (e.g., 802.11b/g) or bluetooth, or another available computer communication technology 304. Media programs can be received by the computer through the communication connection 304.

Figure 4:
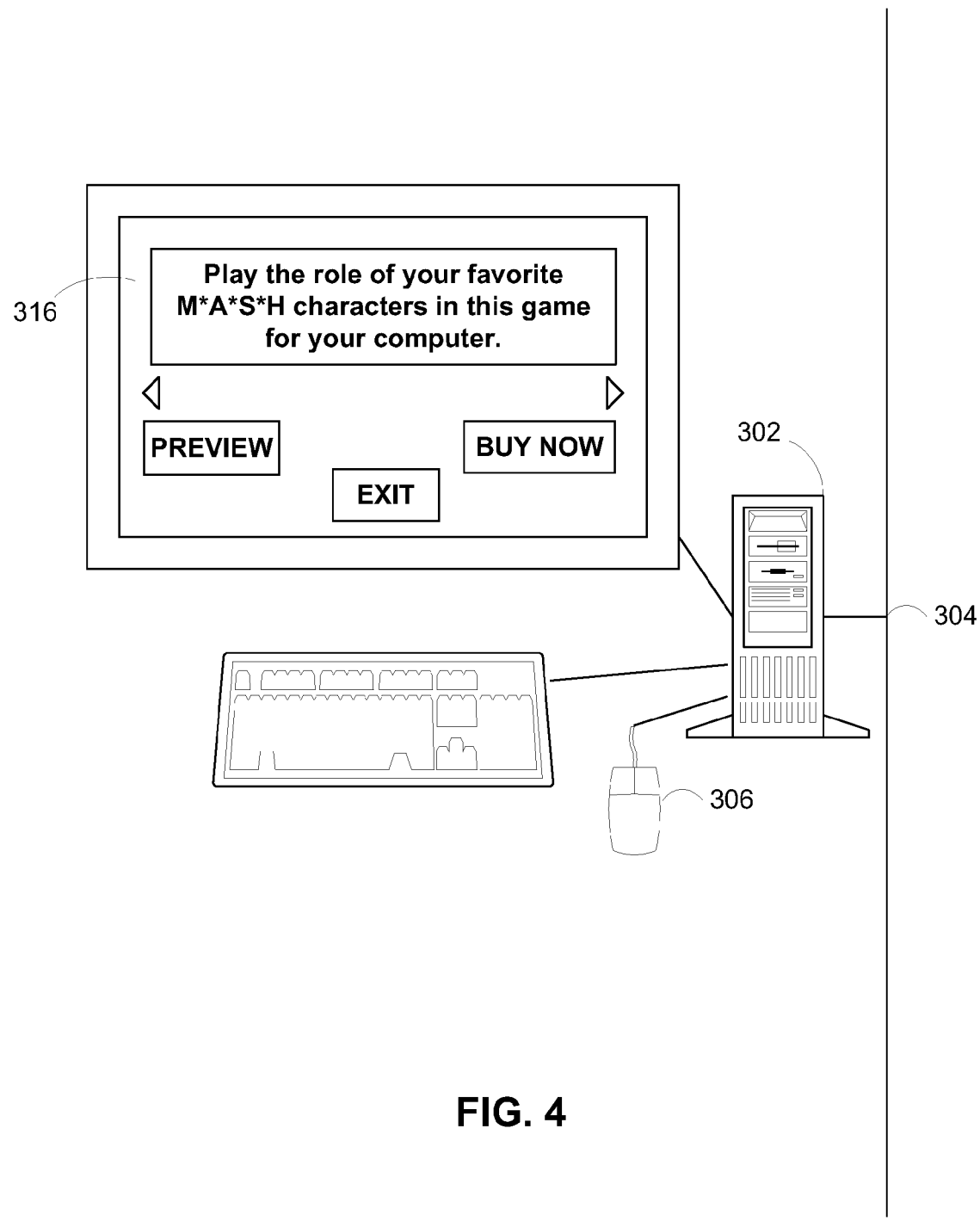
FIG. 4 is a diagram of exemplary user computer equipment that is displaying a purchase opportunity.

In the illustrated example, a user may be accessing and watching the same M*A*S*H episode on a computer screen 312. During an advertisement period or during or after the episode, the computer 302 can notify the viewer of the availability of an "EXTRA" related to the episode. A user can indicate interest in the merchandise by clicking on the screen icon 314 with the mouse pointer 306 or by pressing a key on the keyboard 310, for example. Referring now to FIG. 4, when the user indicates interest in the merchandise, the computer can display a merchandise information screen 316 on the computer display screen to identify the merchandise as a computer video game based on the M*A*S*H television show that features characters from the show. This purchase opportunity can be available because the merchandise is relevant to and is supported by the user computer equipment. Through interacting with options on this screen 316, a user can elect to preview and/or buy the computer game, or to exit the screen. In one variation of FIG. 3, a user may be browsing an interactive program guide (not shown) before, during, or after watching the episode of M*A*S*H. The interactive program guide can notify the user of merchandise related to the M*A*S*H episodes. This variation is described in more detail in connection with FIGS. 19A-19B.

Figure 5A:
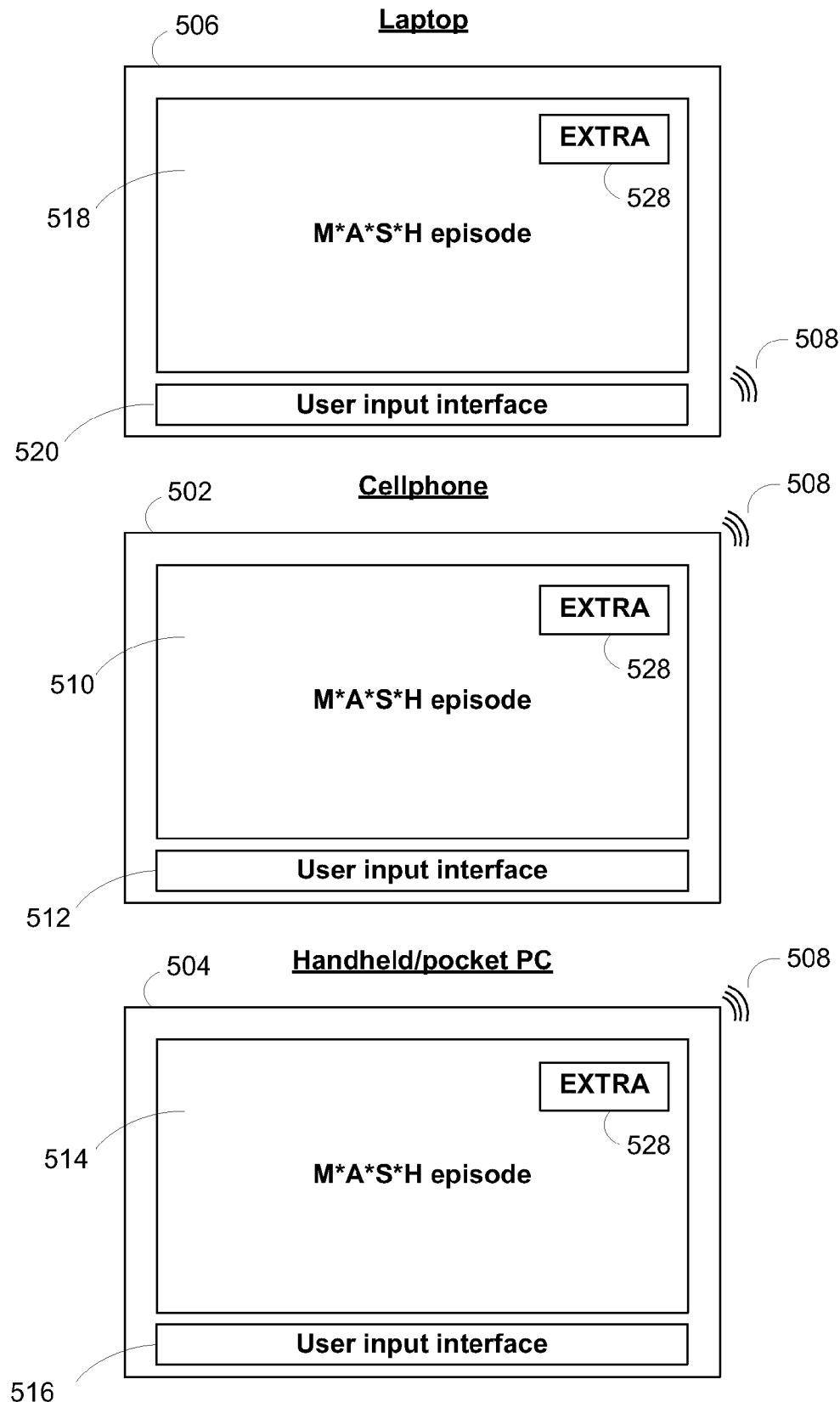
FIG. 5A is a diagram of exemplary mobile user equipment that is presenting a media program.
Figure 5B:
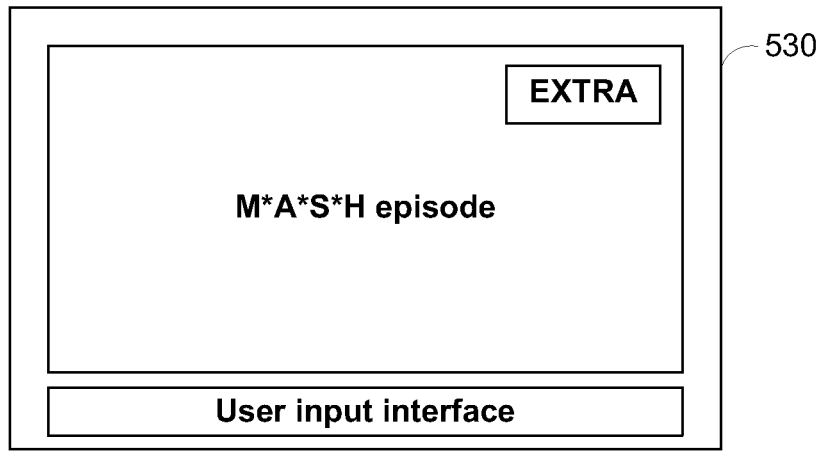
FIG. 5B is a diagram of additional exemplary mobile user equipment that is presenting a media program.

In another example, FIGS. 5A-5B shows mobile user equipment that can conveniently travel with a user. The illustrated user equipment includes a cellular telephone 502, a handheld/pocket PC 504, a laptop computer 506, a portable gaming system 530 (e.g., Sony PSP), and mobile or portable television viewing devices 532, such as location-free television consumer electronic devices or car entertainment systems that include a television tuner. Each of the mobile user equipment can be in communication with a media program source (not shown) by a suitable communication technology, such as a cellular communication technology, wireless LAN communication technology (e.g., IEEE 802.11b/g), bluetooth communication technology, or otherwise 508. Media programs can be received by the mobile user equipment through the communication technology.

Figure 6:
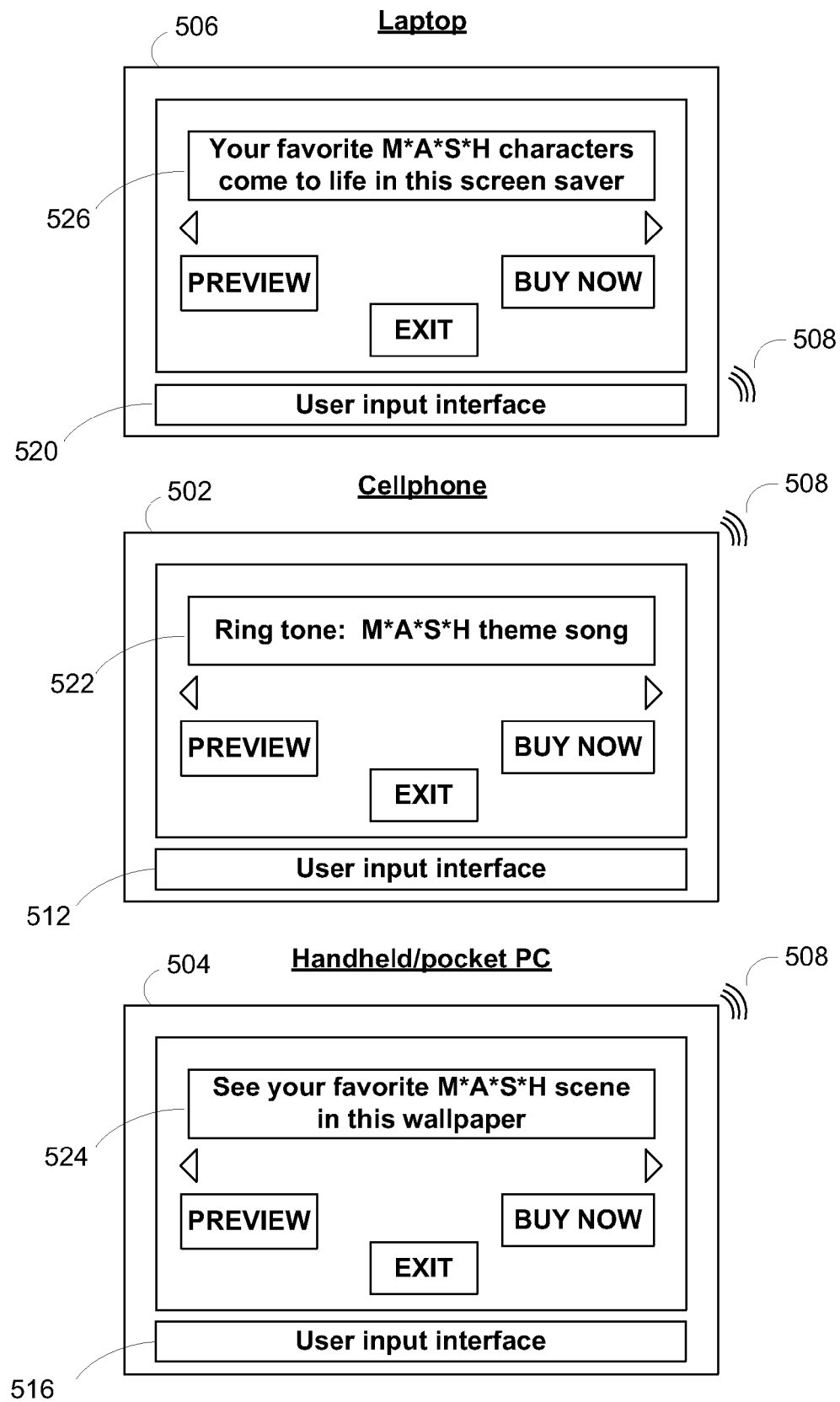
FIG. 6 is a diagram of exemplary mobile user equipment that is displaying a purchase opportunity.

In the illustrated example, a user of the cellular telephone 502 may be accessing and watching the same M*A*S*H episode. During an advertisement period or during or after the episode, the cellular telephone 502 can notify the viewer of the availability of an "EXTRA" related to the episode. The notification can be an icon 528 on the display screen 510, or can be a telephone vibration, which is commonly used by a cellular telephone to get the user's attention. A user can indicate interest in the merchandise by, for example, pressing a button 512 on the cellular telephone. As shown in FIG. 6, when a user indicates interest in the merchandise, the cellular telephone can display a merchandise information screen 522 on the telephone screen to identify the merchandise as a ring tone based on the song. This purchase opportunity can be available because the merchandise is relevant to and is supported by the user cellular telephone equipment. Through interacting with options on this screen 522, a user can elect to preview and/or buy the ring tone, or to exit the screen.

Figure 5B:
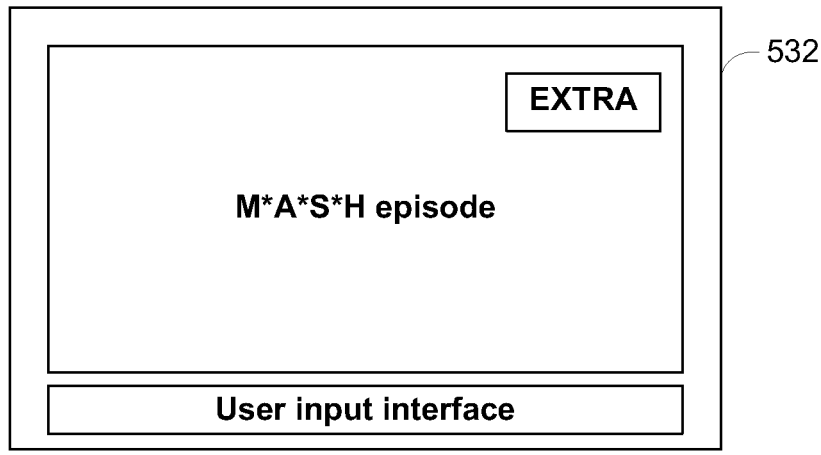

Also in the illustrated example of FIG. 5, a user of the handheld PC 504 may be accessing and watching the same M*A*S*H episode. During an advertisement period or during or after the episode, the handheld PC 504 can notify the user of the availability of an "EXTRA" related to the episode. The notification can be an icon 528 on the display screen 514, as described herein. A user can indicate interest in the merchandise by, for example, pressing a button 516 on the handheld PC 504. As shown in FIG. 6, when a user indicates interest in the merchandise, the handheld PC can display a merchandise information screen 524 on the display to identify the merchandise as a wallpaper showing characters from the M*A*S*H show. This purchase opportunity can be available because the merchandise is relevant to and is supported by the user pocket PC equipment. Through interacting with options on this screen 524, a user can elect to preview and/or buy the wallpaper, or to exit the screen.

Also in the illustrated example of FIG. 5, a user of the laptop computer 506 may be accessing and watching the same M*A*S*H episode. During an advertisement period or during or after the episode, the laptop computer 506 can notify the viewer of the availability of an "EXTRA" related to the movie. The notification can be an icon 528 on the display screen 518, as described herein. A user can indicate interest in the merchandise by clicking on the icon with a pointer 520, for example. As shown in FIG. 6, when a user indicates interest in the merchandise, the laptop computer can display a merchandise information screen 526 on the laptop screen to identify the merchandise as a screen saver based on characters from M*A*S*H show. This purchase opportunity can be available because the merchandise is relevant to and is supported by the user laptop computer equipment. Through interacting with options on this screen 526, a user can elect to preview and/or buy the screen saver, or to exit the screen. The same type of operation described above in connection with FIG. 5A also applies to the portable gaming system 530 and the mobile or portable television viewing devices 532 of FIG. 5B. Those embodiments are also contemplated. Additionally, purchase opportunities can also include opportunities to purchase user interface skins for a user equipment display.

In one variation of FIG. 5, a user may be browsing an interactive program guide (not shown) before, during, or after watching the episode of M*A*S*H. The interactive program guide can notify the user of merchandise related to the M*A*S*H episodes. This variation is described in more detail in connection with FIGS. 19A-19B.

The following detailed description, in conjunction with FIGS. 7-26, will now describe exemplary components, operations, and interactions of a server/distribution facility and user equipment.

Figure 7:
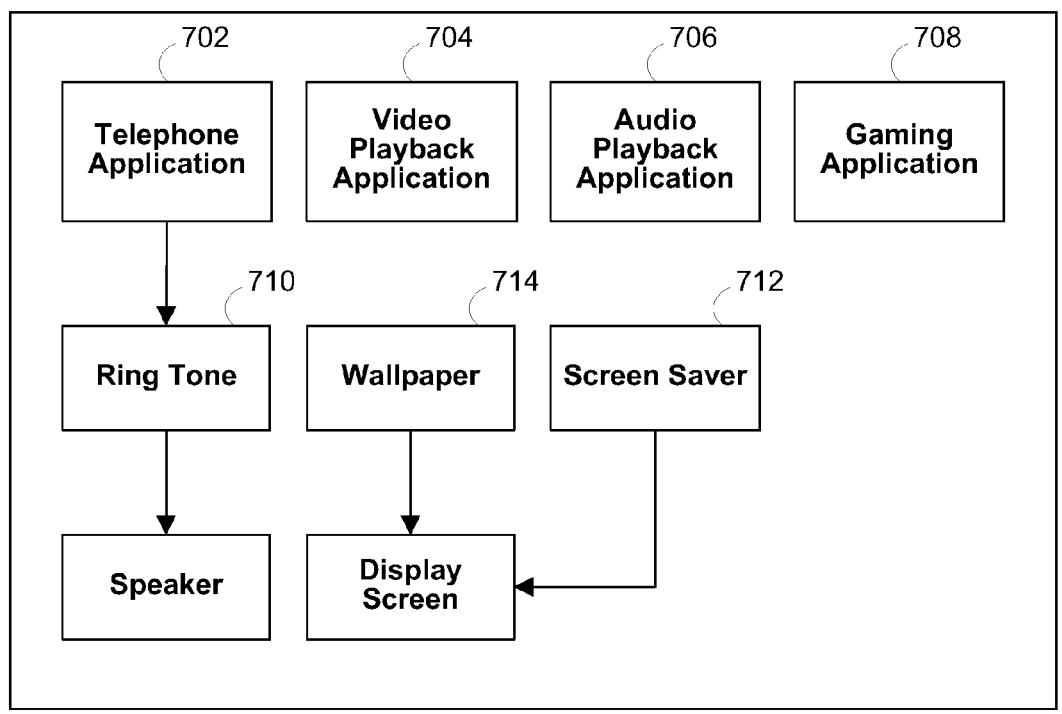
FIG. 7 is a block diagram of exemplary applications and components in one embodiment of user equipment.

FIG. 7 shows exemplary components in an exemplary user equipment, which can include a set-top box or DVR with a television (FIG. 1), computer equipment (FIG. 3), and portable user equipment such as a cellular telephone, a music/audio player, a handheld/pocket PC, and/or a PDA (FIG. 5). As shown in FIG. 7, user equipment 700 can include many different types of applications, such as a telephone application 702, an audio playback application 706, video playback application 704, a gaming application 708, a ring tone application 710, a screen saver application 712, and/or a wallpaper application 714, for example. Any application that includes a user interface display may include a customizable user interface skin. The applications in user equipment 700 can be implemented by a combination of hardware components and software instructions, using an architecture such as that shown in FIG. 29, which will be described later herein. FIG. 7 is exemplary, and user equipment embodiments need not include all of the illustrated applications shown in FIG. 7. In various embodiments, user equipment may include more applications or less applications than those shown in FIG. 7. For example, television equipment (FIG. 1) may not include a telephone application 702 and therefore may not include a ring tone application 714. Also, a pocket PC (504, FIG. 5) may not include a screen saver application 712 because a pocket PC may turn off its screen to conserve battery.

As previously described herein in connection with FIGS. 1-6, user equipment can be in communication with a server/distribution facility by way of, for example, a satellite, wireline, or wireless communication connection (106, 108, 120 FIG. 1), an Internet connection (304, FIG. 3), and/or various wireless technologies (508, FIG. 5). A server can be located proximate to user equipment, such as a home server in a home, or can be located at a remote location from the user equipment, such as servers at a server farm. A server/distribution facility and its operation and interaction with a surrounding network will be described in more detail later herein in connection with FIG. 27.

Figure 8:
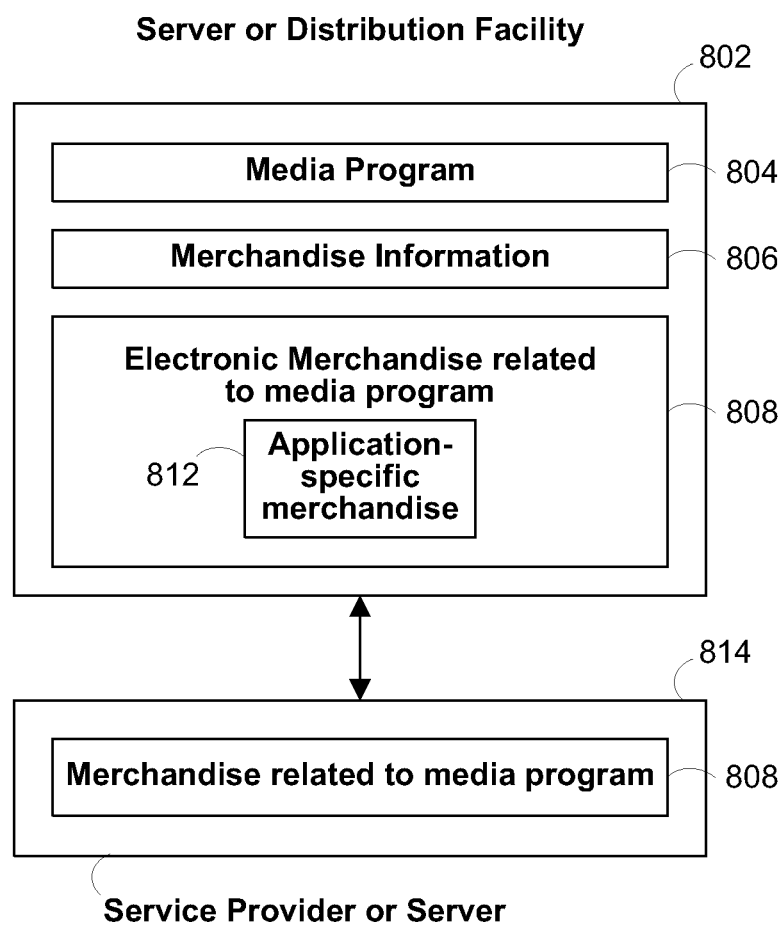
FIG. 8 is a block diagram of an exemplary configuration for storing media programs, merchandise information, and related merchandise.

In accordance with one aspect of the invention and with reference to FIG. 8, a server or distribution facility 802 can include a media program 804 and merchandise information for merchandise related to the media program 806. The server or distribution facility 802 can also include merchandise related to the media program 808, which can include application-specific merchandise 812 such as video programs, audio programs, Web content, gaming programs, wallpapers, ring tones, user interface skins, and screen savers, for example. Additionally, a service provider or another server 814 can include merchandise related to a media program 808. As used herein, application-specific merchandise 812 refers to merchandise that are used in connection with particular applications, such as an audio playback application, a video playback application, a gaming application, a screen saver application, a ring tone application, and a wallpaper application. Examples of application-specific merchandise include a movie, a soundtrack, a user-interactive game, a ring tone, a wallpaper, a user interface skin, or a screen saver. Applications will be described in more detail in connection with FIG. 9.

An application-specific merchandise according to the present invention can be related to a media program in many ways. For example, if the media program has visual programming, the application-specific merchandise can show a clip or a still image from a scene in the visual programming. The application-specific merchandise can be related to the characters or themes in the media program. For example, an application-specific merchandise can show characters portrayed in the media program, and/or show logos, trademarks, brandmarks, graphical program titles, thematic graphics, or other visual designs used in or associated with the media program and/or its broadcasters or producers. If the media program includes audio programming (e.g., instrumental music, vocal music, sounds of nature, speech, dialogue), then an application-specific merchandise related to the audio programming can play audio that is presented by a speaker and/or a performer in the audio programming, or can play a thematic tune or trademark sound from the audio programming. An application-specific merchandise can play a tune that may not be a replica of the audio programming but that is based on the audio programming.

Application-specific merchandise can be created by a programming source and/or by non-programming sources authorized to create the merchandise. For example, user equipment are typically designed and manufactured by many different companies, and different user equipment may have include different applications. Therefore, a manufacturer may be more proficient than a programming source at creating application-based merchandise for use with particular user equipment. Third party vendors who are familiar with particular user equipment may also be more proficient at providing application-specific merchandise for the user equipment.

Referring again to FIG. 8, a server/distribution facility 802 and/or a service provider 814 can include merchandise information for merchandise related to a media program 806. The merchandise information 806 can be created by a programming source and/or by non-programming sources authorized to create the merchandise.

Figure 9:
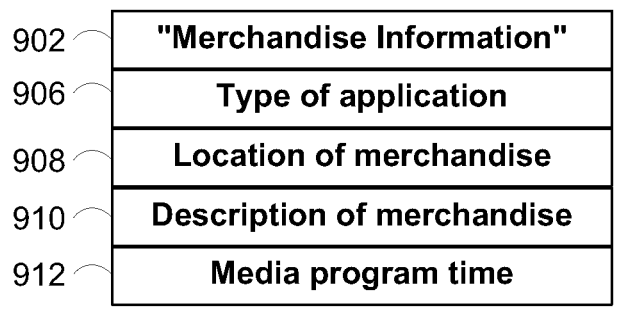
FIG. 9 is a diagram of one embodiment of a merchandise information data structure.
Figure 10:
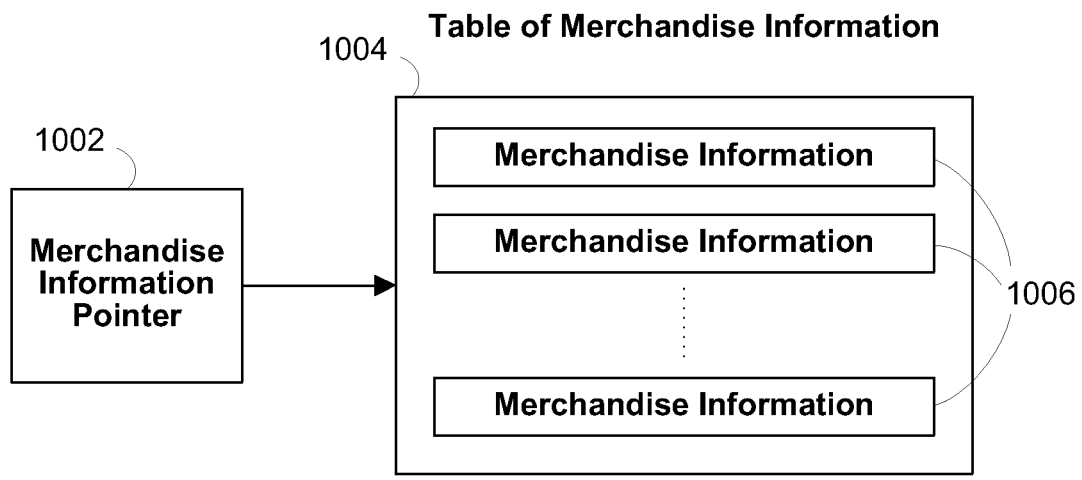
FIG. 10 is a diagram of an exemplary configuration for maintaining and organizing merchandise information.

FIG. 9 shows one embodiment of merchandise information that is organized into an exemplary data structure 900. The data structure 900 includes an identifier 902 that allows user equipment to recognize that the data structure contains merchandise information, thereby allowing the user equipment to correctly parse the data structure fields. The data structure includes a field 906 that identifies the type of application associated with the merchandise. Each type of application can be represented by a number. The type of application field can be set to the number that represents the application to used with the merchandise. If the merchandise is not particular to an application, the field 906 can be set to zero, for example. The illustrated data structure includes a field 908 that identifies the location of the merchandise. The location field 908 can identify an electronic repository (e.g., URL Web address) that contains many merchandise, or the location field 908 can be an electronic address that identifies an individual merchandise. Optionally, the location field 908 can specify a physical store and address where the merchandise can be purchased. The data structure includes a description field 910 that can include a description of the merchandise. The description field 910 can also include a multimedia presentation describing or advertising the merchandise, such as a graphical or video advertisement. Lastly, the data structure includes a field 912 that can identify a playback time of a portion of the media program from which the merchandise is derived. For example, a wallpaper merchandise may be a snapshot of a particular scene from a movie. The time at which the particular scene occurs in the movie can be identified in the time field 912 of the data structure. If the merchandise is not related to a particular time in the media program, the value of the media program time field 912 can be set to the maximum value permitted by the field, for example.

The types of applications that can be specified by the merchandise information data structure may be more specific or less specific depending on the particular implementation. In one embodiment, the types of applications field may be able to only differentiate at the level of wallpaper, screen saver, user interface skin, and ring tone, for example. In one embodiment, the types of applications field can be more specific and may be able to further differentiate between cellular telephone wallpaper, desktop computer wallpaper, and pocket PC wallpaper, for example. In yet another embodiment, the types of applications field can be even more specific and may be able to differentiate between desktop computer wallpaper of 640×480 resolution, desktop computer wallpaper of 800×600 resolution, and desktop computer wallpaper of 1280×1024 resolution, for example. In one embodiment, the type of applications field can differentiate between application versions for an operating system and application versions for different operating systems. For example, the type of applications field can differentiate among Media Player for Windows, Media Player for Windows Mobile, RealPlayer for PalmOS, Acrobat Reader 4 for Windows, Acrobat Reader 5 for Windows, and Acrobat Reader for PalmOS, for example.

FIG. 9 is exemplary and variations of the illustrated data structure are contemplated. For example, the order and number of fields in the data structure can vary according to the information needs of the user equipment. Additionally, various embodiments of merchandise information may not include one or more particular fields in the illustrated data structure of FIG. 9. One skilled in the art will recognize that there are many ways to implement a data structure.

In one embodiment, merchandise information can be associated with and/or located together with the media program to which it is related. In one embodiment shown in FIG. 10, a media program can be associated with a pointer 1002 that identifies the storage location of a table of merchandise information related to the media program 1004. The merchandise information 1006 in stored in the table can be sorted based on one or more fields in the merchandise information data structure. One skilled in the art will recognize that there are various ways to implement a table and a sorting capability. For example, the table 1004 can be implemented using a multidimensional linked list. In some embodiments, it may be desirable to sort the merchandise information 1006 based on media program time so that merchandise information related to an earlier portion of the media program can appear earlier in the table. In other embodiments, it may be desirable to sort the merchandise information 1006 based on a type of application so that the type of available merchandise can be more easily organized and accessed.

Figure 11:
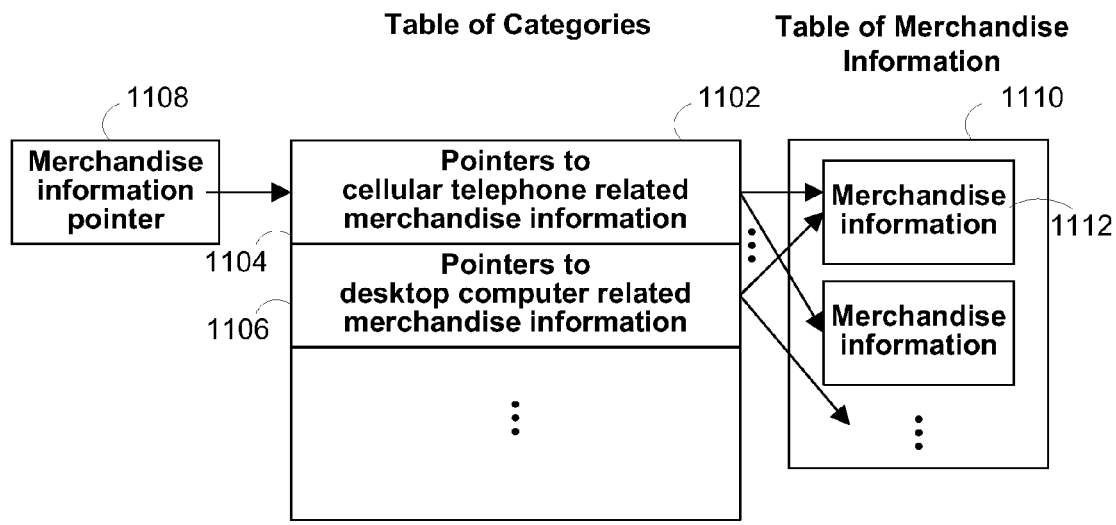
FIG. 11 is a block diagram of an exemplary table of user equipment categories.
Figure 12:
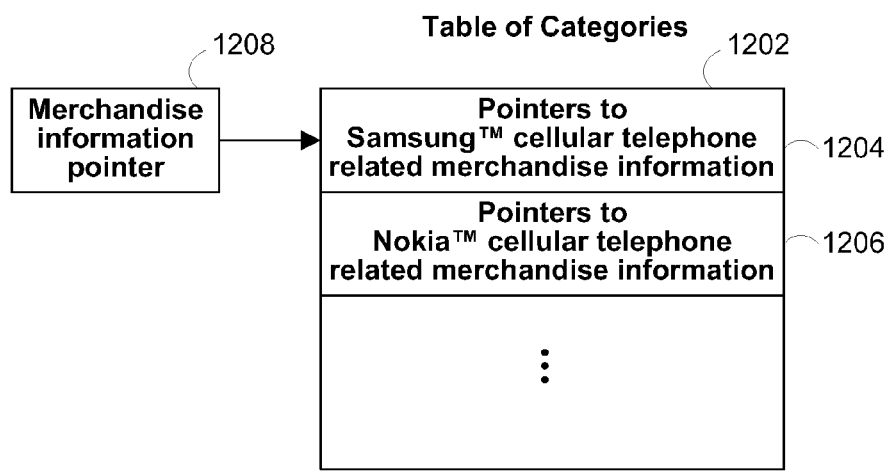
FIG. 12 is a block diagram of an exemplary table of manufacturer-specific user equipment categories.

In accordance with one aspect of the invention, a distribution facility/server can maintain merchandise information in categories that can have varying levels of specificity, depending on implementation. The categories 1102 shown in FIG. 11 are organized based on categories of user equipment, including a cellular telephone category of merchandise information 1104, a desktop computer category of merchandise information 1106, and other similar categories. A merchandise information pointer 1108 associated with a media program can indicate the storage location of the table of categories 1102. Within each category, the table can include pointers to particular merchandise information data structures in a table of merchandise information 1110. Therefore, a particular merchandise information data structure 1112 can be referenced by multiple categories in the table of categories 1102. In this manner, the merchandise information data structures are not duplicated if they are applicable to more than one category of user equipment. The table of categories 1202 in FIG. 12 is organized based on categories of manufacturer-specific user equipment, including a Samsung™ cellular telephone category 1204, a Nokia™ cellular telephone category 1206, and other similar categories. As with FIG. 11, a merchandise information pointer 1208 associated with a media program can point to the storage location of the table of categories 1202, and each category can include pointers to merchandise information data structures in a table of merchandise information. In a variation of FIGS. 11-12, a table of categories can be organized based on specific models user equipment (not shown), including, for example, a Nokia 1100 cellular telephone category, a Nokia 2600 cellular telephone category, a Nokia 3220 cellular telephone category, and other similar categories. When the categories correspond to specific device models, each category can include pointers to merchandise information for only applications that are supported by a specific device model. Accordingly, in one embodiment, the categories in a table of categories can be based on applications that are supported by specific device models.

Figure 13A:
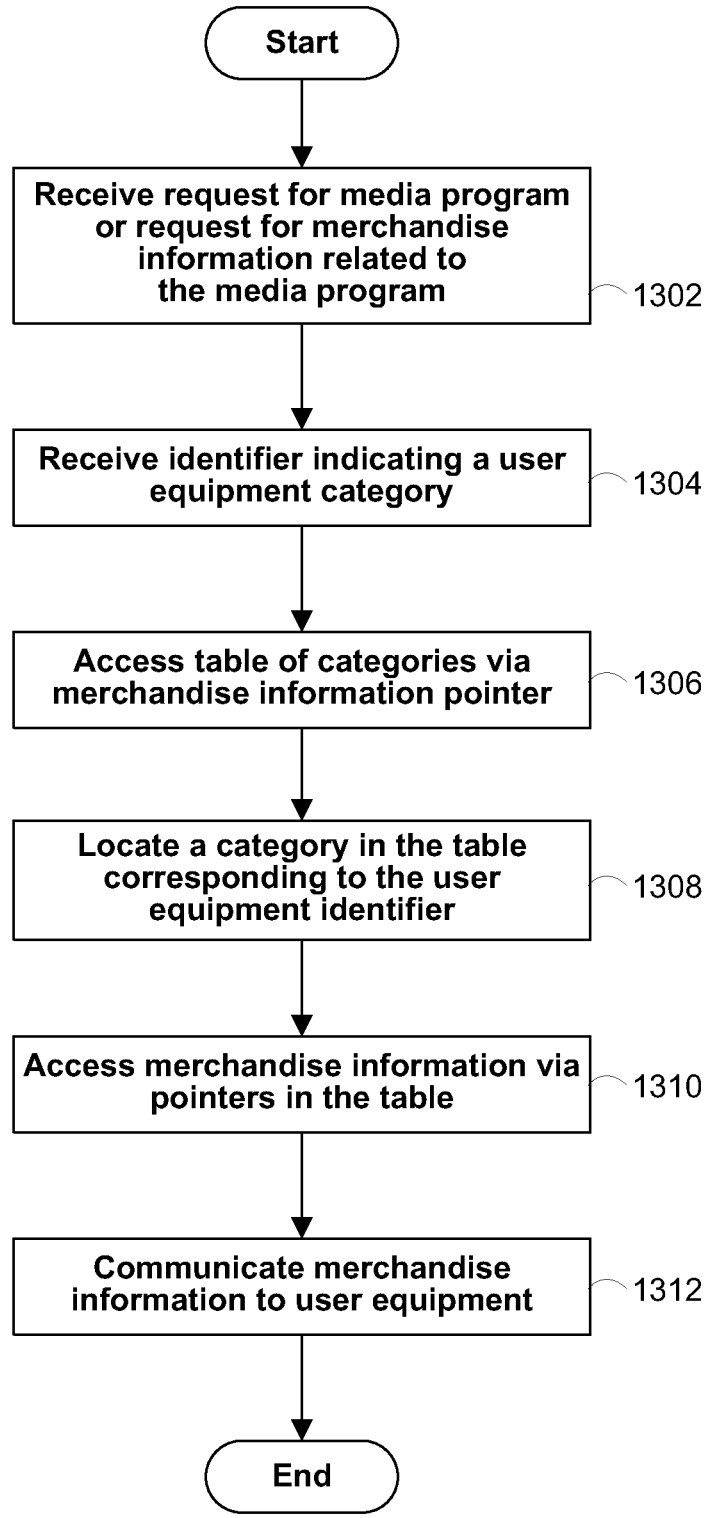
FIG. 13A is a flow diagram of exemplary operations for accessing and providing merchandise information based on a user equipment category.

Referring now to FIG. 13A and in accordance with one aspect of the invention, a distribution facility/server can receive a request for a media program from user equipment or receive a request for merchandise information related to the media program 1302. The request can, in one embodiment, include an identifier that indicates a category to which the user equipment belongs 1304. A distribution facility/server can access a table of categories associated with the requested media program by way of a merchandise information pointer 1306, as shown in FIGS. 11-12. Based on the user equipment identifier, the corresponding category in the table of categories can be accessed to select and provide the applicable merchandise information to the user equipment 1308-1312. In this manner, the distribution facility/server can tailor the purchase opportunities it provides to a user equipment by, for example, selecting purchase opportunities based on their applicability to one category of user equipment.

In a variation of the embodiment of FIG. 13A, a distribution facility/server can be in communication with many user equipment. In one embodiment, the distribution facility/server can include an online/networked interactive program guide that is in communication with many user equipment. The networked interactive program guide an be operable to receive a request for merchandise information from one user equipment, and the request can cause the networked interactive program guide to provide the merchandise information to another user equipment. For example, the server may be a home server that contains a networked interactive program guide. User equipment such as user computer equipment, user television equipment, or mobile/portable user equipment can be located in the home and can be in communication with the networked interactive program guide in the home server. In accordance with one aspect of the invention, a user of the television equipment can request, through the networked interactive program guide, for merchandise information related to a television program and tailored to a cellular telephone to be communicated to a cellular telephone in communication with the home server. In one embodiment, the user television equipment can provide, to the networked interactive program guide, an identifier indicating a category of user equipment associated with the cellular telephone. Based on the cellular telephone's category of user equipment, the networked interactive program guide can access merchandise information associated with the cellular telephone's category of user equipment, identify a cellular telephone in communication with the networked interactive program guide belonging to the category of user equipment, and communicate that merchandise information to the cellular telephone.

Figure 13B:
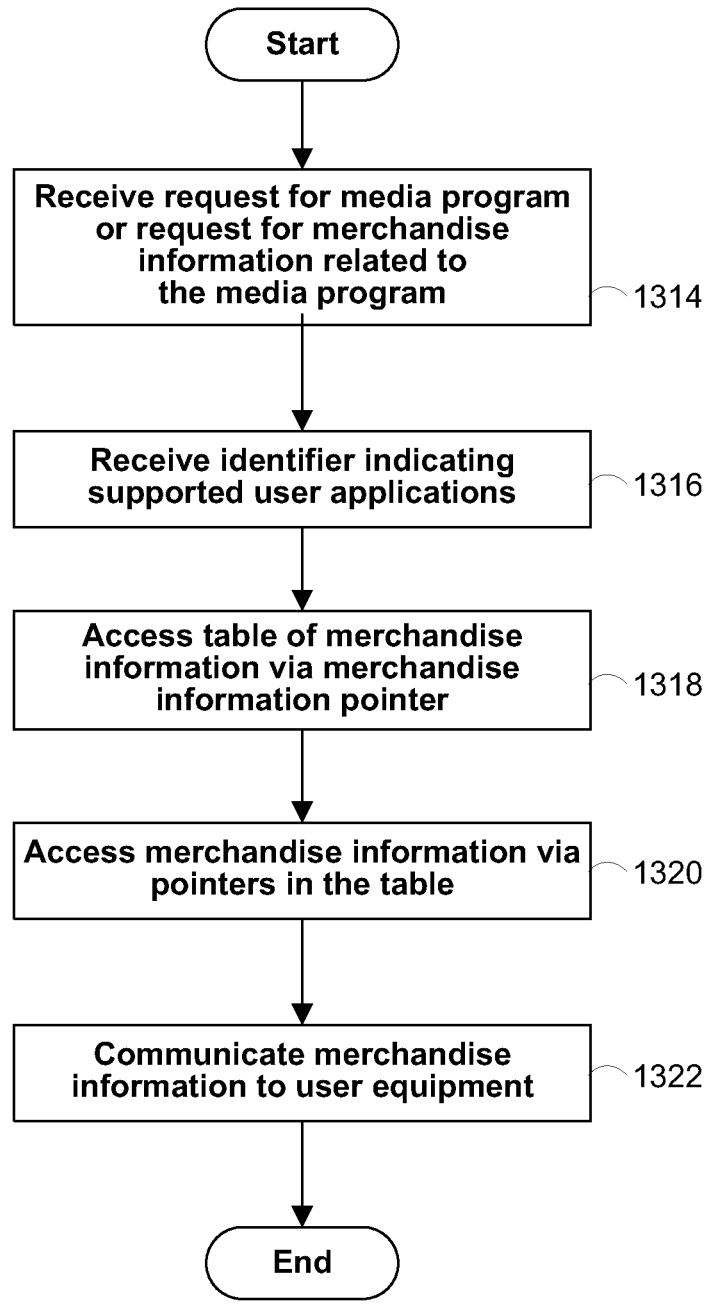
FIG. 13B is a flow diagram of exemplary operations for accessing and providing merchandise information based on supported applications.

FIG. 13B shows another embodiment of a user equipment request for a media program or for merchandise information related to a media program. A distribution facility/server can receive the request from user equipment 1314. The request can, in the illustrated embodiment, include an identifier that indicates application types that are supported by the user equipment 1316. A distribution facility/server can access a table merchandise information associated with the media program by way of a merchandise information pointer 1318, as shown in FIG. 11. Based on the received identifier, merchandise information having supported application types can be accessed and communicated to the user equipment 1320-1322.

In accordance with one aspect of the invention, merchandise information can be communicated to user equipment in various ways. If the media program is an analog signal, merchandise information can be communicated to the user equipment in the vertical blacking interval of the analog signal or in another suitable interval of the analog signal. In one embodiment, the merchandise information may not be communicated within the media program signal and can be communicated to the user equipment in an out-of-band analog channel. If the media program is a digital signal, the merchandise information can be communicated in a packet format within the media program, or can be communicated in a packet format separately from the media program. The merchandise information can be communicated in an in-band digital channel and/or in an out-of-band digital channel according to a digital communication protocol. One skilled in the art will recognize that existing analog and/or digital communications technologies can be used to communicate the merchandise information to the user equipment receiving the media program.

In one aspect of the invention, when user equipment receives merchandise information related to a media program, the user equipment can maintain/store the merchandise information directly within the media program. If the media program is an analog signal, merchandise information can be maintained/stored in the vertical blacking interval of the analog signal or in another suitable interval of the analog signal. The media program can be displayed and/or can be stored for later presentation. The analog signal can be stored in analog format or can be digitized and stored in digital format. If the media program is a digital signal, the merchandise information can be interleaved among the media program information. A digital media program can be displayed and/or can be stored for later presentation.

Figure 14:
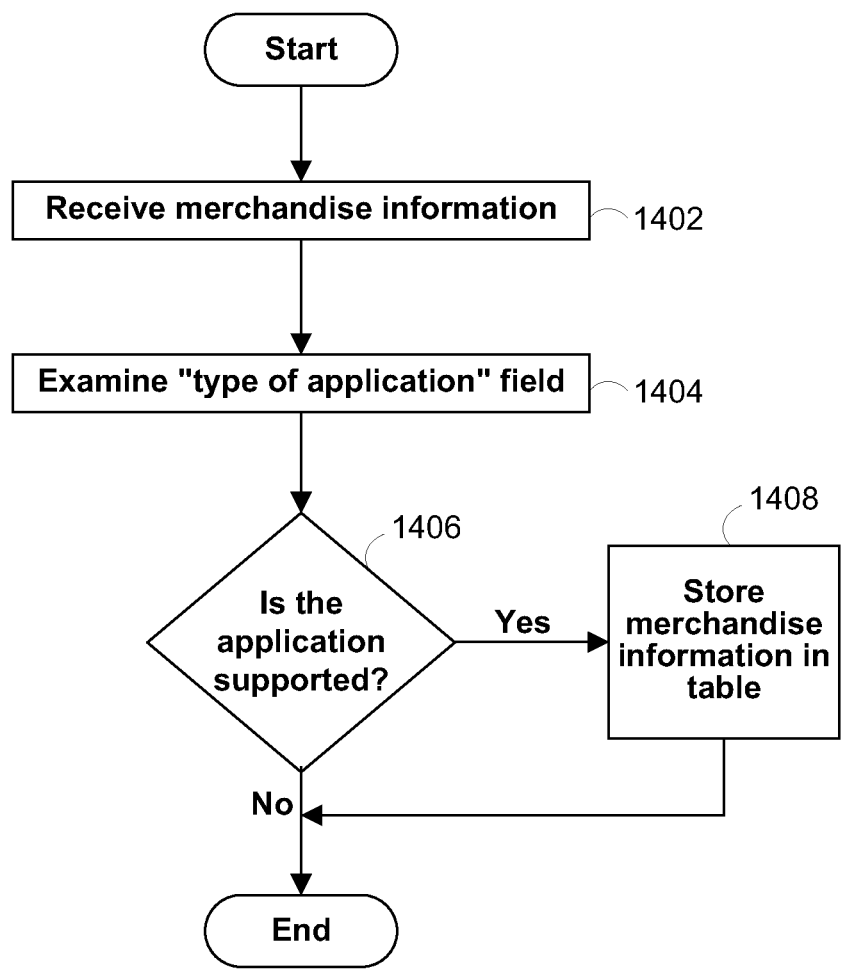
FIG. 14 is a flow diagram of exemplary user equipment operations for receiving and maintaining merchandise information.

In one aspect of the invention, when user equipment receives merchandise information related to a media program, the user equipment may store the merchandise information separately from the media program. In one embodiment, the user equipment can maintain and organize the received merchandise information in accordance with FIG. 10. Additionally, as shown in FIG. 14, user equipment may reject merchandise information for merchandise that it is incapable of using. A user equipment can receive merchandise information 1402 and can examine the "type of application" field of the merchandise information, if the field is present 1404. The user equipment can have a list of supported application types. If the indicated application is supported by the user equipment 1406, the merchandise information can be stored in a table 1408 according to FIG. 10. Otherwise, the merchandise information is not stored The following detailed description, in conjunction with FIGS. 15-19B, will now show various embodiments of notifying a user of the availability of merchandise related to a media program.

Figure 15:
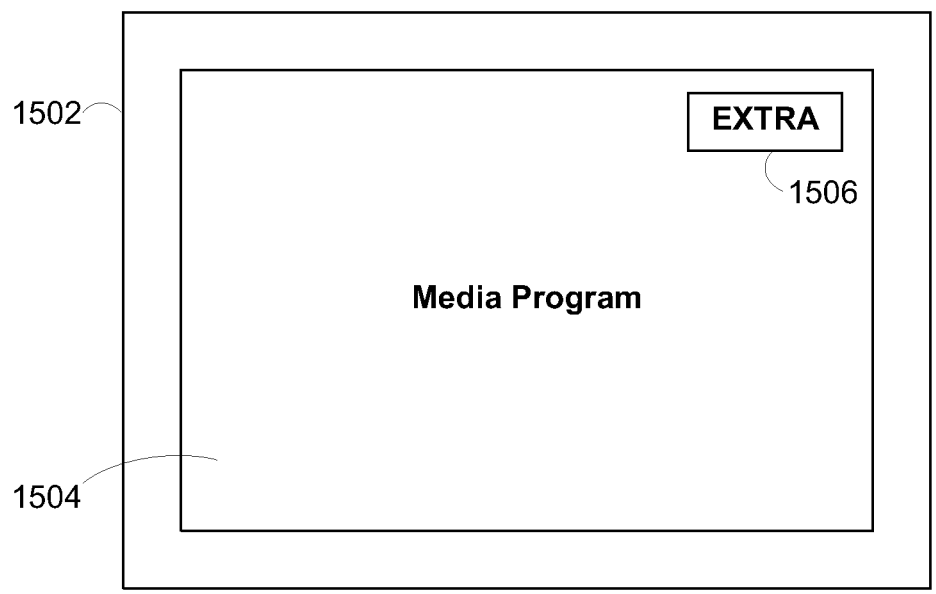
FIG. 15 is an exemplary screen display of an indication that merchandise related to a media program is available.

The illustrated embodiment of FIG. 15 includes a display screen 1502 that is displaying a media program 1504. The user equipment may have received merchandise information for merchandise related to the media program. If the user equipment has merchandise information, the display screen 1502 can provide an indication 1506 to notify the user of the availability of merchandise related to the media program. The visual indication 1506 can be an icon, text, or another symbol, and the indication can have various display characteristics, such as a blinking icon. The illustrated embodiment of FIG. 15 can be used to notify a user of merchandise related to the media program at a media program time specified in the merchandise information. In one embodiment, merchandise information can be stored within a media program. In one embodiment, merchandise information can be stored in a merchandise information table according to FIG. 10 and can be sorted in ascending order based on the media program time field in the merchandise information.

Figure 16A:
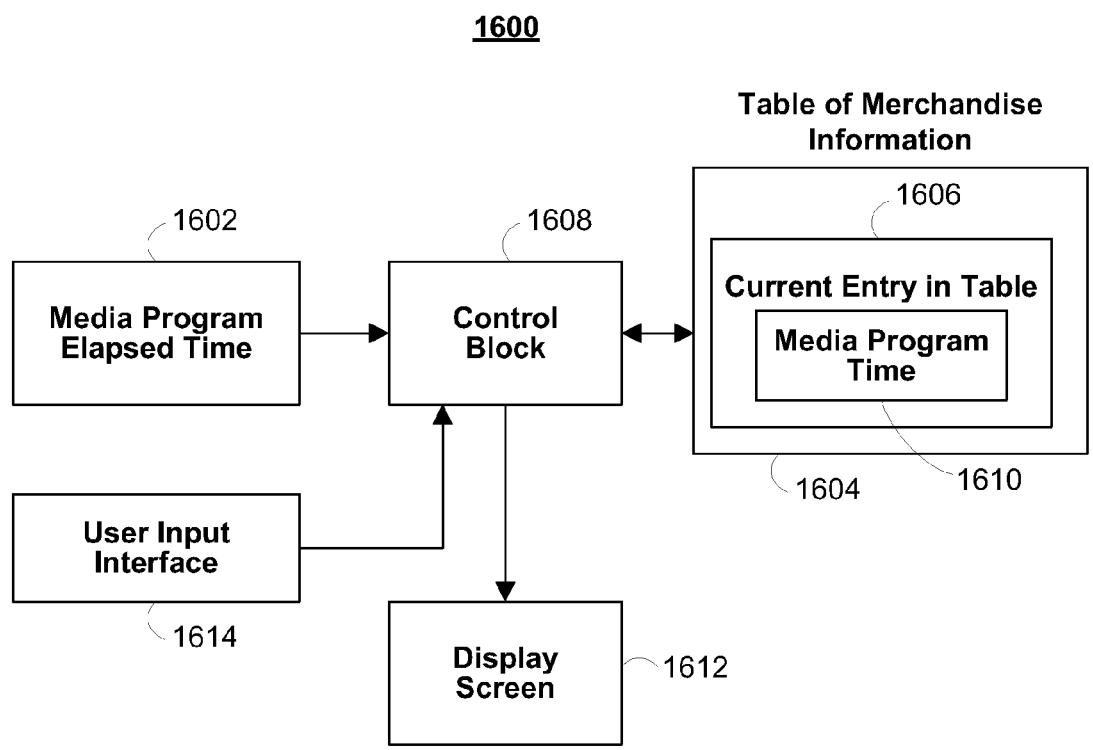
FIG. 16A is a block diagram of exemplary user equipment components.

Referring to FIG. 16A, the user equipment 1600 in the illustrated embodiment can keep track of the time elapsed 1602 in the media program while the media program is being presented. The user equipment can maintain a merchandise information table 1604 that is sorted according to media program time. The user equipment can keep track of a current entry 1606 in the merchandise information table. Initially, the current entry 1606 can be the first merchandise information in the table 1604. A control block 1608 in the user equipment can compare the media program elapsed time 1602 to the media program time 1610 in the current entry 1606 of the merchandise information table. In one embodiment, if the program elapsed time 1602 is greater than the media program time 1610 in the current table entry, the user equipment can display an indication in the display screen 1612 to notify the user of merchandise related to the media program. In one embodiment, the displayed indication can be removed from the display screen 1612 after a predetermined amount of time, if the user has not provided any indication 1614 that he is interested in the merchandise. In one embodiment, when the displayed indication is removed from the display screen 1612, the control block 1608 can instruct the merchandise information table 1604 to provide the next entry in the table.

Figure 16B:
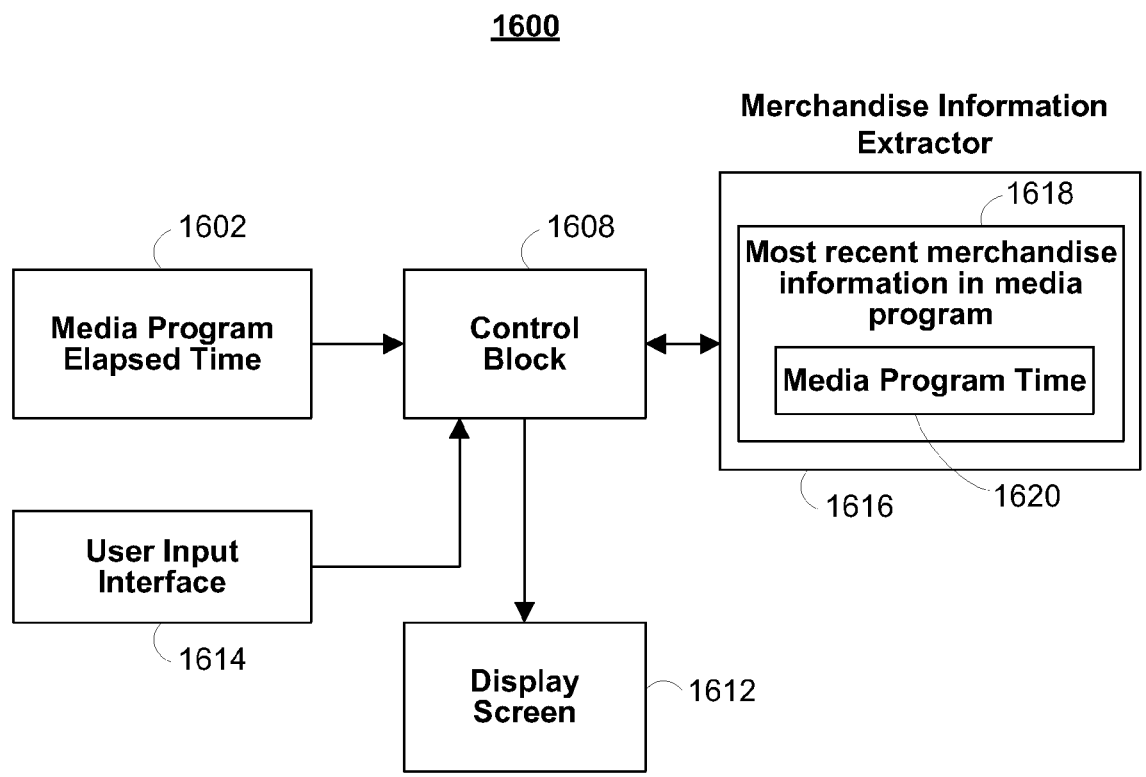
FIG. 16B is a block diagram of another embodiment of exemplary user equipment components.
Figure 17:
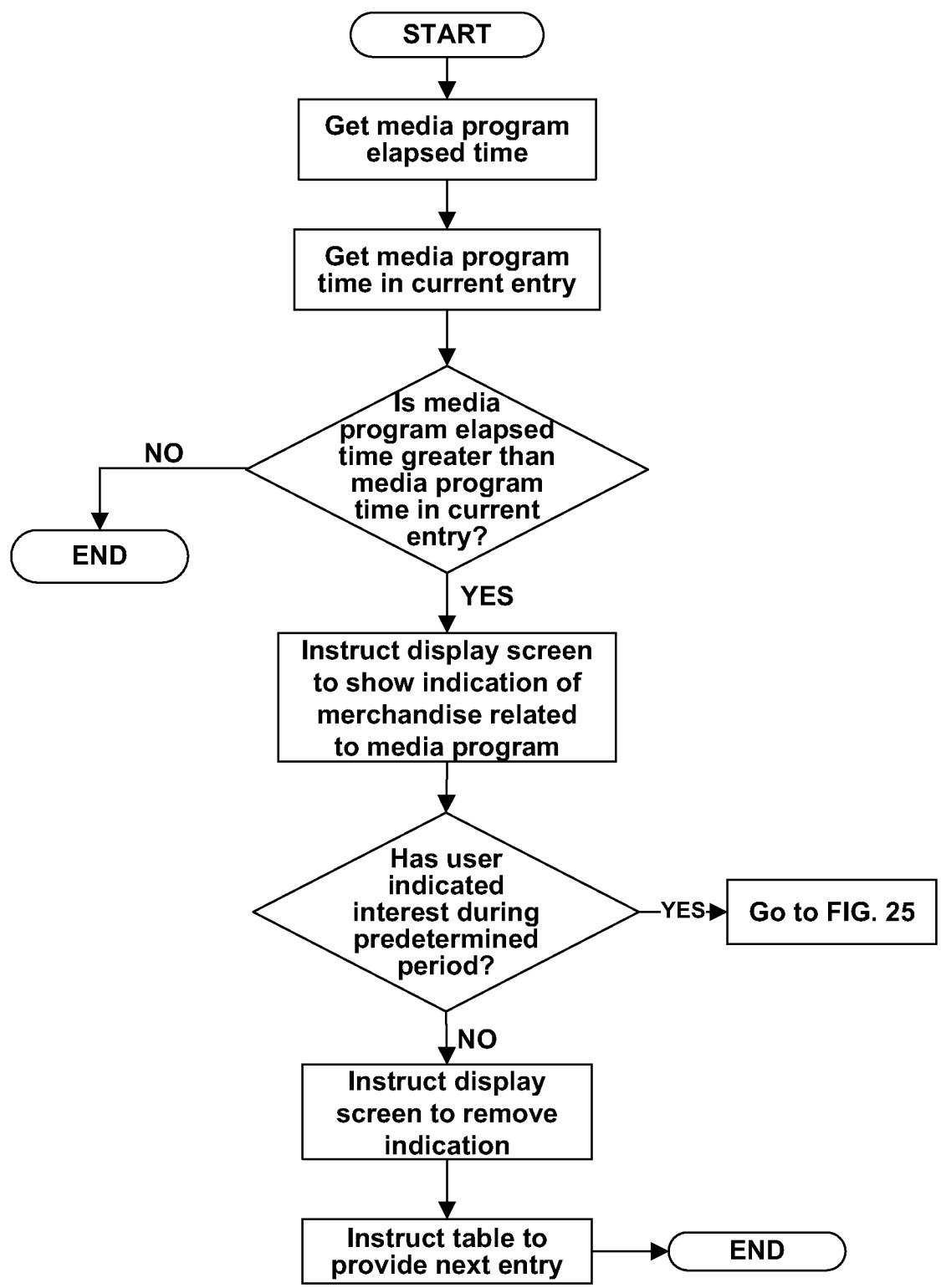
FIG. 17 is a flow diagram of exemplary user equipment operations for notifying a user of available merchandise related to a media program.

FIG. 16B shows a variation of the user equipment of FIG. 16A which includes a merchandise information extractor. The merchandise information extractor 1616 can extract merchandise information that is contained in a media program, such as in a vertical blanking interval of an analog signal or among media program data in a digital signal. One skilled in the art will recognize that such an extractor can be implemented in many ways. In the illustrated embodiment, the user equipment can keep track of the most recent merchandise information 1618 extracted from the media program. The control block 1608 in the user equipment can compare the media program elapsed time 1602 to the media program time 1620 in the most recently extracted merchandise information 1618 to determine whether or not to notify the user of merchandise related to the media program. FIG. 17 shows one embodiment of the operation of the control block of FIGS. 16A-16B. In one embodiment, the operation of FIG. 17 can be performed by the control block periodically.

Figure 18A:
FIG. 18A is an exemplary display screen of an indication that merchandise related to the media program is available.
Figure 18B:
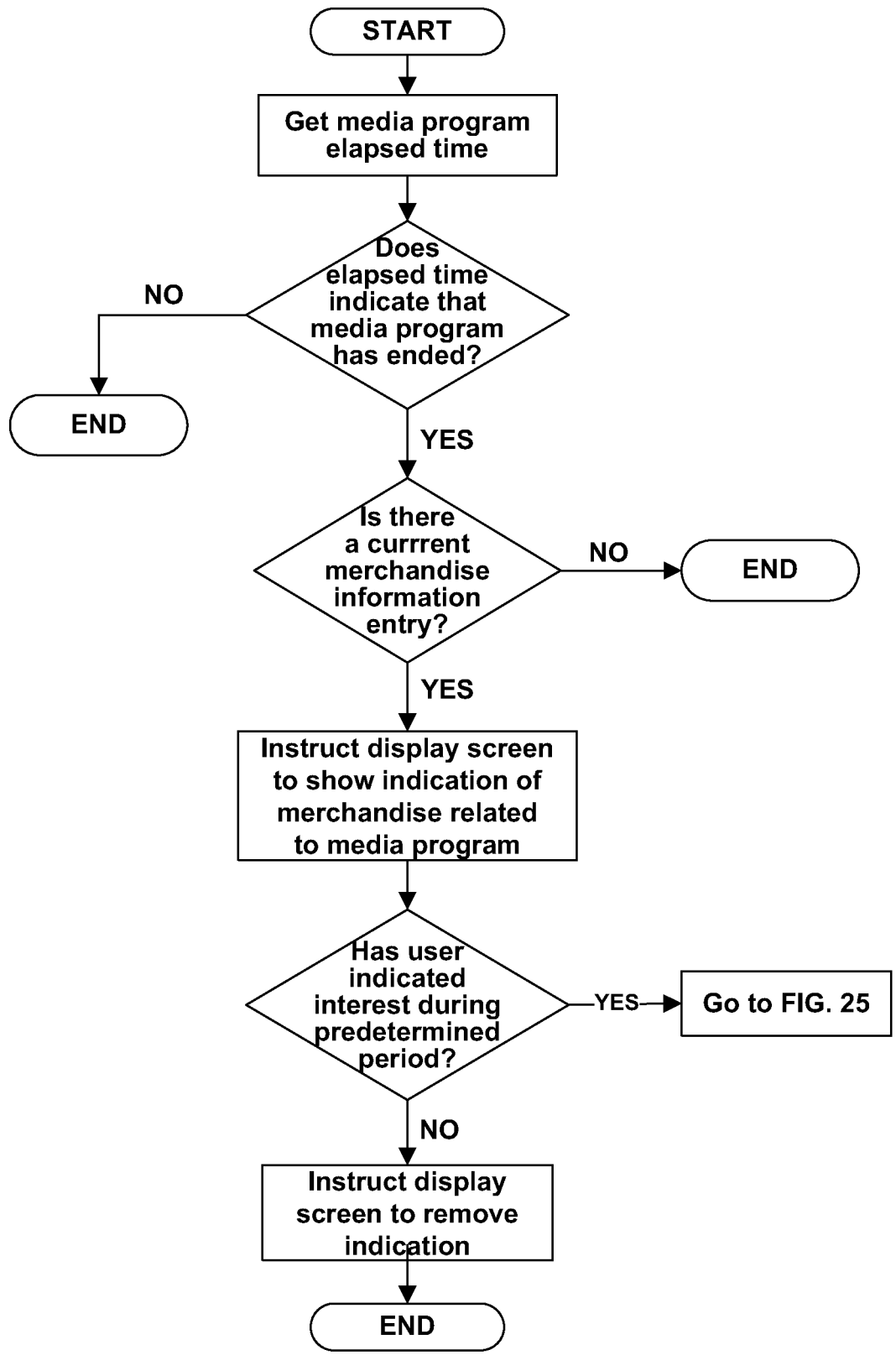
FIG. 18B is a flow diagram of exemplary user equipment operations for notifying a user of available merchandise related to a media program.

With continuing reference to FIG. 16A, as previously described herein, some merchandise may not be related to a particular scene in the media program. For such entries, the media program time field 1610 can have the maximum value allowed by the field. Therefore, the media program time field 1610 for such merchandise information will be greater than the final elapsed time 1602 at end of the media program. In one embodiment, the media program elapsed time 1602 can provide an indication to the control block 1608 when the media program that is being presented has ended. When this occurs, the control block 1608 can access the table of merchandise information 1604 to determine if there is a current merchandise information entry 1606. If so, a user can be notified at the end of the media program of any such remaining merchandise information, as shown by the notification screen of FIG. 18A, for example. As before, the notification screen can be removed if the user has not indicated interest in the merchandise after a predetermined period of time. This embodiment of the control block is shown in FIG. 18B.

Figure 19A:
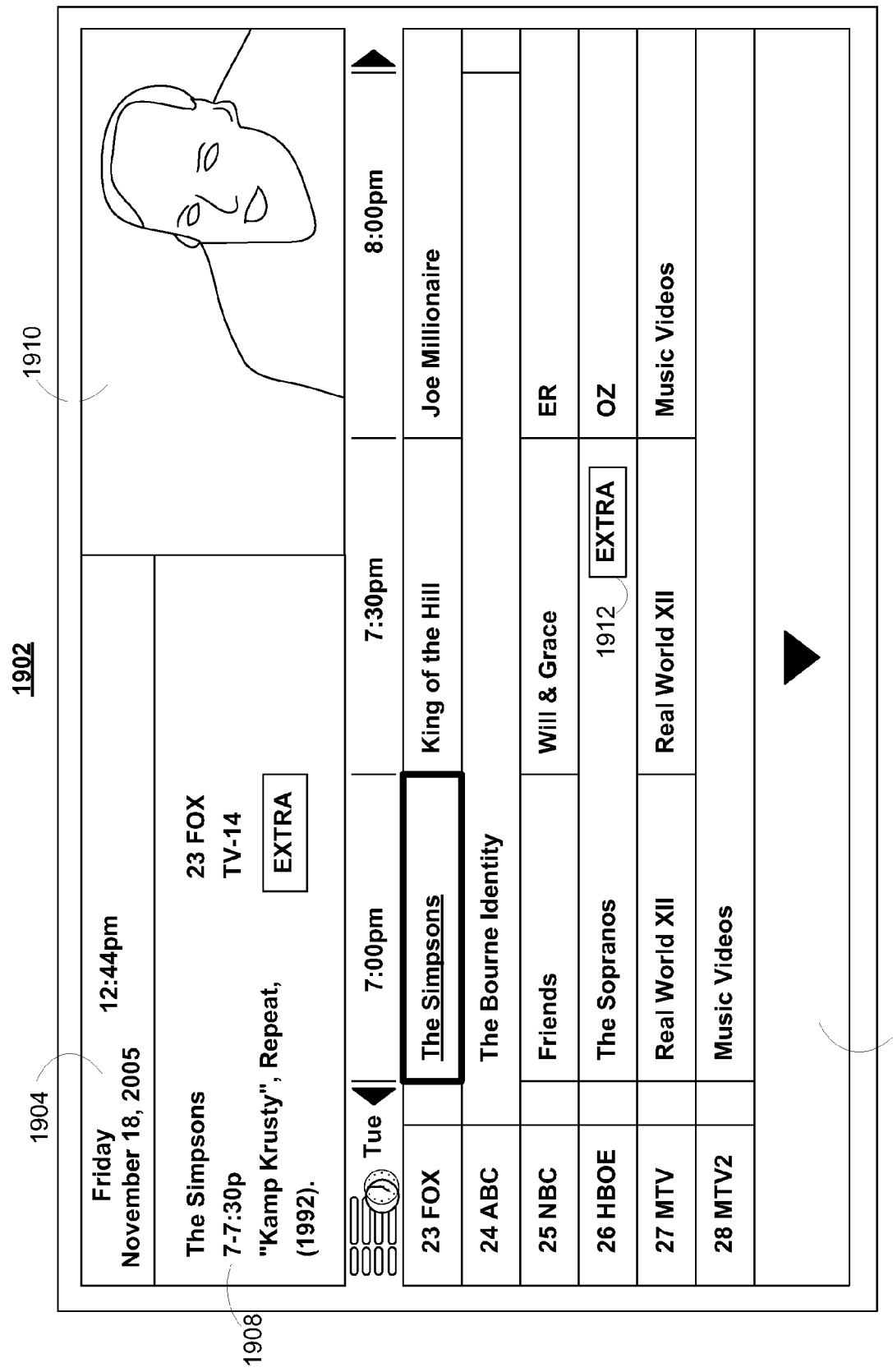
FIG. 19A is a diagram of a screen display of an exemplary interactive program guide for a larger display screen.

In accordance with one aspect of the invention, a user can be notified of the availability of merchandise information related to a media program separately from the presentation of the media program. Referring to FIG. 19A, there is shown a display screen 1902 of an exemplary interactive ("EPG") on a user equipment. The illustrated display screen 1902 has shows the current date and time 1904 and also includes a program listings region 1906, a program description region 1908, and a picture-in-guide (PIG) program display region 1910. Interactive program guides showing a program listings region, a program description region, and/or a PIG display region are described in, for example, U.S. Pat. Nos. 6,239,794, 6,563,515, and 6,564,378, which are incorporated herein by reference in their entirety.

Figure 19B:
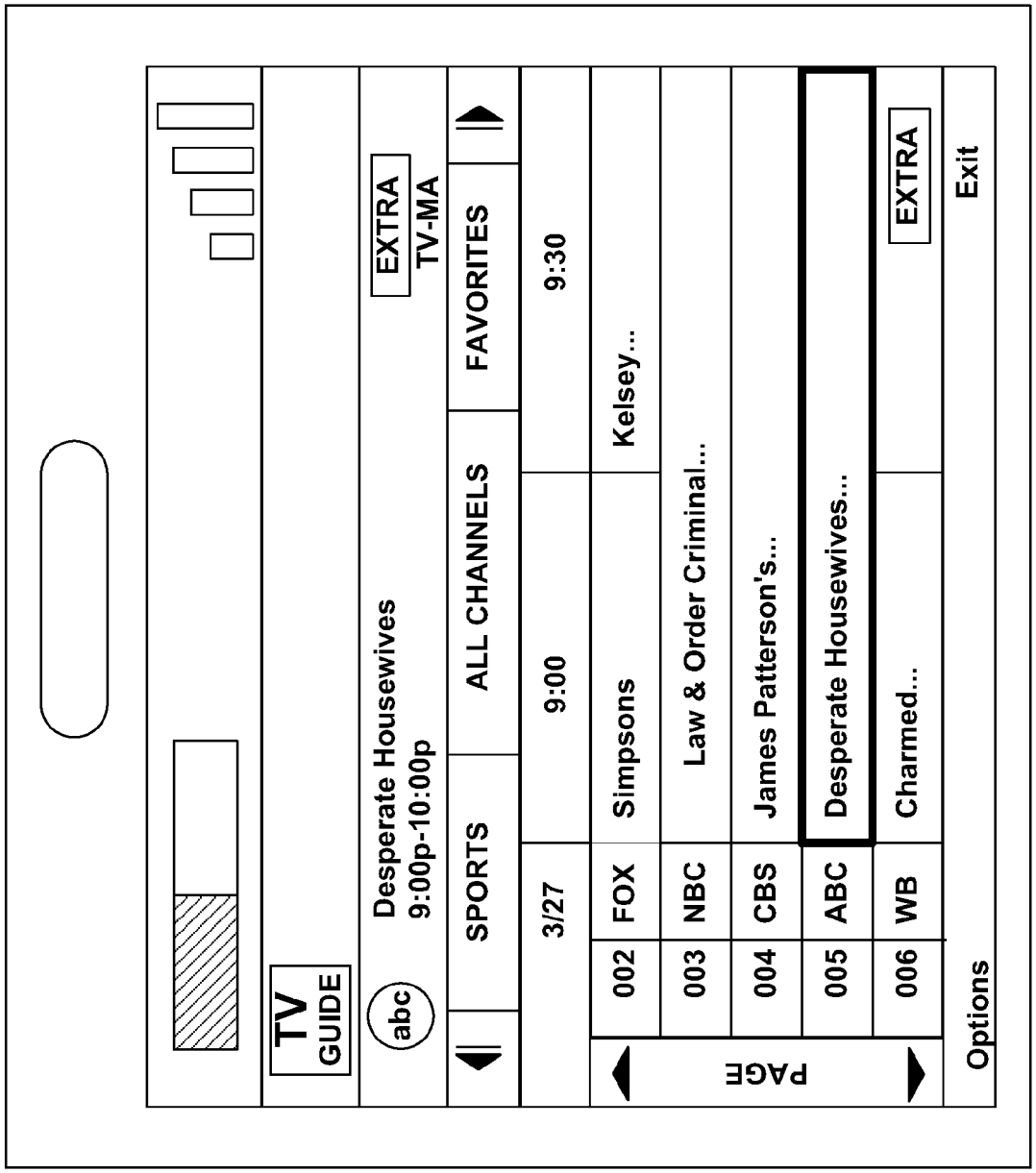
FIG. 19B is a diagram of a screen display of an exemplary interactive program guide for a smaller display screen.

As shown in FIG. 19A, a user can be notified of the availability of merchandise information related to a media program by indications shown in the interactive program guide. In one embodiment, an "EXTRA" indication can be shown in a particular program listing 1912 to indicate that merchandise information related to the program listing is available. The program listing can be associated with a media program that is scheduled to broadcast at a later time. For example, as shown in FIG. 19A, the current time is 12:44 pm and the media program "The Sopranos" is scheduled to air on channel twenty-six at 7:00 pm. Even though the media program is scheduled to air at a later time, the interactive program guide can have merchandise information for the media program by requesting and receiving merchandise information in accordance with FIGS. 13-14. The merchandise information can be organized in a table according to FIG. 10. In one embodiment, an "EXTRA" indication can be shown in the program description region 1908 to indicate that merchandise information related to the described program is available. FIG. 19B shows a display screen of a cellular telephone that is using an interactive program guide. The interactive program guide of FIG. 19B can also provide an "EXTRA" indication to notify a user that merchandise information related to a media program is available. In general, the interactive program guides shown in FIGS. 19A and 19B can reside on any type of user equipment.

Figure 20:
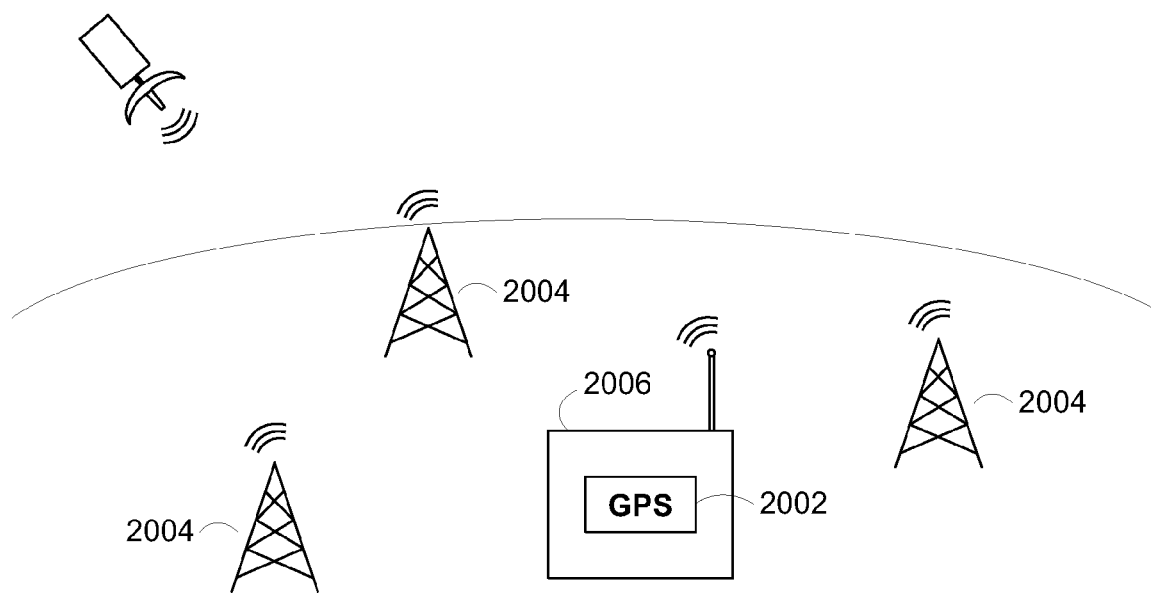
FIG. 20 is a diagram of exemplary location determination technologies.

In accordance with one aspect of the invention, merchandise information for merchandise related to a media program can be tailored to a particular physical location. Referring to FIG. 20, some mobile user equipment can include location determination technologies such as global positioning system ("GPS") 2002. Other mobile user equipment may not include location determination technologies, but their location can be determined by a network 2004 with which they are communicating. Typically, such networks include multiple communication sites 2004 that can collectively employ location triangulation technologies to locate the user equipment 2006.

Figure 21A:
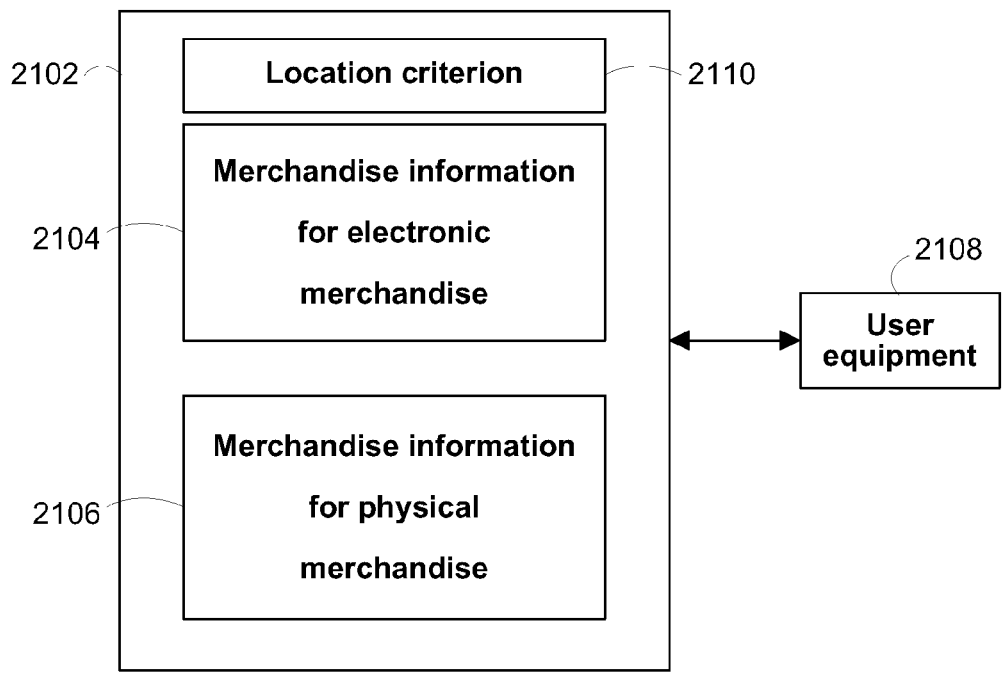
FIG. 21A is a block diagram of an exemplary configuration for organizing merchandise information.

As previously described herein in connection with FIG. 9, the location field of a merchandise information data structure can identify an electronic location of an electronic merchandise or a physical location of a physical merchandise. In one embodiment, as shown in FIG. 21A, a table of merchandise information can organize the merchandise information into separate groups that include a group of electronic merchandise 2104 and a group of physical merchandise 2106.

Figure 22:
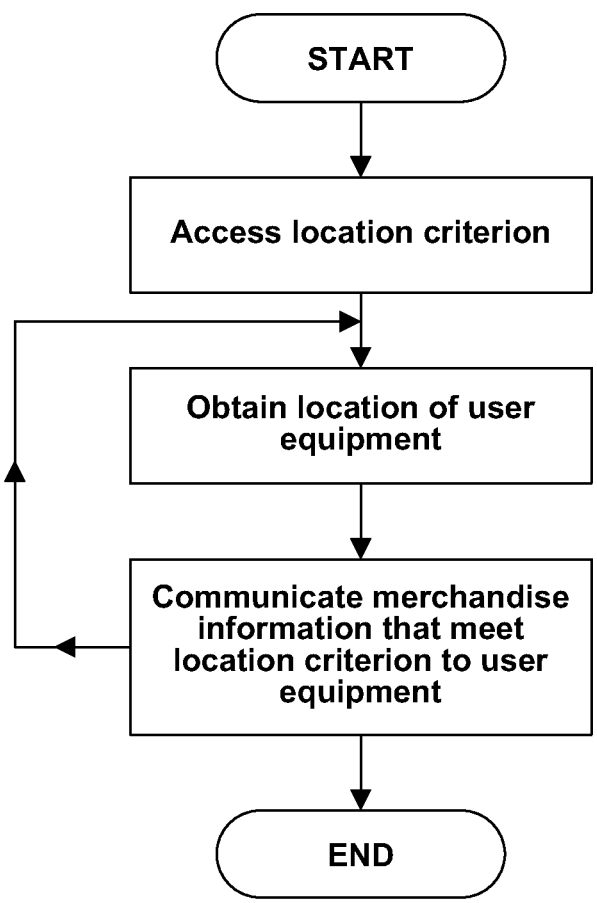
FIG. 22 is a flow diagram of exemplary media program source operations for communicating merchandise information to user equipment.

In one embodiment, the user equipment 2108 and/or the source of the media program 2102 (e.g., a distribution facility) can determine the location of the user equipment 2108 and can share the location information with each other. The source of the media program 2102 can limit the communication of physically located merchandise information 2106 to only those that satisfy one or more location criteria 2110. For example, the source of the media program 2102 can limit the communication of physically located merchandise information 2106 to only those that are located in the same zip code or within one neighboring zip code of the location of the user equipment 2108, or to those that are located within a particular radius of the location of the user equipment 2108. The media program source can obtain updates on the location of the user equipment 2108. This embodiment of the operation of a media program source 2102 is shown in FIG. 22.

In one embodiment, the user equipment 2108 can also maintain a table of merchandise information for physical merchandise 2106 and can maintain one or more location criteria 2110. In this embodiment, the user equipment 2108 can request and receive all or a portion of the merchandise information for physical merchandise 2106 from the media program source 2102. The user equipment 2108 can process its own table of merchandise information 2102 to select the merchandise information 2106 that meet its location criterion 2110.

Figure 21B:
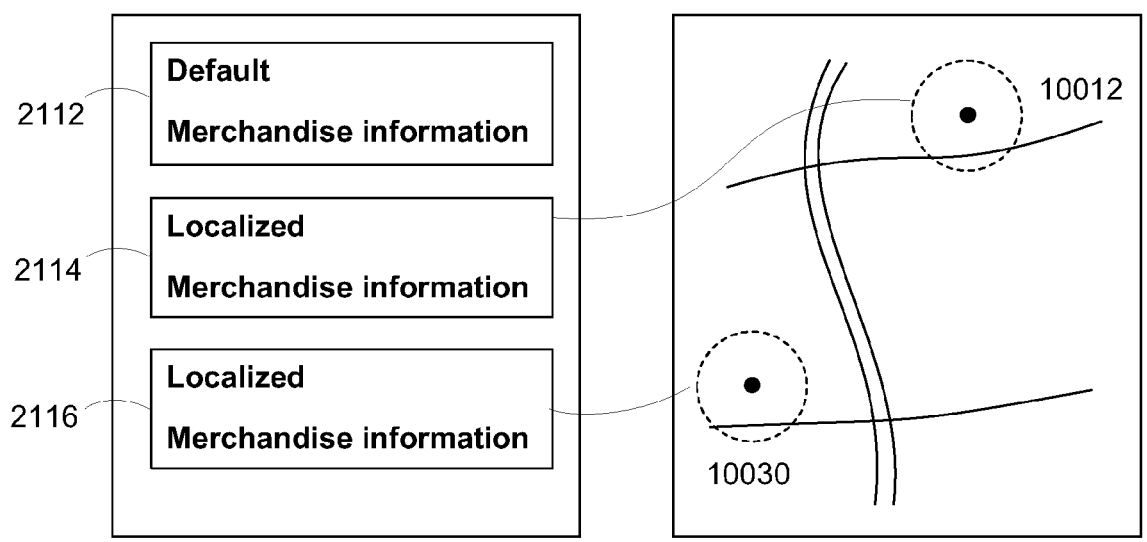
FIG. 21B is a block diagram of exemplary location-specific merchandise information.

In one embodiment, as shown in FIG. 21B, a table of merchandise information for physical merchandise can include default merchandise information 2112 as well as localized merchandise information 2114, 2116. The localized merchandise information 2114, 2116 can correspond to particular physical locations, such as a zip code, for example. In the illustrated embodiment, one localized merchandise information 2114 corresponds to a zip code of "10012", and another located merchandise information 2116 corresponds to a zip code of "10030". Therefore, if a user equipment is within those zip codes, the localized merchandise information 2114, 2116 corresponding to those zip codes can be made available to a user. However, if a user equipment is in an area that has no localized merchandise information, the default merchandise information 2112 can be made available to a user. The default merchandise information 2112 and the localized merchandise information 2116 can be implemented according to the data structure of FIG. 9.

Figure 23:
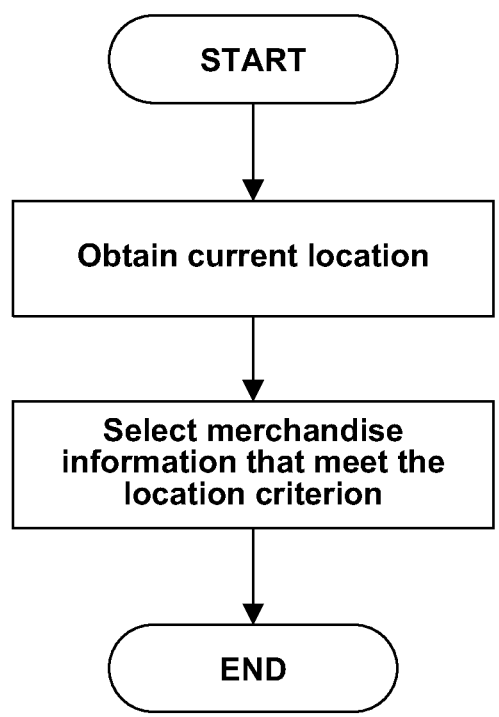
FIG. 23 is a flow diagram of exemplary user equipment operations for requesting merchandise information.

With continuing reference to FIG. 21B, the user equipment can periodically or continuously determine its location if the user equipment is GPS-enabled, or the user equipment can request for the network to triangulate the user equipment's location, and the triangulated location can be communicated to the user equipment. This embodiment of the operation of the user equipment is shown in FIG. 23. The user equipment can notify the user of the availability of merchandise related to the media program being presented in accordance with FIGS. 15-19.

Figure 24A:
FIG. 24A is an exemplary screen display of an advertisement indicating that merchandise related to a media program is available.
Figure 24B:
FIG. 24B is an exemplary screen display of a sponsored advertisement.
Figure 24C:
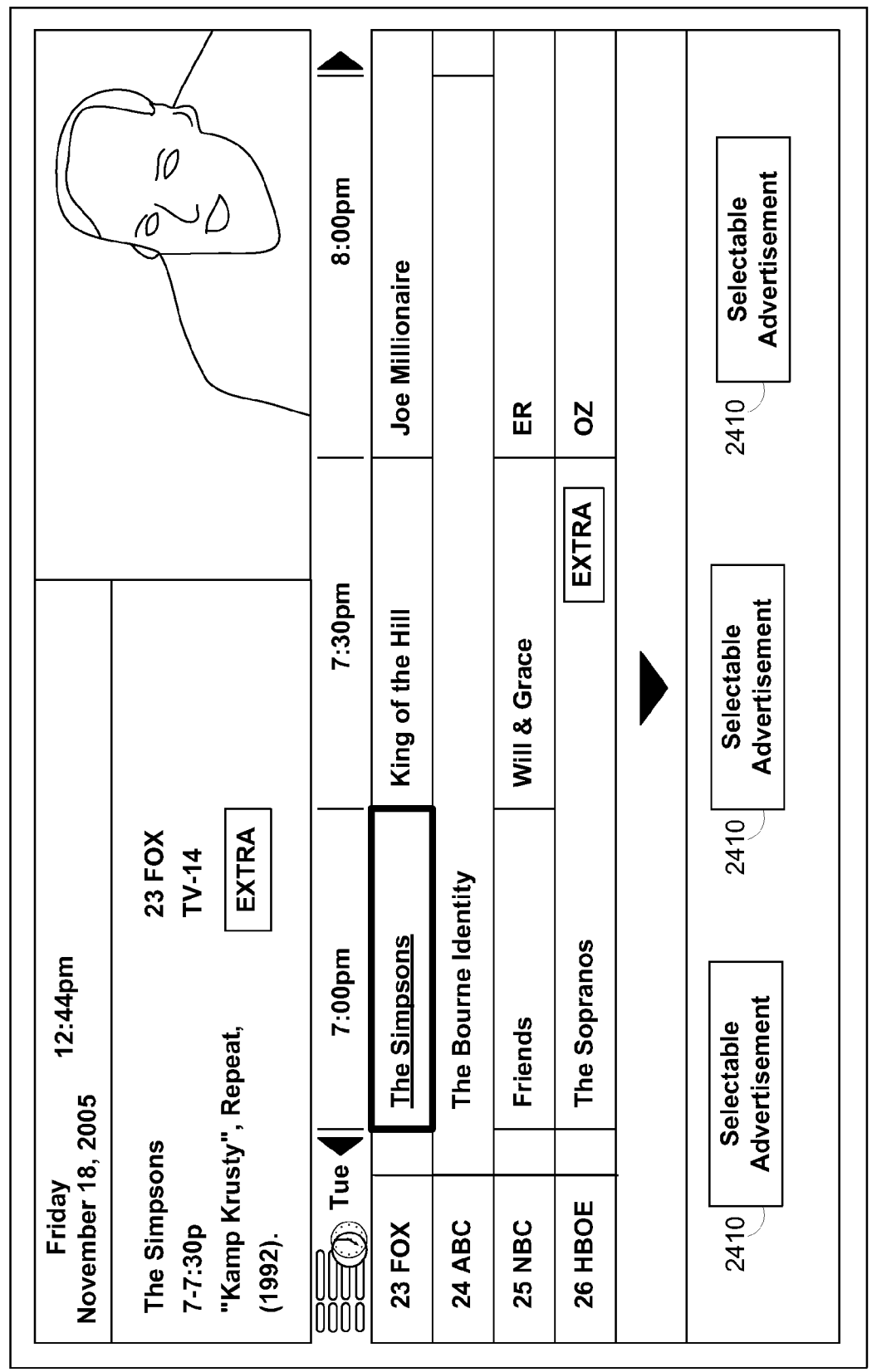
FIG. 24C is a diagram of a screen display of an exemplary interactive program guide having advertisement regions.

In accordance with one aspect of the present invention, a user can be notified of the availability of physical merchandise related to a media program by an advertisement, as shown in FIGS. 24A-24C. In one embodiment, a media program may have time segments that are designated for advertisements, or the user equipment may be configured to periodically pause the media program in order to present an advertisement. In such an embodiment, the user equipment can notify the user of the availability of physical merchandise related to a media program in an advertisement, such as an advertisement 2402 is shown in FIG. 24A. In one embodiment, the advertisement 2402 can be based on the merchandise description field of the merchandise information data structure (910, FIG. 9). As described above herein, a description field (910, FIG. 9) can contain multimedia content, such as video, graphics, and/or text. The merchandise information can be stored in a table according to FIG. 10. The table can be located at the user equipment or at a server/distribution facility. The merchandise information may or may not be related to the media program that is paused to show the advertisement. However, as described above herein, the merchandise information can be selected based on the location of the user equipment and a location criterion. Additionally, the user equipment or the server/distribution facility can select the particular merchandise information to show based on various business models. For example, merchandise vendors can pay advertisement fees to give their merchandise information priority over others. The merchandise information may be default merchandise information (2112, FIG. 21B) or localized merchandise information (2114, 2116, FIG. 21B).

In accordance with one aspect of the present invention, a user can be notified of the availability of physical merchandise related to a media program by an advertisement sponsor notice 2404. In one embodiment, the advertisement 2406 need not be related to the media program that is being shown, but the sponsor notice 2404 and the advertisement 2406 can both be related to a media program. For example, as shown in FIG. 24B, an advertisement 2406 for the television program M*A*S*H can be shown, and a sponsor notice 2404 related to M*A*S*H can also be shown. In one embodiment, the sponsor notice 2404 can be based on the merchandise description field (910, FIG. 9) of a merchandise information data structure. As described above herein, the merchandise information can be selected based on the location of the user equipment and a location criterion. The merchandise information may be default merchandise information (2112, FIG. 21B) or localized merchandise information (2114, 2116, FIG. 21B).

In another embodiment, a user can be notified of the availability of merchandise information in an advertisement region of an interactive program guide, as shown in FIG. 24C. The display screen 2408 shown in FIG. 24C shows one embodiment of an interactive program guide that includes one or more selectable advertisement regions 2410 in addition to the interactive program guide of FIG. 19A. In one embodiment, the interactive program guide can notify a user of the availability of merchandise information by displaying the description field (910, FIG. 9) of merchandise information in an advertisement area 2410. As described above herein, the merchandise information can be selected based on the location of the user equipment and a location criterion. Additionally, the interactive program guide or the server/distribution facility can select the particular merchandise information to show in the advertisement region 2410 based on various business models. For example, merchandise vendors can pay advertisement fees to have their merchandise information displayed as an advertisement at regular intervals.

Figure 25:
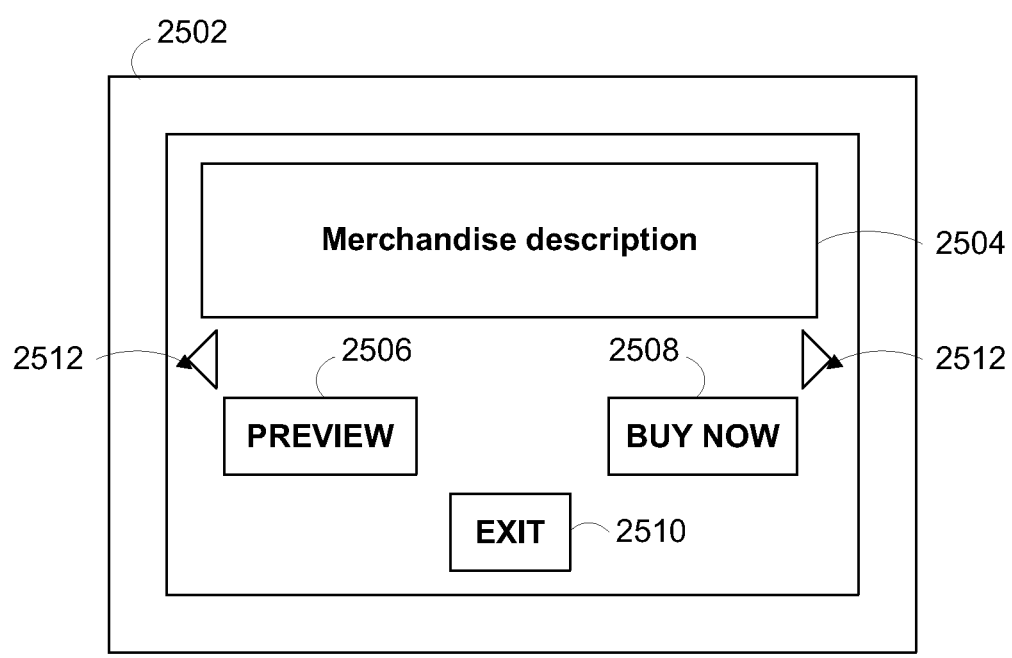
FIG. 25 is an exemplary screen display of providing a merchandise description and a purchase opportunity to a user.
Figure 26:
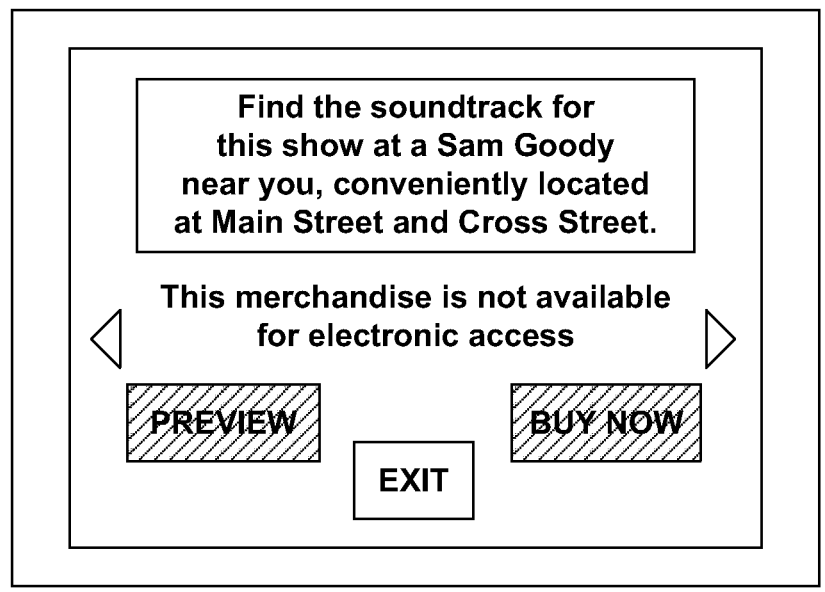
FIG. 26 is an exemplary screen display of providing merchandise description to a user.

The following detailed description, in conjunction with FIGS. 25-26, will describe operations for interacting with a user who has indicated an interest in a merchandise related to a media program.

As previously described herein in connection with FIGS. 15 and 18, a user can be notified of merchandise related to a media program. In one embodiment, a user can indicate interest in the merchandise by clicking on the indication displayed on the screen if the user equipment has a pointer user interface, or by pressing a user interface button associated with the displayed indication.

With reference to FIG. 25, in one embodiment, the user equipment can respond to the user indication of interest by presenting, on a display screen 2502, a description of the merchandise (910, FIG. 9) and by providing options for the user to preview the merchandise 2506, purchase the merchandise 2508, or return to the media program 2510. In one embodiment, the preview and purchase selections 2506,2508 can be available only if the merchandise is electronically located and can be accessed by the user equipment. In one embodiment, if the user selects the "PREVIEW" selection 2506, the user equipment can access the merchandise at the electronic location specified in the merchandise information and can present the merchandise to the user. In one embodiment, if the user selects the "BUY NOW" selection 2508, the user equipment can communicate with a shopping service of a service provider to transact the purchase, as described in connection with FIG. 1. In one embodiment, if the user selects the "EXIT" selection 2510, the display screen of FIG. 25 can be removed and the display screen can return to displaying the media program or otherwise. The display screen can also provide the user with options to view other merchandise information by providing interactive arrows 2512. When an arrow 2512 is selected, the table of merchandise information can access another merchandise information data structure and provide the corresponding merchandise description to the display screen. FIG. 26 illustrates a display screen which shows that the merchandise is not available for electronic access and which has disabled the "PREVIEW" and "BUY NOW" selections.

In one embodiment, the screens of FIGS. 25 and 26 can be overlays that cover the media program being presented. When a user selects the "EXIT" selection, the overlay can be removed to show the media program. Variations of the illustrated overlays are contemplated. For example, the overlay can cover only part of the display screen rather than the entire display screen, or the overlay can be translucent.

In one embodiment, if the media program is not being presented in real-time and it is possible to pause the media program, the user equipment can pause the presentation of the media program to allow the user to pursue interest in the merchandise related to the media program without missing a portion of the media program.

Figure 27:
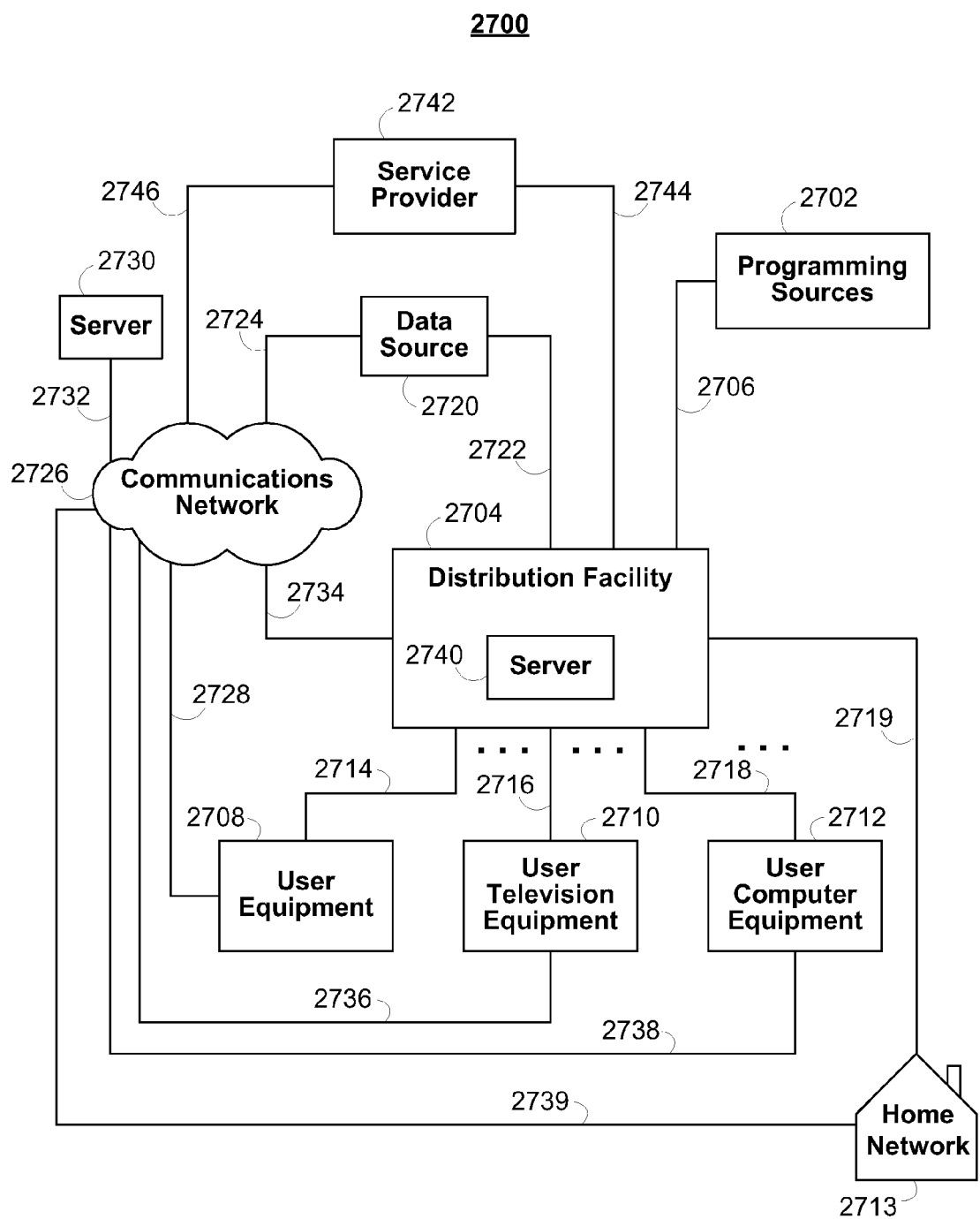
FIG. 27 is a block diagram of an exemplary interactive media guidance system.

In accordance with one aspect of the invention, the foregoing systems, devices, and methods described herein can be implemented in an interactive media guidance system. An illustrative interactive media guidance system 2700 in accordance with the present invention is shown in FIG. 27. System 2700 is intended to illustrate a number of approaches by which media of various types, and guidance for such media, may be provided to (and accessed by) various types of user equipment. The present invention, however, may be applied in systems employing any one or a subset of these approaches, or in systems employing other approaches for delivering media and providing media guidance.

The first approach represents a typical television-centric system in which users may access television (and in some systems music) programming. This includes programming sources 2702 and distribution facility 2704. Media such as television programming and digital music is provided from programming sources 2702 to distribution facility 2704, using communications path 2706. Communications path 2706 may be a satellite path, a fiber-optic path, a cable path, or any other suitable wired or wireless communications path or combination of such paths.

Programming sources 2702 may be any suitable sources of television and music programming, such as television broadcasters (e.g., NBC, ABC, and HBO) or other television or music production studios. Programming sources 2702 may provide television programming in a variety of formats in high definition and standard definition, such as, for example, 1080p, 1080i, 720p, 480p, 480i, and any other suitable format.

Distribution facility 2704 (also represented as 802, FIG. 8) may be a cable system headend, a satellite television distribution facility, a television broadcaster, or any other suitable facility for distributing video media (e.g., television programs, video-on-demand programs, pay-per-view programs) and audio media (e.g., music programming and music clips) to the equipment of subscribers of the corresponding cable, satellite, or IPTV system, such as the user equipment of FIGS. 1-6. In some approaches, distribution facility 2704 (also represented as 802, FIG. 8) may also distribute merchandise information and/or electronic merchandise to users, such as video and audio clips, web pages, gaming applications, ring tones, wallpapers, screen savers, user interface skins, and interactive applications. There are typically numerous television distribution facilities 2704 in system 2700, but only one is shown in FIG. 27 to avoid overcomplicating the drawing.

Distribution facility 2704 (also represented as 802, FIG. 8) may be connected to various user equipment devices 2708, 2710, and 2712, such as the user equipment of FIGS. 1-6. Such user equipment devices may be located, for example, in the homes of users. User equipment devices may include user television equipment 2710, user computer equipment 2712, or any other type of user equipment suitable for accessing media, such as the user equipment of FIGS. 1-6. User equipment 2708 may be any type of user equipment (e.g., user television equipment, user computer equipment, cellular phones, handheld video players, gaming platforms, etc.) and, for simplicity, user equipment devices may be referred to generally as user equipment 2708.

User equipment devices 2708, 2710, and 2712 (e.g., FIGS. 1-6) may receive media (such as television, music, web pages, etc.) and other data, such as merchandise information and electronic merchandise from FIG. 8, from distribution facility 2704 (also represented as 802, FIG. 8) over communications paths, such as communications paths 2714, 2716, and 2718, respectively. User equipment devices 2708, 2710, 2712 may also transmit signals to distribution facility 2704 over paths 2714, 2716, and 2718, respectively, where the signals can be associated with operations 1302, 1304 from FIG. 13. Paths 2714, 2716, and 2718 may be cables or other wired connections, free-space connections (e.g., for broadcast or other wireless signals), satellite links, or any other suitable link or combination of links.

A second approach illustrated in FIG. 27 by which media and media guidance are provided to end users is a non-television-centric approach. In this approach media such as video (which may include television programming), audio, images, web pages, or a suitable combination thereof, are provided to equipment of a plurality of users (e.g., user equipment 2708, user television equipment 2710, and user computer equipment 2712) by server 2730 (also represented as 802, FIG. 8) via communications network 2726. This approach is non-television-centric because media (e.g., television programming) is provided by and delivered at least partially, and sometimes exclusively, via equipment that have not traditionally been primarily focused on the television viewing experience. Non-television-centric equipment is playing a larger role in the television viewing experience.

In some embodiments for this approach, communications network 2726 is the Internet. Server 2730 (also represented as 802, 814, FIG. 8) may provide for example, a web site that is accessible to the user's equipment (e.g., equipment of FIGS. 1-6) and provides an on-line guidance application for the user. In such approaches, the user's equipment may be, for example, a PC or a hand-held device such as a PDA or web-enabled cellular telephone that incorporates a web browser (e.g., equipment of FIG. 5). In other embodiments, server 2730 (also represented as 802, FIG. 8) uses the Internet as a transmission medium but does not use the Web. In such approaches, the user's equipment may run a client application that enables the user to access media. In still other approaches, communications network 2726 is a private communications network, such as a cellular phone network, that does not include the Internet.

In yet other approaches, communications network 2726 includes a private communications network and the Internet. For example, a cellular telephone or other mobile-device service provider may provide Internet access to its subscribers via a private communications network, or may provide media such as video clips or television programs to its subscribers via the Internet and its own network.

The aforementioned approaches for providing media may, in some embodiments, be combined. For example, a distribution facility 2704 (also represented as 802, FIG. 8) may provide a television-centric media delivery system, while also providing users' equipment (e.g., 2708, 2710 and 2712) with access to other non-television-centric delivery systems provided by server 2730. For example, a user's equipment may include a web-enabled set-top box (e.g., 104, FIG. 1) or a television enabled PC (e.g., 302, FIG. 3). Distribution facility 2704 may, in addition to television and music programming, provide the user with Internet access whereby the user may access server 2730 via communications network 2726. Distribution facility 2704 may communicate with communications network 2726 over any suitable path 2734, such as a wired path, a cable path, fiber-optic path, satellite path, or combination of such paths.

Media guidance applications may be provided using any approach suitable for the type of media and server/distribution system for which the applications are used. Media guidance applications may be, for example, stand alone applications implemented on users' equipment. In other embodiments, media guidance applications may be client-server applications where only the client resides on the users' equipment. In still other embodiments, guidance applications may be provided as web sites accessed by a browser implemented on the users' equipment. The exemplary user equipment of FIGS. 1-6 may use one or more such media guidance applications. Whatever the chosen implementation, the guidance application will require information about the media for which it is providing guidance. For example, titles or names of media, brief descriptions, or other information may be necessary to allow users to navigate among and find desired media selections.

In some television-centric embodiments, for example, the guidance application may be a stand-alone interactive television program guide that receives program guide data via a data feed (e.g., a continuous feed, trickle feed, or data in the vertical blanking interval of a channel). Data source 2720 in system 2700 may include a program listings database that is used to provide the user with television program-related information such as scheduled broadcast times, titles, channels, ratings information (e.g., parental ratings and critic's ratings), detailed title descriptions, genre or category information (e.g., sports, news, movies, etc.), program format (e.g., standard definition, high definition) and information on actors and actresses. Data source 2720 may also be used to provide advertisements and/or merchandise information (806, FIG. 8; 900, FIG. 9) (e.g., program guide advertisements and advertisements for other interactive television applications), real-time data such as sports scores, stock quotes, news data, and weather data, application data for one or more media guidance applications or other interactive applications, electronic merchandise (808, FIG. 8), and any other suitable data for use by system 2700. As another example, data source 2720 may provide data indicating the types of information that may be included in interactive media guidance overlays (e.g., at the request of the user, absent user modification, etc.).

Program guide data such as media programs or merchandise information may be provided to user equipment, including user equipment located on home network 2713, using any suitable approach. For example, program schedule data and other data such as merchandise information or electronic merchandise may be provided to the user equipment on a television channel sideband, in the vertical blanking interval of a television channel, using an in-band digital signal, using an out-of-band digital signal, or by any other suitable data transmission technique. Program schedule data and other data may be provided to user equipment on multiple analog or digital television channels. Program schedule data and other data may be provided to the user equipment with any suitable frequency (e.g., continuously, daily, in response to a request from user equipment, etc.). Program schedule data or merchandise information can be provided to user equipment from a home server (also represented as 802, FIG. 8) on the home network 2713. The home server can be in communication with a distribution facility 2704 or a communications network 2726.

In some television-centric embodiments, guidance data from data source 2720 may be provided to users' equipment using a client-server approach. For example, a guidance application client residing on the user's equipment may initiate sessions with server 2740 to obtain guidance data when needed. In some embodiments, the guidance application may initiate sessions with server 2740 via a home network server (e.g., a server located in home network 2713 that supports the user equipment devices located in home network 2713).

There may be multiple data sources (such as data source 2720) in system 2700, although only one data source is shown in FIG. 27 to avoid overcomplicating the drawing. For example, a separate data source may be associated with each of a plurality of television broadcasters and may provide data that is specific to those broadcasters (e.g., advertisements for future programming of the broadcasters, logo data for displaying broadcasters' logos in program guide display screens, etc.).

Data source 2720 and any other system components of FIG. 27 may be provided using equipment at one or more locations. Systems components are drawn as single boxes in FIG. 27 to avoid overcomplicating the drawings.

Data source 2720 may provide data to distribution facility 2704 over communications path 2722 for distribution to the associated user equipment and home network 2713 (discussed below) over paths 2714, 2716, 2718, and 2719 (e.g., when data source 2720 is located at a main facility). Communications path 2722 may be any suitable communications path such as a satellite communications path or other wireless path, a fiber-optic or other wired communications path, a path that supports Internet communications, or other suitable path or combination of such paths.

In some television-centric and non-television centric approaches, data source 2720 may provide guidance data directly to user equipment 2708 over path 2724, communications network 2726, and path 2728 (e.g., when data source 2720 is located at a facility such as one of programming sources 2702). In some embodiments of the present invention, data source 2720 may provide guidance data directly to user equipment (e.g., FIGS. 1-6) located on home network 2713 (discussed below) over path 2724, communications network 2726, and path 2739 (e.g., when data source 2720 is located at a facility such as one of programming sources 2702). Paths 2724, 2728, and 2739 may be wired paths such as telephone lines, cable paths, fiber-optic paths, satellite paths, wireless paths, any other suitable paths or a combination of such paths. Communications network 2726 may be any suitable communications network, such as the Internet, the public switched telephone network, or a packet-based network.

User equipment devices, including user equipment devices located on home network 2713 (discussed below), such as user television equipment (e.g., FIG. 1) and personal computers (e.g., FIG. 3), may use the program schedule data and other interactive media guidance application data to display program listings and other information such as merchandise information for the user. An interactive television program guide application or other suitable interactive media guidance application may be used to display the information on the user's display (e.g., in one or more overlays that are displayed on top of video for a given television channel). Interactive displays (e.g., FIG. 25) may be generated and displayed for the user using any suitable approach. In one suitable approach, distribution facility 2704, server 2730, or another facility, may generate application display screens and may transmit the display screens to user equipment for display. In another suitable approach, user equipment may store data and merchandise information (FIGS. 9-10) for use in one or more interactive displays (e.g., FIG. 25), and an interactive media guidance application implemented at least partially on the user equipment may generate the interactive displays based on instructions received from distribution facility 2704, server 2730 (802, FIG. 8) or another facility. In some embodiments of the present invention, user equipment (e.g., equipment of FIGS. 1-6) may store only the data that is used to generate the interactive television displays (e.g., storing merchandise information, storing logo data for a particular television broadcaster only if the logo is to be included in one or more interactive television displays). In some embodiments of the present invention, user equipment may store data that is not necessarily used to generate the interactive television displays (e.g., storing advertisements associated with a particular television broadcaster that may or may not be displayed depending on, for example, the outcome of negotiations with the television broadcaster). Any other suitable approach or combination of approaches may be used to generate and display interactive overlays, such as the overlays shown in FIGS. 2, 4, 6, and 25-26, for the user.

In still other embodiments, interactive media guidance applications (television-centric and non-television centric) may be provided online as, for example, websites. For example, server 2730 (also represented as 802, FIG. 8) may provide an online interactive television program guide. As another example, user equipment 2708 (e.g., FIG. 5) may be a mobile device, such as a cellular telephone or personal digital assistant (PDA). The mobile device may be web-enabled to allow the user to access an on-line guidance application (which may be modified from its original version to make it appropriate for a cellular phone). Alternatively, the mobile device may have an applet that communicates with server 2730 to obtain guidance data via the Internet.

Server 2730 (also represented as 802, FIG. 8) may receive program schedule data and other data (e.g., merchandise information, electronic merchandise) from data source 2720 via communications path 2724, communications network 2726, and communications path 2732 or via another suitable path or combination of paths. Path 2732 may be a satellite path, fiber-optic path, wired path, or any other path or combination of paths. User equipment 2708 may access the on-line interactive media guidance application and other sources from server 2730 via communications path 2728. User equipment 2708 may also access the application and other services on server 2730 via communications path 2714, distribution facility 2704, and communications path 2734. For example, a cable modem or other suitable equipment may be used by user equipment 2708 to communicate with distribution facility 2704.

User equipment such as user television equipment 2710 (also shown in FIG. 1), user computer equipment 2712 (also shown in FIG. 3), and user equipment located on home network 2713 may access the on-line interactive media guidance application and server 2730 (also represented as 802, FIG. 8) using similar arrangements. User television equipment 2710 may access the on-line interactive media guidance application and server 2730 using communications path 2736 or using path 2716, distribution facility 2704, and path 2734. User computer equipment 2712 may access the on-line interactive media guidance application and server 2730 using communications path 2738 or using path 2718, distribution facility 2704, and path 2734. User equipment located on home network 2713 may access the on-line media guidance application and server 2730 using communications path 2739 or using path 2719, distribution facility 2704, and path 2734. Paths 2736, 2738, and 2739 may be any suitable paths such as wired paths, cable paths, fiber-optic paths, wireless paths, satellite paths, or a combination of such paths.

In some embodiments, system 2700 may support other interactive applications in addition to the interactive media guidance applications. Such applications may be implemented using any suitable approach. For example, the interactive applications may be implemented locally on the user equipment or in a distributed fashion (e.g., using a client-server architecture in which the user equipment serves at least partly, and for at least some of the time, as the client and a server, such as server 2740 at distribution facility 2704, server 2730, or other suitable equipment acts as the server). Other distributed architectures may also be used if desired. Moreover, some or all of the features of the interactive applications of system 2700 (including the media guidance application) may be provided using operating system software or middleware software. Such operating system software and middleware may be used instead of or in combination with application-level software. In yet other approaches, interactive applications may also be supported by servers or other suitable equipment at one or more service providers such as service provider 2742. Regardless of the particular arrangement used, the software that supports these features may be referred to as an application or applications.

For example, an interactive application such as a shopping service may be supported by a service provider (also represented as 814, FIG. 8) such as service provider 2742 that has sales representatives, order fulfillment facilities, account maintenance facilities, and other equipment for supporting interactive home shopping features. A shopping application that is implemented using the user equipment (e.g. equipment of FIGS. 1-6) may be used to access the service provider to provide such features to the user. The user equipment may access service provider 2742 via distribution facility 2704 and communications path 2744 or via communications network 2726 and communications path 2746. Communications paths such as paths 2744 and 2746 may be any suitable paths such as wired paths, cable paths, fiber-optic paths, satellite paths, or a combination of such paths.

Another example of an interactive application is a home banking application. A home banking service may be supported using personnel at facilities such as service provider 2742. An interactive home banking application that is implemented using the user equipment may access the home banking service via distribution facility 2704 and communications path 2744 or via communications network 2726 and communications path 2746.

If desired, an interactive media guidance application such as a network-based video recorder or a video-on-demand application may be supported using server 2740, server 2730, a home network server, or equipment at service provider 2742, such as the equipment 802, 814 of FIG. 8. Video-on-demand content and video recorded using a network-based video recorder arrangement may be stored on server 2740 or server 2730 or a home network server or at service provider 2742 (also represented as 802, FIG. 8) and may be provided to the user equipment when requested by users. An interactive television program guide, for example, may be used to support the functions of a personal video recorder (sometimes called a digital video recorder) that is implemented using user equipment 2708. Illustrative equipment that may be used to support personal video recorder functions include specialized personal video recorder devices, integrated receiver decoders (IRDs), set-top boxes with integrated or external hard drives, or personal computers with video recording capabilities.

Interactive applications such as media guidance applications (e.g., interactive television program guide applications and video-on-demand applications), shopping applications, home banking applications, game applications, and other applications (e.g., applications related to e-mail and chat or other communications functions, etc.) may be provided as separate applications that are accessed through a navigation shell application (i.e., a menu application with menu options corresponding to the applications). The features of such applications may be combined. For example, games, video-on-demand services, home shopping services, network-based video recorder functions, personal video recorder functions, navigational functions, program guide functions, communications functions, and other suitable functions may be provided using one application or any other suitable number of applications. The one or more applications may display various overlays on user equipment including, for example, interactive television information on top of video for a given television channel.

Interactive television program guide applications, home banking applications, shopping applications, network-based video recorder and personal video recorder applications, video-on-demand applications, gaming applications, communications applications, and navigational applications are only a few illustrative examples of the types of interactive media guidance and other applications that may be supported by system 2700. Other suitable interactive applications that may be supported include news services, web browsing and other Internet services, and interactive wagering services (e.g., for wagering on horse races, sporting events, and the like). Interactive television overlays that are displayed by these applications may also be customized in accordance with the present invention.

Users may have multiple types of user equipment by which they access media and obtain media guidance (e.g., user equipment of FIGS. 1-6). For example, some users may have home networks that are accessed by in-home and mobile devices. As shown in FIG. 27, home network 2713 communicates with distribution facility 2704 and server 2730 (also represented as 802, FIG. 8) over paths 2719 and 2739 (and, in the case of server 2730, communications network 2726). Such home networks 2713 may be located, for example, in homes of users or distributed, for example, among homes of users. Home networks 2713 may each include a plurality of interconnected user equipment devices, such as, for example user equipment devices 2708, 2710 and 2712. In some embodiments, users may control in-home devices via a media guidance application implemented on a remote device. For example, users may access an online media guidance application on a website via a personal computer at their office, or a mobile device such as a PDA or web-enabled cellular telephone. The user may set settings (e.g., recordings, reminders, or other settings) on the on-line guidance application to control the user's in-home equipment. The on-line guide may control the user's equipment directly, or by communicating with a media guidance application on the user's in-home equipment, such as a home server (also represented as 802, FIG. 8). User equipment and devices can be the equipment shown in FIGS. 1-6.

FIGS. 1-6 show illustrative arrangements for the user equipment described in the interactive guidance system 2700 of FIG. 27. An illustrative set-top box-based arrangement for user equipment 2710 is shown in FIG. 1. User television equipment 2710 may be stand-alone or a part of home network 2713 (FIG. 27). Input/output 106, 108 may be connected to communications paths such as paths 2716 and 2736 (FIG. 27). Input/output functions may be provided by one or more wires or communications paths. Television programming, program guide data, merchandise information, electronic merchandise, and any other suitable interactive media guidance application data or other data may be received using input/output 106,108. Commands and requests and other data generated as a result of user interactions with the interactive media guidance application may also be transmitted over input/output 106,108.

Set-top box 104 may be any suitable analog or digital set-top box (e.g., a cable set-top box). Set-top box 104 may contain an analog tuner for tuning to a desired analog television channel (e.g., a channel comprising television programming, interactive television data, or both). Set-top box 104 may also contain digital decoding circuitry for receiving digital television channels (e.g., channels comprising television or music programming, interactive television data, etc.). Set-top box 104 may also contain a high-definition television tuner for receiving and processing high-definition television channels. Analog, digital, and high-definition channels may be handled together if desired. Multiple tuners may be provided (e.g., to handle simultaneous watch and record functions or picture-in-picture (PIP) functions). Box 104 may be an integrated receiver decoder (IRD) that handles satellite television. If desired, box 104 may have circuitry for handling cable, over-the-air broadcast, and satellite content.

Set-top box 104 may be configured to output media, such as television programs, in a preferred format. Because media programs may be received in a variety of formats, set-top box 104 may contain scaler circuitry for upconverting and downconverting media programs into the preferred output format used by set-top box 104 and/or user equipment such as those in FIGS. 1-6. For example, set-top box 104 may be configured to output television programs in 720p. In this example, the scaler circuitry may upconvert standard-definition television programs having 480 lines of vertical resolution to 720p format and downconvert certain high-definition television programs having 1080 lines of vertical resolution to 720p format.

Box 104 may include a storage device (e.g., a digital storage device such as a hard disk drive) for providing recording capabilities. Box 104 may also be connected to a recording device 114 such as a video cassette recorder, personal video recorder, optical disc recorder, or other device or devices with storage capabilities. In some embodiments, box 104 may be configured to record either standard-definition television programs or high-definition television programs. In some embodiments, box 104 may be configured to record both standard-definition television programs and high-definition television programs.

Set-top box 104 contains a processor (e.g., a microcontroller or microprocessor or the like) that is used to execute software applications and/or present merchandise opportunities as shown in FIGS. 14, 17, 19, and 23. Set-top box 104 may contain memory such as random-access memory for use with executing applications or presenting merchandise opportunities, or storing data or data structures such as those shown in FIG. 9-10. Nonvolatile memory may also be used (e.g., to launch a boot-up routine and other instructions). Hard disk storage in box 104 or in recording device 114 may be used to back up data (e.g., merchandise information, electronic merchandise) and to otherwise support larger databases and storage requirements than may be supported using random-access memory approaches. Hard disk storage in box 104 or in recording device 114 may also be used to store and back up program guide settings, saved user preferences, merchandise information, and/or electronic merchandise.

Set-top box 104 may have infrared (IR) or other communications circuitry for communicating with a remote control or wireless keyboard. Set-top box 104 may also have dedicated buttons and a front-panel display. The front-panel display may, for example, be used to display the current channel to which the set-top box is tuned.

Set-top box 104 may also have communications circuitry such as a cable modem, an integrated services digital network (ISDN) modem, a digital subscriber line (DSL) modem, a telephone modem, or a wireless modem for communications with other equipment and/or a server/distribution facility as shown in FIG. 8. Such communications may involve the Internet or any other suitable communications networks or paths. If desired, the components of set-top box 104 may be integrated into other user equipment (e.g., a television or videocassette recorder).

Recording device 114 may be used to record videos provided by set-top box 104. For example, if set-top box 104 is tuned to a given television channel, the video signal for that television channel may be passed to recording device 114 for recording on a videocassette, compact disc, digital video disk, or internal hard drive or other storage device. In some embodiments, recording device 114 may be configured to record either standard-definition television programs or high-definition television programs. In some embodiments, recording device 114 may be configured to record both standard-definition television programs and high-definition television programs. Recording device 114 may have communications circuitry such as a cable modem, an ISDN modem, a DSL modem, or a telephone modem for communications with other equipment. Such communications may involve the Internet or any other suitable communications networks or paths. The components of recording device 114 may be integrated into other user equipment (e.g., a television, stereo equipment, etc.).

Recording device 114 may be controlled using a remote control 110 or other suitable user interface. If desired, video recorder functions such as start, stop, record and other functions for device 114 may be controlled by set-top box 104. For example, set-top box 104 may control recording device 114 using infrared commands directed toward the remote control inputs of recording device 114 or set-top box 104 may control recording device 114 using other wired or wireless communications paths between box 104 and device 114.

The output of recording device 114 may be provided to television 102 for display to the user (not shown). In some embodiments, television 102 may be capable of displaying high-definition programming (i.e., HDTV-capable). If desired, multiple recording devices 206 or no recording device 114 may be used. If recording device 114 is not present or is not being actively used, the video signals from set-top box 104 may be provided directly to television 102. Any suitable television or monitor may be used to display the video. For example, if the video is in a high-definition format, an HDTV-capable television or monitor is required to display the video. In the equipment of FIG. 1 and the other equipment of system 2700 (FIG. 27), the audio associated with various video items is typically distributed with those video items and is generally played back to the user as the videos are played. In some embodiments, the audio may be distributed to a receiver (not shown), which processes and outputs the audio via external speakers (not shown).

In one variation of the user television equipment 2710 (FIG. 27) shown in FIG. 1, user television equipment 2710 may be stand-alone or a part of home network 2713 (FIG. 27). In one example, user television equipment 2710 may include a recording device 114 such as a digital video recorder (e.g., a personal video recorder (PVR)) that uses a hard disk or other storage for recording video or for storing merchandise information and electronic merchandise. Recording device 114 may alternatively be a digital video disc recorder, compact disc recorder, videocassette recorder, or other suitable recording device (not shown). Equipment 2710 of FIG. 1 may also include a television 102. In some embodiments, television 102 may be HDTV-capable. Input/output 106,108 may be connected to communications paths such as paths 2716 and 2736 (FIG. 27). Television programming, program schedule data, merchandise information, electronic merchandise, and other data (e.g., advertisement data, data indicating one or more television channels for which the display of an overlay is to be customized, etc.) may be received using input/output 106,108. Commands and requests and other data such as a user equipment identifier (1304, FIG. 13) or location information (as shown in FIGS. 22-23) from the user may be transmitted over input/output 106,108.

Recording device 114 may contain at least one analog tuner for tuning to a desired analog television channel (e.g., to display video for a given television channel to a user, to receive program guide data and other data) and multiple other tuners may also be provided. Recording device 114 may also contain digital decoding circuitry for receiving digital television programming, music programming, program guide data, merchandise information, electronic merchandise, and other data on one or more digital channels. Recording device 114 may also contain circuitry for receiving high-definition television channels. If desired, recording device 114 may contain circuitry for handling analog, digital, and high-definition channels. Recording device 114 also contains a processor (e.g., a microcontroller or microprocessor or the like) that is used to execute software applications. Recording device 114 may contain memory such as random-access memory for use when executing applications and/or performing purchase opportunity operations such as those shown in FIGS. 14, 17, 19, 23. Nonvolatile memory may also be used to store a boot-up routine or other instructions. The hard disk and other storage in recording device 114 may be used to support databases (e.g., program guide databases or other interactive television application databases). The hard disk or other storage in recording device 114 may also be used to record video such as television programs or video-on-demand content or other content provided to recording device 114 over input/output 106,108.

Recording device 114 may have IR communications circuitry or other suitable communications circuitry for communicating with a remote control. Recording device 114 may also have dedicated buttons and a front-panel display. The front-panel display may, for example, be used to display the current channel to which the recording device is tuned.

Recording device 114 may also have communications circuitry such as a cable modem, an ISDN modem, a DSL modem, a telephone modem, or a wireless modem for communications with other equipment. Such communications may involve the Internet or other suitable communications networks or paths.

If desired, recording device 114 may include a satellite receiver or other equipment that has wireless communications circuitry for receiving satellite signals.

Recording device 114 of FIG. 1 may record new media programs while previously recorded media programs are being played back on television 102. This allows users to press a pause button during normal television viewing. When the pause button is pressed, the current media program is stored on the hard disk of digital video recorder 114. When the user presses play, the recorded the media program may be played back. This arrangement allows the user to seamlessly pause and resume television viewing. Recording device 114 may also be used to allow a user to watch a previously-recorded program while simultaneously recording a new program.

The set-top box arrangement 104 of FIG. 1 and the personal video recorder with a built-in set-top box variation 114 are merely illustrative. Other arrangements may be used if desired. For example, user television equipment may be based on a WebTV box, a personal computer television (PC/TV) (e.g., equipment of FIG. 3), or any other suitable television equipment arrangement. If desired, the functions of components such as set-top box 204, recording device 302, a WebTV box, or PC/TV or the like may be integrated into a television or personal computer or other suitable device, such as the devices of FIG. 5.

Figure 28:
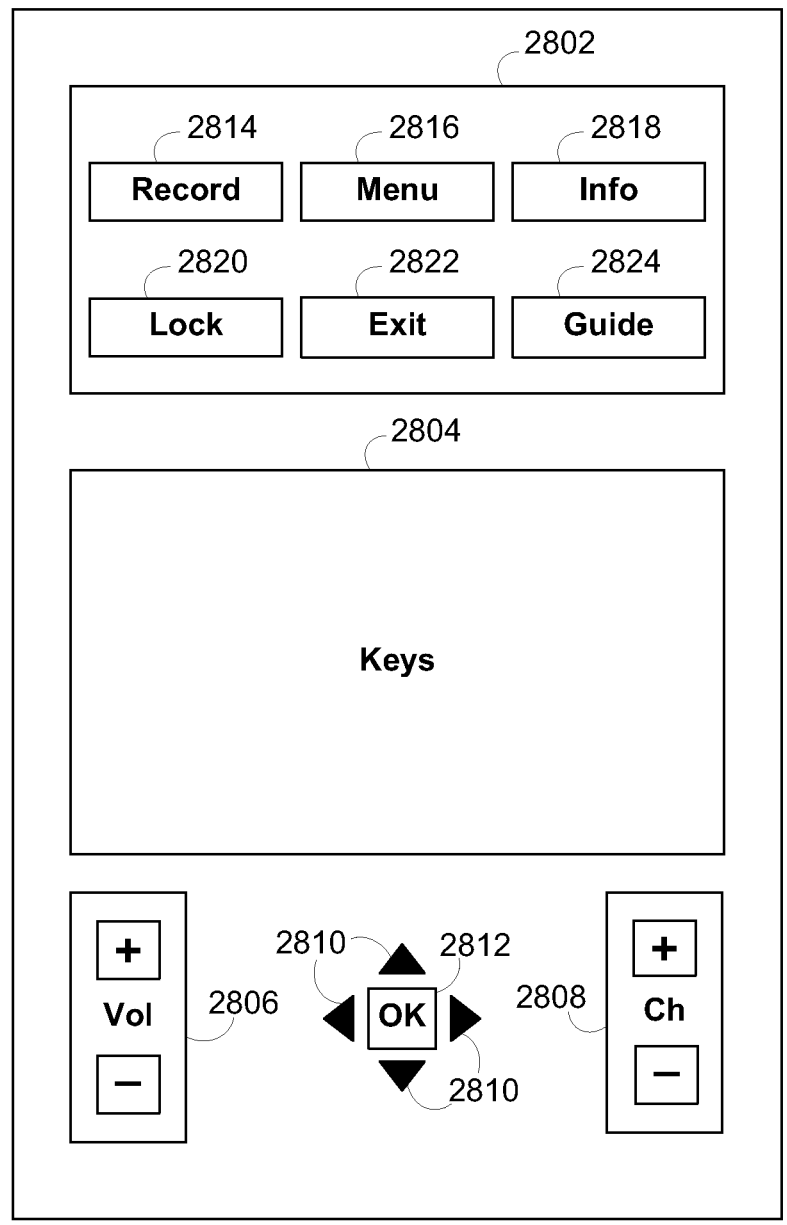
FIG. 28 is a schematic diagram of an exemplary remote control device.

An illustrative remote control 2800 for operating user television equipment 2710 (FIG. 27) or suitable user computer equipment 2712 is shown in FIG. 28. Remote control 2800 is only illustrative and any other suitable user input interface may be used to operate user equipment (e.g., a mouse, trackball, keypad, keyboard, touch screen, voice recognition system, etc.). Remote control 2800 may have function keys 2802 and other keys 2804 such as keypad keys, power on/off keys, pause, stop, fast-forward and reverse keys. Volume up and down keys 2806 may be used for adjusting the volume of the audio portion of a video. Channel up and down keys 2808 may be used to change television channels and to access content on virtual channels. Cursor keys 2810 may be used to navigate on-screen menus or interactively displays, such as those shown in FIGS. 25-26. For example, cursor keys 2810 may be used to position an on-screen cursor, indicator, or highlight (sometimes all generically referred to herein as a highlight or highlight region) to indicate interest in a particular option (e.g., 2506-2512, FIG. 25) or other item on a display screen that is displayed by the interactive television application.

OK key 2812 (sometimes called a select or enter key) may be used to select on-screen options that the user has highlighted. In one embodiment, the OK key 2812 can be used to indicate interest in a purchase opportunity. For example, when an "EXTRA" icon (1506, FIG. 15) appears on a display screen, a user can press the OK key 2812 to indicate interest in seeing a description of the related merchandise. In response, an interactive screen such as that shown in FIG. 25 can appear.

Keys 2802 may include RECORD key 2814 for initiating recordings. MENU button 2816 may be used to direct an interactive media guidance application to display a menu on the user's display screen (e.g., on television 208 or 304 or on a suitable monitor or computer display). INFO button 2818 may be used to direct an interactive media guidance application to display an information display screen. For example, when a user presses INFO key 2818 while video for a given television channel is displayed for the user, an interactive television program guide may display a FLIP/BROWSE overlay including program schedule information for the current program on the given television channel on top of the video. As another example, when a particular program listing in an interactive television program listings display screen is highlighted, the user pressing INFO button 2818 may cause an interactive television program guide to provide additional program information associated with that program listing (e.g., a program description, actor information, schedule information, etc.). In one example, when an "EXTRA" icon (e.g., 1506, FIG. 15) is displayed, pressing the INFO button 2818 may cause the interactive screen of FIG. 25 to appear.

LOCK button 2820 may be used to modify access privileges. For example, a parent may use LOCK button 2820 or on-screen options to establish parental control settings for the interactive media guidance application. The parental control settings may be time-based settings (e.g., to prevent a child from watching television during a particular time block, such as from 3:00 PM to 5:00 PM). The parental control settings may also be used to, for example, block programming based on rating, channel, and program title. A locked or blocked program (or other media) is typically not viewable until the interactive media guidance application is provided with a suitable personal identification number (PIN). Once this PIN has been entered, the interactive media guidance application will unlock the user's equipment and allow the locked content to be accessed.

EXIT button 2822 may be used to exit the interactive media guidance application or to exit a portion of the interactive media guidance application (e.g., to cause an interactive television program guide to remove a FLIP, BROWSE, or other interactive television overlay from the display screen). In one example, the EXIT button 2822 can be associated with an EXIT option in a purchase opportunity (e.g., 2510, FIG. 25). GUIDE button 2824 may be used to invoke an interactive television program guide (e.g., a program guide menu screen, program listings screen, or other program guide screen).

The keys shown in FIG. 28 are merely illustrative. Other keys or buttons may be provided if desired. For example, a music button may be used to access music with the interactive media guidance application. An edit button may be used to edit stored content (e.g., to remove commercials, remove portions of a video, etc.). Alphanumeric buttons may be used to enter alphanumeric characters. A last or back button may be used to browse backward in the interactive media guidance application (e.g., to return to a previous channel, web page, or other display screen). Video recorder function buttons such as a play button, pause button, stop button, rewind button, fast-forward button, and record button, may be used to control video recorder functions (local or network-based) in system 2700 (FIG. 27). A help key may be used to invoke help functions such as context-sensitive on-screen help functions.

Illustrative user computer equipment 2712 (FIG. 27) is shown in FIG. 3. User computer equipment 2712 may be stand-alone or a part of home network 2713 (FIG. 27). In the arrangement of FIG. 3, personal computer unit 302 may be controlled by the user using keyboard 310 and/or other suitable user input device such as a trackball, mouse 306, touch pad, touch screen, voice recognition system, or a remote control, such as remote control 2800 of FIG. 28. Video content, such as television programming or web pages having video elements, interactive media guidance application display screens, and purchase opportunity screens (e.g., FIGS. 15, 24-26) may be displayed on monitor 312. Television and music programming, media guidance application data (e.g., television program guide data), video-on-demand content, video recordings played back from a network-based video recorder, merchandise information, electronic merchandise, and other data may be received from paths 2718 and 2738 (FIG. 27) using input/output 304. User commands and other information (e.g., user equipment identifier 1304, FIG. 13, location information of FIGS. 22-23) generated as a result of user interactions with the interactive media guidance application and system 2700 (FIG. 27) may also be transmitted over input/output 508.

Personal computer unit 302 may contain a television or video card, such as a television tuner card, for decoding analog, digital, and high-definition television channels and for handling streaming video content. Multiple video cards (e.g., tuner cards) may be provided if desired. An illustrative television tuner card that may be used may contain an analog television tuner for tuning to a given analog channel, digital decoding circuitry for filtering out a desired digital television or music channel from a packetized digital data stream, and a high-definition television tuner for tuning to a high-definition channel. Any suitable card or components in computer unit 302 may be used to handle video and other content delivered via input/output line 304 if desired.

Personal computer unit 302 may contain one or more processors (e.g., microprocessors) that are used to run the interactive media guidance application or a portion of the interactive media guidance application. The one or more processors can also be used to perform purchase opportunity operations, such as those of FIGS. 14, 17, 19, and 23.

Personal computer unit 302 may include a hard drive, a recordable DVD drive, a recordable CD drive, or other suitable storage device or devices that stores video, program guide data, media programs, merchandise information, electronic merchandise, and other content. The interactive media guidance application and personal computer unit 302 may use a storage device or devices to, for example, provide the functions of a personal video recorder.

User equipment, such as user equipment 2708, user television equipment 2710, user computer equipment 2712, and user equipment located on home network 2713 (FIG. 27), such as those shown in FIGS. 1-6, may be used with network equipment such as server 2730, server 2740, a home network server, distribution facilities (also represented as 802, FIG. 8), and equipment at service providers such as service provider 2742 of FIG. 27 or service provider 814 of FIG. 8 to provide network-based video recording functions. Video recording functions may be provided by storing copies of television programs and other video content on a remote server (e.g., server 2730 or server 2740 or a home network server) or other network-based equipment, such as equipment at a service provider such as service provider 2742.

Video recordings may be made in response to user commands that are entered at user equipment 2708 or user equipment located on home network 2713 (FIG. 27). In a personal video recorder arrangement, the interactive media guidance application may be used to record media programs and related merchandise information locally on the user equipment in response to the user commands. In a network-based video recorder arrangement, the interactive media guidance application may be used to record media programs and related merchandise information or to make virtual recordings (described below) on network equipment such as server 2730, server 2740, a home network server, or equipment at service provider 2742 in response to the user commands. The user commands may be provided to the network equipment over the communications paths shown in FIG. 27. The personal video recorder arrangement and the network-based video recorder arrangement can support functions such as fast-forward, rewind, pause, play, and record.

To avoid unnecessary duplication in a network-based video recorder environment, system 2700 may provide network-based video recording capabilities by using virtual copies or recordings. With this approach, each user may be provided with a personal area on the network that contains a list of that user's recordings, media programs, merchandise information, and electronic merchandise. The video content need only be stored once (or a relatively small number of times) on the network equipment, even though a large number of users may have that video content listed as one of their recordings in their network-based video recorder personal area. Personal settings or any other suitable data may be stored in a user's personal area on the network.

Figure 29:
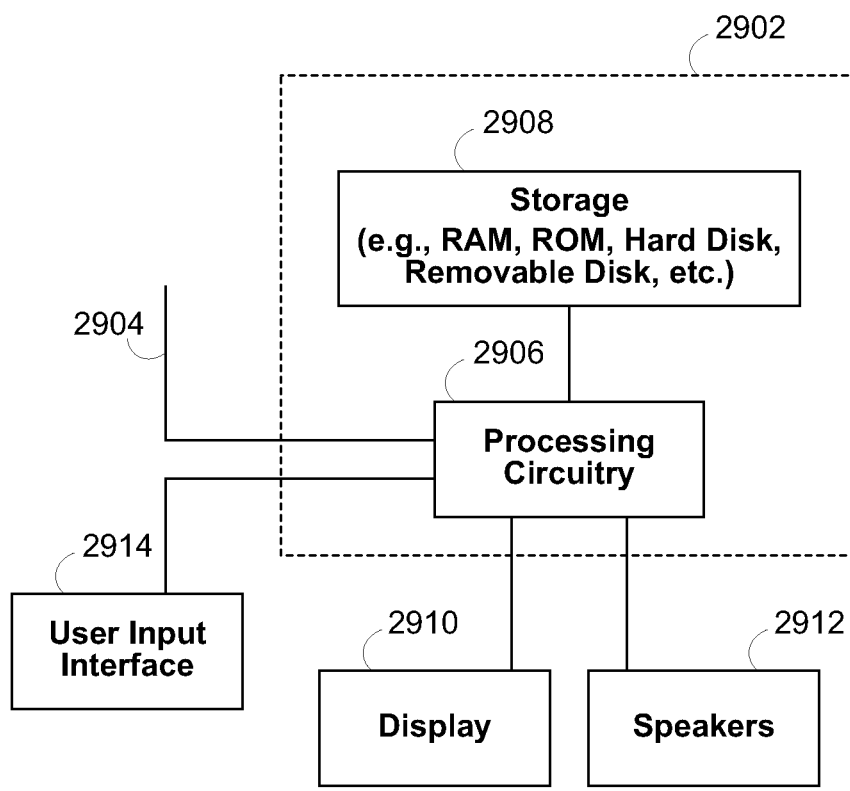
FIG. 29 is a is a block diagram of exemplary user equipment.

The user television equipment and user computer equipment arrangements described above are merely illustrative. A more generalized embodiment of illustrative user equipment 2708, 2710, and 2712 (FIG. 27), such as those shown in FIGS. 1-6, and user equipment located on home network 2713 (FIG. 27) is shown in FIG. 29. Control circuitry 2902 is connected to input/output 2904. Input/output 2904 may be connected to one or more communications paths such as paths 2714, 2716, 2718, 2728, 2736, and 2738 of FIG. 27. Media programs (e.g., television programming, music programming, other video and audio, and web pages) may be received via input/output 2904 (e.g., from programming sources 2702, servers or other equipment (e.g., 802, 814, FIG. 8), such as server 2730, service providers such as service provider 2742, distribution facility 2704, etc.). Interactive media guidance application data, such as program schedule information for an interactive television program guide or merchandise information for purchase opportunities, may be received from data source 2720 via input/output 2904. Input/output 2904 may also be used to receive data from data source 2720 for other interactive television applications. The user may use control circuitry 2902 to send and receive commands, requests, and other suitable data (e.g., merchandise information, electronic merchandise, user equipment identifier, or location information) using input/output 2904.

Control circuitry 2902 may be based on any suitable processing circuitry 2906 such as processing circuitry based on one or more microprocessors, microcontrollers, digital signal processors, programmable logic devices, etc. In some embodiments, control circuitry 2902 executes instructions for an interactive media guidance application or other interactive application (e.g., web browser) from memory. Memory (e.g., random-access memory and read-only memory), hard drives, optical drives, or any other suitable memory or storage devices may be provided as storage 2908 that is part of control circuitry 2902. Tuning circuitry such as one or more analog tuners, one or more MPEG-2 decoders or other digital video circuitry, high-definition tuners, or any other suitable tuning or video circuits or combinations of such circuits may also be included as part of circuitry 2902. Encoding circuitry (e.g., for converting over-the-air, analog, or digital signals to MPEG signals for storage) may also be provided. The tuning and encoding circuitry may be used by the user equipment to receive and display, play, or record a particular television or music channel or other desired audio and video content (e.g., video-on-demand content or requested network-based or local video recorder playback). Television programming and other video and on-screen options and information (e.g., interactive screens of FIGS. 15, 25-26) may be displayed on display 2910. Display 2910 may be a monitor, a television, or any other suitable equipment for displaying visual images. In some embodiments, display 2910 may be HDTV-capable. Speakers 2912 may be provided as part of a television or may be stand-alone units. Digital music and the audio component of videos displayed on display 2910 may be played through speakers 2912. In some embodiments, the audio may be distributed to a receiver (not shown), which processes and outputs the audio via speakers 2912.

A user may control the control circuitry 2902 using user input interface 2914. User input interface 2914 may be any suitable user interface, such as a mouse, trackball, keypad, keyboard, touch screen, touch pad, voice recognition interface, or a remote control.

Accordingly, what have been described thus far are systems and methods for delivering a media program and merchandise information for merchandise related to the media program to user equipment. A media program and its related merchandise information can be located at a server/distribution facility and/or another type of hosting/distribution system. When a server/distribution facility receives a request for a media program from user equipment, the server/distribution facility can tailor the merchandise information it provides to the user equipment based on the user equipment's equipment category. When user equipment receives merchandise information, the user equipment can filter the merchandise information based on which types of merchandise are supported by the user equipment. A user may be interested in seeing information about physical merchandise and where they are available for purchase. The user equipment and/or a server/distribution facility may be able to determine the location of the user equipment. When the server/distribution facility provides merchandise information for physical merchandise to the user equipment, the merchandise information can be selected to include only physical merchandise that are available for purchase at stores that are, for example, near the location of the user equipment. The disclosed embodiments and illustrations are exemplary and do not limit the scope of the disclosed invention as defined by the following claims.

What is claimed is:

1. A method for providing a media asset and merchandise information for physical merchandise related to the media asset, comprising:

receiving, using a communication circuit, a media asset request associated with a user equipment, wherein a requested media asset associated with the media asset request is associated with a merchandise information pointer;

determining a current media asset time of the requested media asset;

identifying, based on the merchandise information pointer, a table of merchandise information for a plurality of physical merchandise that is related to the current media asset time of the requested media asset;

determining a location of the user equipment;

accessing, using a processor, the table of merchandise information for the plurality of physical merchandise that is related to the current media asset time of the requested media asset and determining therefrom locations where the plurality of physical merchandise is available for purchase;

determining, using the processor, relative locations of the user equipment to corresponding locations of where each physical merchandise of the plurality of physical merchandise is available for purchase;

selecting, using the processor, at least one physical merchandise of the plurality of physical merchandise related to the current media asset time of the requested media asset to recommend based on the determined relative locations; and communicating, using the communication circuit, an advertisement associated with the selected at least one physical merchandise to the user equipment, wherein the advertisement associated with the selected at least one physical merchandise that is related to the current media asset time of the requested media asset is displayed during the current media asset time and includes an indication of the location of the at least one physical merchandise.

2. The method of claim 1, wherein determining the location of the user equipment comprises computing the location of the user equipment using location triangulation.

3. The method of claim 1, wherein selecting at least one of the plurality of physical merchandise to recommend comprises identifying physical merchandise which meet at least one location criterion associated with the relative locations of the user equipment and the physical merchandise.

4. The method of claim 1, further comprising periodically re-determining the location of the user equipment.

5. A system for providing a media asset and merchandise information for physical merchandise related to the media asset, comprising a processor configured to:
receive a media asset request associated with a user equipment, wherein a requested media asset associated with the media asset request is associated with a merchandise information pointer;
determine a current media asset time of the requested media asset;
identify, based on the merchandise information pointer, a table of merchandise information for a plurality of physical merchandise that is related to the current media asset time of the requested media asset;
determine a location of the user equipment;
access the table of merchandise information for the plurality of physical merchandise that is related to the current media asset time of the requested media asset and determine therefrom locations where the plurality of physical merchandise is available for purchase,
determine relative locations of the user equipment to corresponding locations of where each physical merchandise of the plurality of physical merchandise is available for purchase;
select at least one physical merchandise of the plurality of physical merchandise related to the current media asset time of the requested media asset to recommend based on the determined relative locations; and
communicate an advertisement associated with the selected at least one physical merchandise to the user equipment, wherein the advertisement associated with the selected at least one physical merchandise that is related to the current media asset time of the requested media asset is displayed during the current media asset time and includes an indication of the location of the at least one physical merchandise.

6. The system of claim 5, wherein the location determination circuit is configured to determine the location of the user equipment by computing the location of the user using location triangulation.

7. The system of claim 5, wherein the processor executes machine instructions to select at least one of the plurality of physical merchandise to recommend which meets at least one location criterion associated with the relative locations of the user equipment and the physical merchandise.

8. The system of claim 5, wherein the location determination circuit is configured to periodically re-determine the location of the user equipment.

9. A method for providing a media asset and merchandise information for physical merchandise related to the media asset through an interactive program guide, comprising:
receiving, using a communication circuit, a media asset request associated with a user equipment implementing an interactive program guide, wherein a requested media asset associated with the media asset request is associated with a merchandise information pointer;
determining a current media asset time of the requested media asset:
identifying, based on the merchandise information pointer, a table of merchandise information for a plurality of physical merchandise that is related to the current media asset time of the requested media asset;
determining a location of the user equipment using a location determination circuit;
accessing, using a processor, the table of merchandise information for the plurality of physical merchandise that is related to the current media asset time of the requested media asset and determining therefrom locations where the plurality of physical merchandise is available for purchase;
determining, using the processor, relative locations of the user equipment to corresponding locations of where each physical merchandise of the plurality of physical merchandise is available for purchase;
selecting, using the processor, at least one physical merchandise of the plurality of physical merchandise related to the current media asset time of the requested media asset to recommend based on the determined relative locations; and
communicating, using the communication circuit, an advertisement associated with the selected at least one physical merchandise to the user equipment, wherein the advertisement associated with the selected at least one physical merchandise that is related to the current media asset time of the requested media asset is displayed during the current media asset time and includes an indication of the location of the at least one physical merchandise.

10. The method of claim 9, wherein determining the location of the user equipment comprises computing the location of the user equipment using location triangulation.

11. The method of claim 9, wherein selecting at least one of the plurality of physical merchandise to recommend comprises identifying physical merchandise which meet at least one location criterion associated with the relative locations of the user equipment and the physical merchandise.

12. The method of claim 9, further comprising periodically re-determining the location of the user equipment.

13. The method of claim 3, wherein the location criterion comprises at least one of: the location of the physical merchandise matching a zip code of the location of the user equipment, the location of the physical merchandise matching a neighboring zip code of the location of the user equipment, the location of the physical merchandise being within a particular distance radius of the user equipment.

14. The system of claim 7, wherein the location criterion comprises at least one of: the location of the physical merchandise matching a zip code of the location of the user equipment, the location of the physical merchandise matching a neighboring zip code of the location of the user equipment, the location of the physical merchandise being within a particular distance radius of the user equipment.

15. The method of claim 9, wherein the location criterion comprises at least one of: the location of the physical merchandise matching a zip code of the location of the user equipment, the location of the physical merchandise matching a neighboring zip code of the location of the user equipment, the location of the physical merchandise being within a particular distance radius of the user equipment.

* * * * *